(12) United States Patent
Wei et al.

(10) Patent No.: US 12,525,156 B2
(45) Date of Patent: Jan. 13, 2026

(54) DISPLAY METHOD, APPARATUS, AND SYSTEM

(71) Applicant: SHENZHEN YINWANG INTELLIGENT TECHNOLOGIES CO., LTD., Shenzhen (CN)

(72) Inventors: Tong Wei, Shanghai (CN); Zhengjie Yu, Shenzhen (CN); Yuteng Zhang, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/749,888

(22) Filed: Jun. 21, 2024

(65) Prior Publication Data

US 2024/0355242 A1    Oct. 24, 2024

Related U.S. Application Data

(63) Continuation of application No. PCT/CN2022/135510, filed on Nov. 30, 2022.

(30) Foreign Application Priority Data

Dec. 23, 2021  (CN) .......................... 202111593514.9
Mar. 29, 2022  (CN) .......................... 202210324495.8

(51) Int. Cl.
*G09G 3/00* (2006.01)
*B60K 35/10* (2024.01)
(Continued)

(52) U.S. Cl.
CPC ............. *G09G 3/001* (2013.01); *B60K 35/10* (2024.01); *B60K 35/22* (2024.01); *B60K 37/20* (2024.01);
(Continued)

(58) Field of Classification Search
CPC ............ G09G 3/001; G09G 3/36; G09G 3/32; G09G 1/00; G09G 2320/0626;
(Continued)

(56) References Cited

U.S. PATENT DOCUMENTS 10,319,272 B1 *  6/2019  Carter .................... G06F 3/013
2019/0168610 A1 *  6/2019  Nakane ................. G06V 20/56
(Continued)

FOREIGN PATENT DOCUMENTS

CN    110264927 A    9/2019
CN    110728934 A    1/2020
(Continued)

*Primary Examiner* — Brent D Castiaux
(74) *Attorney, Agent, or Firm* — Conley Rose, P.C.

(57) ABSTRACT

A display method includes: obtaining environment information corresponding to a vehicle, where the environment information includes light intensity information and/or location information; and adjusting a display mode of a display device of the vehicle based on the environment information, where the display mode includes at least one of display brightness, a display location, display content, a display color, a display style, or a display size. Hence, the display mode of the display device is adjusted based on the environment information such that the display mode of the display device can adapt to a current environment to improve display effect and driving safety.

20 Claims, 26 Drawing Sheets

(51) Int. Cl.
*B60K 35/22* (2024.01)
*B60K 37/20* (2024.01)
*G02B 27/01* (2006.01)

(52) U.S. Cl.
CPC .. *G02B 27/0101* (2013.01); *G02B 2027/0118* (2013.01); *G02B 2027/014* (2013.01); *G09G 2320/0626* (2013.01); *G09G 2320/0666* (2013.01); *G09G 2340/045* (2013.01); *G09G 2340/0464* (2013.01); *G09G 2354/00* (2013.01); *G09G 2360/144* (2013.01); *G09G 2380/10* (2013.01)

(58) Field of Classification Search
CPC ..... G09G 2320/0666; G09G 2340/045; G09G 2340/0464; G09G 2354/00; G09G 2360/144; G09G 2380/10; G02B 27/0101; G02B 2027/0118; G02B 2027/014; G02B 2027/0183; G02B 2027/0196; B60K 35/234; B60K 35/233; B60K 35/415; B60K 35/81; B60K 35/10; B60K 35/22; B60K 37/20; B60K 2360/334; B60K 2360/349; B60W 2050/146; B60W 50/14; G03B 21/142; G03B 21/2053

See application file for complete search history.

(56) References Cited

U.S. PATENT DOCUMENTS

2019/0206362 A1\* 7/2019 Li ................... G02B 27/0101
2021/0043163 A1 2/2021 Tokuda

FOREIGN PATENT DOCUMENTS

| | | |
|---|---|---|
| CN | 111935428 A | 11/2020 |
| CN | 112596246 A | 4/2021 |
| CN | 113442833 A | 9/2021 |
| JP | 2018136698 A | 8/2018 |

\* cited by examiner

DISPLAY METHOD, APPARATUS, AND SYSTEM

CROSS-REFERENCE TO RELATED APPLICATIONS

This is a continuation of International Patent Application No. PCT/CN2022/135510 filed on Nov. 30, 2022, which claims priority to Chinese Patent Application No. 202111593514.9 filed on Dec. 23, 2021 and Chinese Patent Application No. 202210324495.8 filed on Mar. 29, 2022. All of the aforementioned patent applications are hereby incorporated by reference in their entireties.

TECHNICAL FIELD

This application relates to the field of intelligent vehicle technologies, and in particular, to a display method, apparatus, and system.

BACKGROUND

With development of economy and a rapid increase of a vehicle population, vehicle technologies and computer technologies are increasingly integrated. Intelligent vehicles have become a new trend of vehicle development. In addition to technologies such as automated driving and a high-definition map, man-machine interaction for an intelligent cockpit has also become a hot technology that attracts much attention.

A plurality of display devices may be usually disposed in an intelligent cockpit. A vehicle is a scenario highly sensitive to safety, and maintaining good display effect of a display device is of great significance.

SUMMARY

This application provides a display method, apparatus, and system, a storage medium, and a computer program product, to improve display stability and user experience. It should be understood that the display method provided in embodiments of this application may be applied to a processing apparatus. The processing apparatus may be a processor, a processing chip, a display device (for example, a vehicle-mounted display or a head-up display (HUD) device), or a vehicle-mounted apparatus or a vehicle with a processing function. The processor or the processing chip may be located in a display device or a vehicle-mounted apparatus, or may communicate with an electronic apparatus or a vehicle-mounted apparatus in a wired or wireless manner, for example, may be a processor of a HUD or a processor of an automobile head unit. During implementation, the processing apparatus may be one or more processing apparatuses. For example, a processing chip in an automobile head unit processes data and sends key information to a processing apparatus in a HUD to generate a to-be-projected image. The processing apparatus may include one or more processing apparatuses. During implementation, one processing apparatus may process data, and another processing apparatus generates a to-be-projected image, and projects the image to a windshield through an optical device, or one processor may process data and generate a to-be-projected image. For another example, a processor of an automobile head unit processes an image and then displays a processed image on a vehicle-mounted display.

According to a first aspect, an embodiment of this application provides a display method. The method includes obtaining environment information corresponding to a vehicle, where the environment information includes light intensity information and/or location information, and adjusting a display mode of a display device of the vehicle based on the environment information, where the display mode includes at least one of display brightness, a display location, display content, a display color, a display style, or a display size.

The display device may be a vehicle-mounted display, for example, a central control display or an entertainment display, or may be a HUD device, for example, a HUD or an augmented reality (AR) HUD device.

The environment information corresponding to the vehicle is obtained, and the display mode of the display device is adjusted based on the environment information, so that the display mode of the display device can adapt to a current environment, to improve display effect and driving safety. When the environment information of the vehicle changes greatly, for example, when the vehicle enters a tunnel or is greatly blocked, ambient light seen by a driver changes greatly. In this case, the display mode is adjusted to ensure that sight of the driver is not affected, to ensure driving safety. For example, when the vehicle enters the tunnel, display brightness for the vehicle is decreased, to avoid impact on driving safety due to excessively high brightness of the display device of the vehicle, and when the vehicle leaves the tunnel, display brightness for the vehicle is increased, so that the driver can properly view information such as vehicle navigation, to ensure driving safety of the vehicle. For another example, when the vehicle enters the tunnel, the display mode of the vehicle is adjusted to a nighttime display mode, and when the vehicle leaves the tunnel, the display mode of the vehicle is adjusted to a daytime display mode, to ensure driving safety of the driver. For example, when the vehicle enters the tunnel, a display icon, information, or the like on the vehicle is moved to a region away from sight of the driver or is not displayed, or display transparency is improved, or a display color, display brightness, or the like is decreased, to reduce impact on eyes of the driver. Further, when the vehicle leaves the tunnel, display of the icon and the information may be restored.

According to the first aspect, in a first possible implementation of the first aspect, the location information includes a location of the vehicle and/or a location of a region in which ambient light is blocked in a traveling direction of the vehicle, and adjusting a display mode of a display device of the vehicle based on the environment information includes adjusting the display mode of the display device of the vehicle based on the location of the vehicle and/or the location of the region in which ambient light is blocked in the traveling direction of the vehicle.

In an example, the location of the vehicle may be obtained, a scenario in which the vehicle is located is determined, and the display mode of the display device of the vehicle may be adjusted based on the scenario in which the vehicle is located, for example, in a tunnel, under an elevated highway, on an expressway, or on a smooth road. In another example, the location of the region in which ambient light is blocked in the traveling direction of the vehicle may be obtained, and the display mode of the display device of the vehicle is adjusted based on the location of the region in which ambient light is blocked in the traveling direction of the vehicle. In another example, the location of the vehicle and/or the location of the region in which ambient light is blocked in the traveling direction of the vehicle may be obtained, to adjust the display mode of the display device of the vehicle. For example, the display mode of the display device of the vehicle may be adjusted based on the location of the vehicle and a location of a tunnel when the vehicle is to enter the tunnel.

According to the first aspect, in a second possible implementation of the first aspect, the location information includes a location of the vehicle and/or a location of a region in which ambient light is blocked in a traveling direction of the vehicle, and adjusting a display mode of a display device of the vehicle based on the environment information includes determining a first distance between the vehicle and the region in which ambient light is blocked based on the location of the vehicle and/or the location of the region in which ambient light is blocked, and adjusting the display mode of the display device based on the first distance.

According to the foregoing technical solution, when the vehicle is to enter the region in which ambient light is blocked, the display mode of the display device is pre-adjusted based on the distance between the vehicle and the region in which ambient light is blocked, to effectively avoid an adjustment lag. This ensures that, when the vehicle enters the region in which ambient light is blocked, the display mode of the display device can better adapt to the region in which ambient light is blocked, without interfering with sight of the driver. This effectively reduces impact of an ambient light intensity change perceived by the driver or a passenger on sight, improves user experience, and ensures driving safety.

According to the first aspect or the foregoing possible implementations of the first aspect, in a third possible implementation of the first aspect, the display mode includes first display brightness, the light intensity information includes intensity of ambient light received by an optical element of the display device and/or intensity of ambient light corresponding to an imaging location of the display device, and adjusting a display mode of a display device of the vehicle based on the environment information further includes adjusting the first display brightness of the display device based on the intensity of the ambient light received by the optical element of the display device and/or the intensity of the ambient light corresponding to the imaging location of the display device, where the first display brightness is positively correlated with the intensity of the ambient light received by the optical element of the display device, and is positively correlated with the intensity of the ambient light corresponding to the imaging location of the display device.

According to the foregoing technical solution, ambient light reaching the optical element of the display device is reflected by the optical element and then enters eyes of the driver or the passenger along an optical path of the display device, affecting experience of watching the display device by the driver or the passenger. In addition, the ambient light corresponding to the imaging location of the display device also affects sight of the driver or the passenger. Therefore, impact of ambient light that comes from a plurality of sources on experience of watching the display device by the driver or the passenger is comprehensively considered, and the intensity of the ambient light received by the optical element of the display device is combined with the intensity of the ambient light corresponding to the imaging region of the display device, so that real light intensity of an image that is generated by the display device and that is observed by the driver or the passenger can be truly restored. Display brightness of the display device is automatically adjusted based on combined intensity of ambient light. Adjusted display brightness better adapts to real visual experience of eyes, and meets a requirement for clear display. This effectively resolves a problem that the driver or the passenger cannot clearly see an image generated by the display device because only ambient light that comes from a single source is considered, and improves driving safety. In addition, the driver or the passenger does not need to perform a manual operation. This improves user experience and has high practicability.

According to the first aspect or the foregoing possible implementations of the first aspect, in a fourth possible implementation of the first aspect, the light intensity information further includes intensity of ambient light corresponding to at least one imaging region of the display device, the display mode includes the display location, and the adjusting a display mode of a display device of the vehicle based on the environment information further includes determining a target imaging region based on the intensity of the ambient light corresponding to the at least one imaging region of the display device, and adjusting the display location of the display device based on the target imaging region.

According to the foregoing technical solution, the display location of the display device is dynamically adjusted based on the intensity of the ambient light corresponding to the at least one imaging region of the display device, to ensure that the driver can clearly see content displayed on the display device, avoid impact on sight of the driver due to excessively high or low intensity of the ambient light corresponding to the imaging region, and greatly improve driving safety.

According to the foregoing possible implementations of the first aspect, in a fifth possible implementation of the first aspect, adjusting the display mode of the display device based on the first distance further includes adjusting the display mode of the display device when the first distance is less than a preset distance.

According to the foregoing technical solution, when the distance between the vehicle and the region in which ambient light is blocked is less than the preset distance, it indicates that the vehicle is to enter the region in which ambient light is blocked. In this case, the display mode of the display device is pre-adjusted, so that the display mode adapts to the region in which ambient light is blocked when the vehicle reaches the region in which ambient light is blocked. This effectively avoids impact of an adjustment lag on sight of the driver or the passenger, and greatly improves driving safety.

According to the foregoing possible implementations of the first aspect, in a sixth possible implementation of the first aspect, the display mode includes second display brightness, and adjusting the display mode of the display device based on the first distance further includes adjusting the second display brightness based on the first distance, where the second display brightness is negatively correlated with the first distance.

According to the foregoing technical solution, in a process in which the vehicle is to enter the region in which ambient light is blocked, weighted correction is performed on the display brightness based on the first distance between the vehicle and the region in which ambient light is blocked. As the vehicle continuously approaches the region in which ambient light is blocked, the display brightness is continuously adjusted, so that the display brightness gradually decreases with a smooth transition. In addition, it is ensured that adjustment of the display brightness is completed before the vehicle reaches the region in which ambient light is blocked.

According to the foregoing possible implementations of the first aspect, in a seventh possible implementation of the first aspect, the display device includes a HUD, the light intensity information includes intensity of ambient light received by an optical element of an optical device of the HUD, and obtaining environment information corresponding to a vehicle includes obtaining an incidence angle corresponding to ambient light received at a light outlet of the optical device of the HUD, an emergence angle corresponding to emergent light of the HUD, and intensity of the ambient light received at the light outlet of the optical device of the HUD, and determining, based on the incidence angle, the emergence angle, and the intensity of the ambient light received at the light outlet, the intensity of the ambient light received by the optical element of the optical device of the HUD, where the intensity of the ambient light received by the optical element of the optical device of the HUD is positively correlated with the intensity of the ambient light received at the light outlet, and is negatively correlated with a difference between the incidence angle and the emergence angle.

According to the foregoing technical solution, the incidence angle of the ambient light and the intensity of the ambient light at the light outlet of the optical device of the HUD affect the intensity of the ambient light reaching the optical element of the optical device of the HUD. Therefore, the intensity of the ambient light received by the optical element of the optical device of the HUD is more accurately determined based on the intensity of the ambient light received at the light outlet of the optical device of the HUD and a deviation between the incidence angle of the ambient light and the emergence angle corresponding to the emergent light of the HUD.

According to the foregoing possible implementations of the first aspect, in an eighth possible implementation of the first aspect, the display device includes a HUD, the light intensity information includes intensity of ambient light received by an optical element of an optical device of the HUD, and obtaining environment information corresponding to a vehicle further includes determining a first included angle between the ambient light and a horizontal plane and a second included angle between a projection of the ambient light on the horizontal plane and a traveling direction of the vehicle, determining a third included angle between emergent light of the HUD and the horizontal plane and a fourth included angle between a projection of the emergent light of the HUD on the horizontal plane and the traveling direction of the vehicle, determining a first difference between the first included angle and the third included angle and a second difference between the second included angle and the fourth included angle, and determining, based on the first difference, the second difference, and intensity of ambient light received at a light outlet of the optical device of the HUD, the intensity of the ambient light received by the optical element of the optical device of the HUD, where the intensity of the ambient light received by the optical element of the optical device of the HUD is positively correlated with the intensity of the ambient light received at the light outlet of the optical device of the HUD, is negatively correlated with the first difference, and is negatively correlated with the second difference.

According to the foregoing technical solution, a deviation of the included angle between the ambient light and the horizontal plane relative to the included angle between the emergent light of the HUD and the horizontal plane, a deviation of the included angle between the projection of the ambient light on the horizontal plane and the traveling direction of the vehicle relative to the included angle between the projection of the emergent light of the HUD on the horizontal plane and the traveling direction of the vehicle, and the intensity of the ambient light at the light outlet of the optical device of the HUD affect the intensity of the ambient light reaching the optical element of the optical device of the HUD. Therefore, the intensity of the ambient light received by the optical element of the optical device of the HUD is more accurately determined based on the deviation of the included angle between the ambient light and the horizontal plane relative to the included angle between the emergent light of the HUD and the horizontal plane, the deviation of the included angle between the projection of the ambient light on the horizontal plane and the traveling direction of the vehicle relative to the included angle between the projection of the emergent light of the HUD on the horizontal plane and the traveling direction of the vehicle, and the intensity of the ambient light received at the light outlet of the optical device of the HUD.

According to the foregoing possible implementations of the first aspect, in a ninth possible implementation of the first aspect, obtaining environment information corresponding to a vehicle further includes obtaining image information in front of the vehicle and an eye location, and determining, based on the image information and the eye location, the intensity of the ambient light corresponding to the at least one imaging region of the display device.

According to the foregoing technical solution, intensity of ambient light corresponding to each imaging region of the display device is accurately determined based on the image information in front of the vehicle and the eye location. In some examples, an image in front of the vehicle may include a ground background corresponding to the at least one imaging region of the display device, the image information in front of the vehicle may include grayscale values of pixels in the image in front of the vehicle, and intensity of ambient light corresponding to an imaging region may include a grayscale value corresponding to the imaging region. In this way, a ground background corresponding to each imaging region can be accurately determined based on the eye location, and a grayscale value corresponding to each imaging region of the display device is obtained based on the grayscale values of the pixels in the image in front of the vehicle, so that the grayscale value corresponding to each imaging region of the display device is accurately determined.

According to the foregoing possible implementations of the first aspect, in a tenth possible implementation of the first aspect, the ambient light includes direct sunlight and/or sunlight reflected by a reflective object.

In some examples, both the direct sunlight and the sunlight reflected by the reflective object may reach the optical device of the HUD. After reaching the optical element of the optical device of the HUD, the sunlight is reflected by the optical element and is projected to a windshield along a reflection optical path through an opening of the optical device, and finally enters eyes of the driver. In this way, impact of ambient light that comes from a plurality of sources on experience of watching a virtual image plane of the HUD by the driver or the passenger is comprehensively considered, and intensity of the direct sunlight received by the optical element of the optical device of the HUD and intensity of the sunlight reflected by the reflective object are determined, to further improve effect of adjusting display brightness of the virtual image plane of the HUD.

According to the foregoing possible implementations of the first aspect, in an eleventh possible implementation of the first aspect, the method further includes obtaining a distance between a mark point corresponding to the region in which ambient light is blocked and the region in which ambient light is blocked, where the mark point is set beyond the region in which ambient light is blocked, and adjusting the display mode of the display device based on the first distance includes adjusting the display mode of the display device based on the first distance, the preset distance, and the distance between the mark point and the region in which ambient light is blocked.

According to the foregoing technical solution, the display mode of the display device is pre-adjusted based on the first distance, the preset distance, and the distance between the mark point and the region in which ambient light is blocked. In this way, adjustment of the display mode can be completed before the vehicle enters the region in which ambient light is blocked, and an adjusted display mode can better adapt to the region in which ambient light is blocked, to further improve driving safety.

According to a second aspect, an embodiment of this application provides an electronic apparatus, including an obtaining module configured to obtain environment information corresponding to a vehicle, where the environment information includes light intensity information and/or location information, and an adjustment module configured to adjust a display mode of a display device of the vehicle based on the environment information, where the display mode includes at least one of display brightness, a display location, display content, a display color, a display style, or a display size.

According to the foregoing technical solution, the environment information corresponding to the vehicle is obtained, and the display mode of the display device is adjusted based on the environment information, so that the display mode of the display device can adapt to a current environment, to improve display effect and driving safety.

According to the second aspect, in a first possible implementation of the second aspect, the location information includes a location of the vehicle and/or a location of a region in which ambient light is blocked in a traveling direction of the vehicle, and the adjustment module is further configured to adjust the display mode of the display device of the vehicle based on the location of the vehicle and/or the location of the region in which ambient light is blocked in the traveling direction of the vehicle.

According to the second aspect, in a second possible implementation of the second aspect, the location information includes a location of the vehicle and/or a location of a region in which ambient light is blocked in a traveling direction of the vehicle, and the adjustment module is further configured to determine a first distance between the vehicle and the region in which ambient light is blocked based on the location of the vehicle and/or the location of the region in which ambient light is blocked, and adjust the display mode of the display device based on the first distance.

According to the foregoing technical solution, when the vehicle is to enter the region in which ambient light is blocked, the display mode of the display device is pre-adjusted based on the distance between the vehicle and the region in which ambient light is blocked, to effectively avoid an adjustment lag. This ensures that, when the vehicle enters the region in which ambient light is blocked, the display mode of the display device can better adapt to the region in which ambient light is blocked, without interfering with sight of the driver. This effectively reduces impact of an ambient light intensity change perceived by the driver or a passenger on sight, improves user experience, and ensures driving safety.

According to the second aspect or the foregoing possible implementations of the second aspect, in a third possible implementation of the second aspect, the display mode includes first display brightness, the light intensity information includes intensity of ambient light received by an optical element of the display device and/or intensity of ambient light corresponding to an imaging location of the display device, and the adjustment module is further configured to adjust the first display brightness of the display device based on the intensity of the ambient light received by the optical element of the display device and/or the intensity of the ambient light corresponding to the imaging location of the display device, where the first display brightness is positively correlated with the intensity of the ambient light received by the optical element of the display device, and is positively correlated with the intensity of the ambient light corresponding to the imaging location of the display device.

According to the foregoing technical solution, ambient light reaching the optical element of the display device is reflected by the optical element and then enters eyes of the driver or the passenger along an optical path of the display device, affecting experience of watching the display device by the driver or the passenger. In addition, the ambient light corresponding to the imaging location of the display device also affects sight of the driver or the passenger. Therefore, impact of ambient light that comes from a plurality of sources on experience of watching the display device by the driver or the passenger is comprehensively considered, and the intensity of the ambient light received by the optical element of the display device is combined with the intensity of the ambient light corresponding to the imaging region of the display device, so that real light intensity of an image that is generated by the display device and that is observed by the driver or the passenger can be truly restored. Display brightness of the display device is automatically adjusted based on combined intensity of ambient light. Adjusted display brightness better adapts to real visual experience of eyes, and meets a requirement for clear display. This effectively resolves a problem that the driver or the passenger cannot clearly see an image generated by the display device because only ambient light that comes from a single source is considered, and improves driving safety. In addition, the driver or the passenger does not need to perform a manual operation. This improves user experience and has high practicability.

According to the second aspect or the foregoing possible implementations of the second aspect, in a fourth possible implementation of the second aspect, the light intensity information further includes intensity of ambient light corresponding to at least one imaging region of the display device, the display mode includes the display location, and the adjustment module is further configured to determine a target imaging region based on the intensity of the ambient light corresponding to the at least one imaging region of the display device, and adjust the display location of the display device based on the target imaging region.

According to the foregoing technical solution, the display location of the display device is dynamically adjusted based on the intensity of the ambient light corresponding to the at least one imaging region of the display device, to ensure that the driver can clearly see content displayed on the display device, avoid impact on sight of the driver due to excessively high or low intensity of the ambient light corresponding to the imaging region, and greatly improve driving safety.

According to the foregoing possible implementations of the second aspect, in a fifth possible implementation of the second aspect, the adjustment module is further configured to adjust the display mode of the display device when the first distance is less than a preset distance.

According to the foregoing technical solution, when the distance between the vehicle and the region in which ambient light is blocked is less than the preset distance, it indicates that the vehicle is to enter the region in which ambient light is blocked. In this case, the display mode of the display device is pre-adjusted, so that the display mode adapts to the region in which ambient light is blocked when the vehicle reaches the region in which ambient light is blocked. This effectively avoids impact of an adjustment lag on sight of the driver or the passenger, and greatly improves driving safety.

According to the foregoing possible implementations of the second aspect, in a sixth possible implementation of the second aspect, the display mode includes second display brightness, and the adjustment module is further configured to adjust the second display brightness based on the first distance, where the second display brightness is negatively correlated with the first distance.

According to the foregoing technical solution, in a process in which the vehicle is to enter the region in which ambient light is blocked, weighted correction is performed on the display brightness based on the first distance between the vehicle and the region in which ambient light is blocked. As the vehicle continuously approaches the region in which ambient light is blocked, the display brightness is continuously adjusted, so that the display brightness gradually decreases with a smooth transition. In addition, it is ensured that adjustment of the display brightness is completed before the vehicle reaches the region in which ambient light is blocked.

According to the foregoing possible implementations of the second aspect, in a seventh possible implementation of the second aspect, the display device includes a HUD, the light intensity information includes intensity of ambient light received by an optical element of an optical device of the HUD, and the obtaining module is further configured to obtain an incidence angle corresponding to ambient light received at a light outlet of the optical device of the HUD, an emergence angle corresponding to emergent light of the HUD, and intensity of the ambient light received at the light outlet of the optical device of the HUD, and determine, based on the incidence angle, the emergence angle, and the intensity of the ambient light received at the light outlet, the intensity of the ambient light received by the optical element of the optical device of the HUD, where the intensity of the ambient light received by the optical element of the optical device of the HUD is positively correlated with the intensity of the ambient light received at the light outlet, and is negatively correlated with a difference between the incidence angle and the emergence angle.

According to the foregoing technical solution, the incidence angle of the ambient light and the intensity of the ambient light at the light outlet of the optical device of the HUD affect the intensity of the ambient light reaching the optical element of the optical device of the HUD. Therefore, the intensity of the ambient light received by the optical element of the optical device of the HUD is more accurately determined based on the intensity of the ambient light received at the light outlet of the optical device of the HUD and a deviation between the incidence angle of the ambient light and the emergence angle corresponding to the emergent light of the HUD.

According to the foregoing possible implementations of the second aspect, in an eighth possible implementation of the second aspect, the display device includes a HUD, the light intensity information includes intensity of ambient light received by an optical element of an optical device of the HUD, and the obtaining module is further configured to determine a first included angle between the ambient light and a horizontal plane and a second included angle between a projection of the ambient light on the horizontal plane and a traveling direction of the vehicle, determine a third included angle between emergent light of the HUD and the horizontal plane and a fourth included angle between a projection of the emergent light of the HUD on the horizontal plane and the traveling direction of the vehicle, determine a first difference between the first included angle and the third included angle and a second difference between the second included angle and the fourth included angle, and determine, based on the first difference, the second difference, and intensity of ambient light received at a light outlet of the optical device of the HUD, the intensity of the ambient light received by the optical element of the optical device of the HUD, where the intensity of the ambient light received by the optical element of the optical device of the HUD is positively correlated with the intensity of the ambient light received at the light outlet of the optical device of the HUD, is negatively correlated with the first difference, and is negatively correlated with the second difference.

According to the foregoing technical solution, a deviation of the included angle between the ambient light and the horizontal plane relative to the included angle between the emergent light of the HUD and the horizontal plane, a deviation of the included angle between the projection of the ambient light on the horizontal plane and the traveling direction of the vehicle relative to the included angle between the projection of the emergent light of the HUD on the horizontal plane and the traveling direction of the vehicle, and the intensity of the ambient light at the light outlet of the optical device of the HUD affect the intensity of the ambient light reaching the optical element of the optical device of the HUD. Therefore, the intensity of the ambient light received by the optical element of the optical device of the HUD is more accurately determined based on the deviation of the included angle between the ambient light and the horizontal plane relative to the included angle between the emergent light of the HUD and the horizontal plane, the deviation of the included angle between the projection of the ambient light on the horizontal plane and the traveling direction of the vehicle relative to the included angle between the projection of the emergent light of the HUD on the horizontal plane and the traveling direction of the vehicle, and the intensity of the ambient light received at the light outlet of the optical device of the HUD.

According to the foregoing possible implementations of the second aspect, in a ninth possible implementation of the second aspect, the obtaining module is further configured to obtain image information in front of the vehicle and an eye location, and determine, based on the image information and the eye location, the intensity of the ambient light corresponding to the at least one imaging region of the display device.

In some examples, an image in front of the vehicle may include a ground background corresponding to the at least one imaging region of the display device, the image information in front of the vehicle may include grayscale values of pixels in the image in front of the vehicle, and intensity of ambient light corresponding to an imaging region may include a grayscale value corresponding to the imaging region. In this way, a ground background corresponding to each imaging region can be accurately determined based on the eye location, and a grayscale value corresponding to each imaging region of the display device is obtained based on the grayscale values of the pixels in the image in front of the vehicle, so that intensity of ambient light corresponding to each imaging region of the display device is accurately determined.

According to the foregoing possible implementations of the second aspect, in a tenth possible implementation of the second aspect, the ambient light includes direct sunlight and/or sunlight reflected by a reflective object.

In some examples, both the direct sunlight and the sunlight reflected by the reflective object may reach the optical device of the HUD. After reaching the optical element of the optical device of the HUD, the sunlight is reflected by the optical element and is projected to a windshield along a reflection optical path through an opening of the optical device, and finally enters eyes of the driver. In this way, impact of ambient light that comes from a plurality of sources on experience of watching a virtual image plane of the HUD by the driver or the passenger is comprehensively considered, and intensity of the direct sunlight received by the optical element of the optical device of the HUD and intensity of the sunlight reflected by the reflective object are determined, to further improve effect of adjusting display brightness of the virtual image plane of the HUD.

According to the foregoing possible implementations of the second aspect, in an eleventh possible implementation of the second aspect, the obtaining module is further configured to obtain a distance between a mark point corresponding to the region in which ambient light is blocked and the region in which ambient light is blocked, where the mark point is set beyond the region in which ambient light is blocked, and the adjustment module is further configured to adjust the display mode of the display device based on the first distance, the preset distance, and the distance between the mark point and the region in which ambient light is blocked.

According to the foregoing technical solution, the display mode of the display device is pre-adjusted based on the first distance, the preset distance, and the distance between the mark point and the region in which ambient light is blocked. In this way, adjustment of the display mode can be completed before the vehicle enters the region in which ambient light is blocked, and an adjusted display mode can better adapt to the region in which ambient light is blocked, to further improve driving safety.

According to a third aspect, an embodiment of this application provides an electronic apparatus, including a processor, and a memory configured to store executable instructions of the processor, where the processor is configured to execute the instructions to implement the technical solution provided in any one of the first aspect or the possible implementations of the first aspect.

According to a fourth aspect, an embodiment of this application provides an electronic apparatus, including a storage unit configured to store program instructions, and a processing unit configured to execute the program instructions in the storage unit to implement the technical solution provided in any one of the first aspect or the possible implementations of the first aspect.

According to a fifth aspect, an embodiment of this application provides a display system, including a display device, a capture device configured to capture environment information, and the electronic apparatus provided in any one of the second aspect to the fourth aspect or the possible implementations of the second aspect to the fourth aspect.

In an example, the display system may be a vehicle, a display system including an automobile head unit and a display device, or a display device having a processor and a display. For example, the display device may be a device with a display capability in a vehicle-mounted component such as a HUD, an AR-HUD, or a display, and the capture device may be a sensing apparatus with a capture or measurement function.

According to a sixth aspect, an embodiment of this application provides a computer-readable storage medium. The computer-readable storage medium stores program code. The program code is executed by an electronic apparatus or a processor in an electronic apparatus to implement the technical solution provided in any one of the first aspect or the possible implementations of the first aspect.

According to a seventh aspect, an embodiment of this application provides a computer program product. Program code included in the computer program product is executed by an electronic apparatus or a processor in an electronic apparatus to implement the technical solution provided in any one of the first aspect or the possible implementations of the first aspect.

It should be understood that, for corresponding technical effect and technical implementation details of the technical solutions provided in the second aspect to the seventh aspect and any corresponding possible implementation, reference may be made to the technical effect and the technical implementation details of the technical solutions provided in the first aspect. Details are not described herein again.

BRIEF DESCRIPTION OF DRAWINGS

Accompanying drawings included in this specification as a part of this specification, together with this specification, show example embodiments, features, and aspects of this application, and are used to explain principles of this application, but not to limit the scope of embodiments of this application.

DESCRIPTION OF EMBODIMENTS

Figure 1:
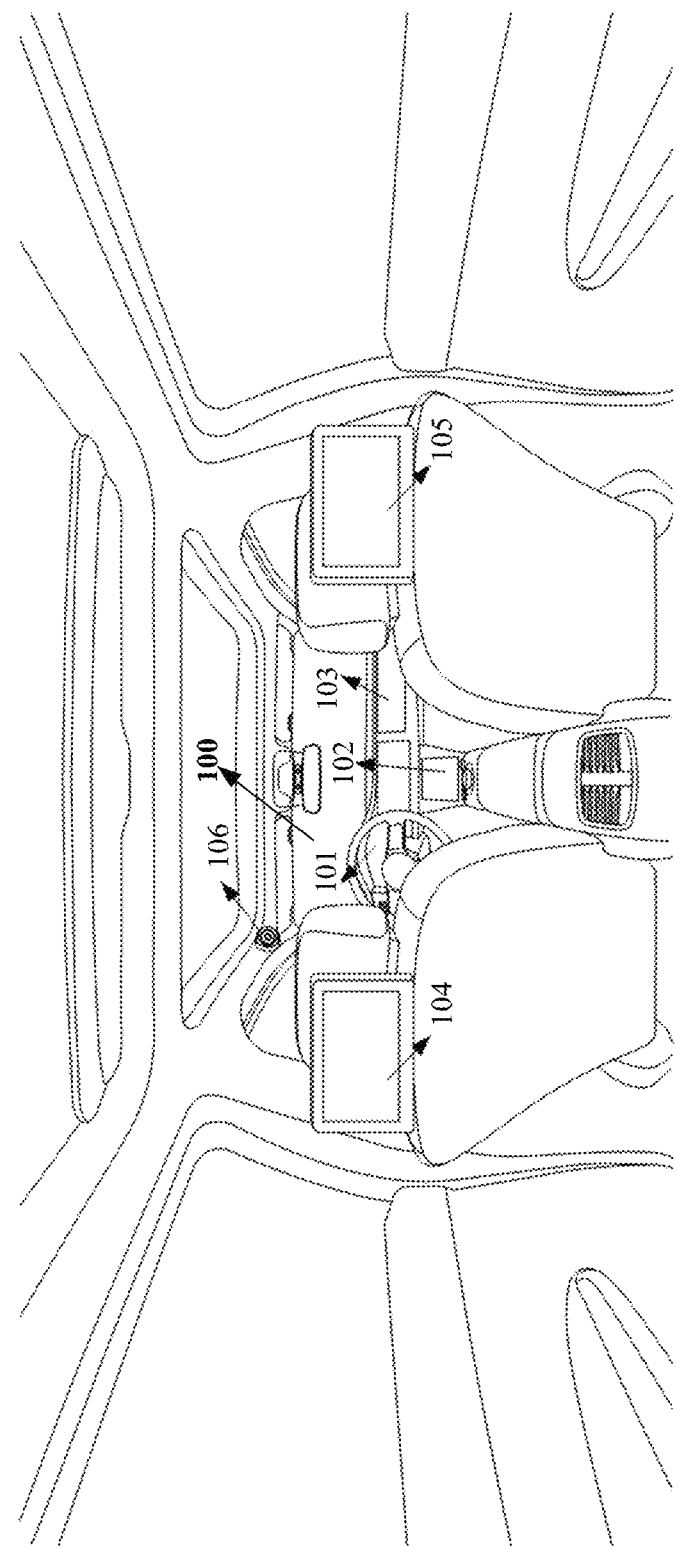
FIG. 1 is a schematic diagram of a structure of a cockpit of a vehicle according to an embodiment of this application.

The following describes example embodiments, features, and aspects of this application in detail with reference to accompanying drawings. Identical reference signs in accompanying drawings indicate elements with same or similar functions. Although various aspects of embodiments are shown in accompanying drawings, accompanying drawings do not need to be drawn to scale, unless otherwise specified.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment, but mean "one or more but not all of embodiments", unless otherwise emphasized in another manner. The terms "include", "comprise", "have", and their variants all mean "include but are not limited to", unless otherwise emphasized in another manner.

In this application, "at least one" means one or more, and "a plurality of" means two or more. "And/or" describes an association relationship between associated objects and indicates that three relationships may exist. For example, A and/or B may indicate the following three cases: only A exists, both A and B exist, and only B exists, where A and B may be singular or plural. The character "/" usually indicates an "or" relationship between the associated objects. "At least one of the following items" or a similar expression thereof indicates any combination of the items, including one of the items or any combination of a plurality of the items. For example, at least one of a, b, or c may indicate a, b, c, a and b, a and c, b and c, or a, b, and c, where a, b, and c may be singular or plural.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

The specific term "example" herein means "being used as an example, embodiment, or illustration". Any embodiment described as an "example" herein is not necessarily construed as being superior to or better than other embodiments.

In addition, to better describe this application, many specific details are given in the following specific implementations. A person skilled in the art should understand that this application can also be implemented without some specific details.

Figure 2:
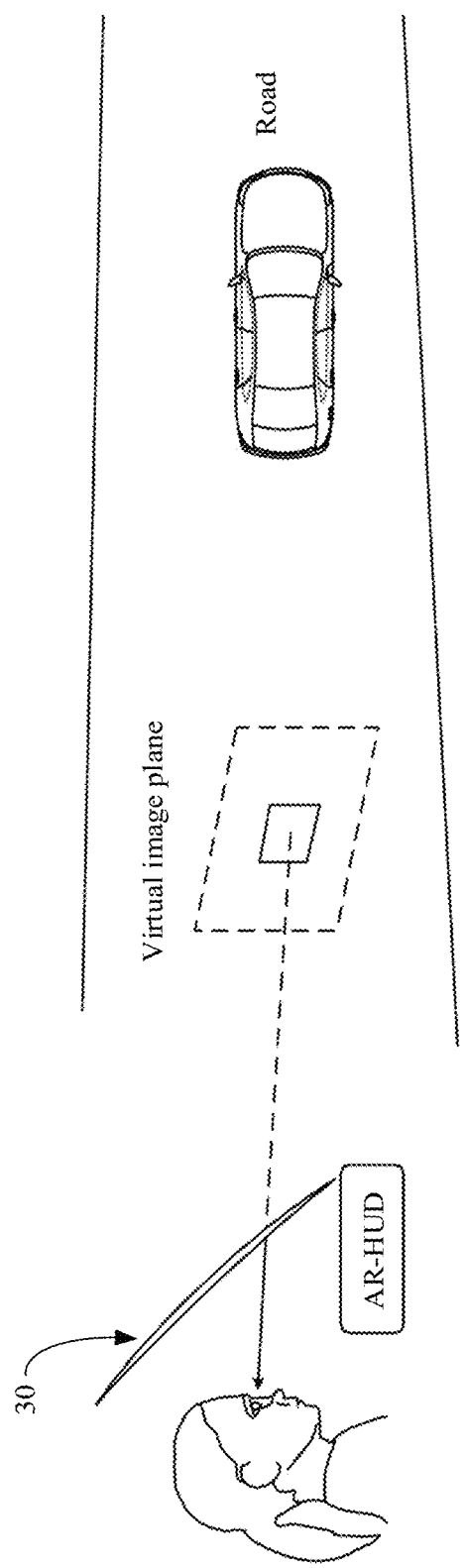
FIG. 2, FIG. 3, and FIG. 4 are schematic diagrams of an application scenario according to an embodiment of this application.
Figure 3:
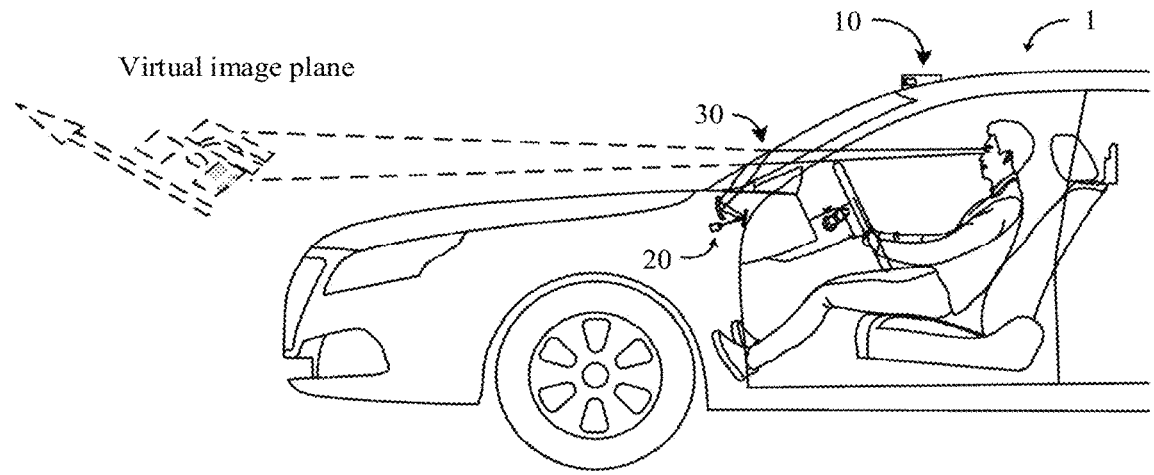
Figure 4:
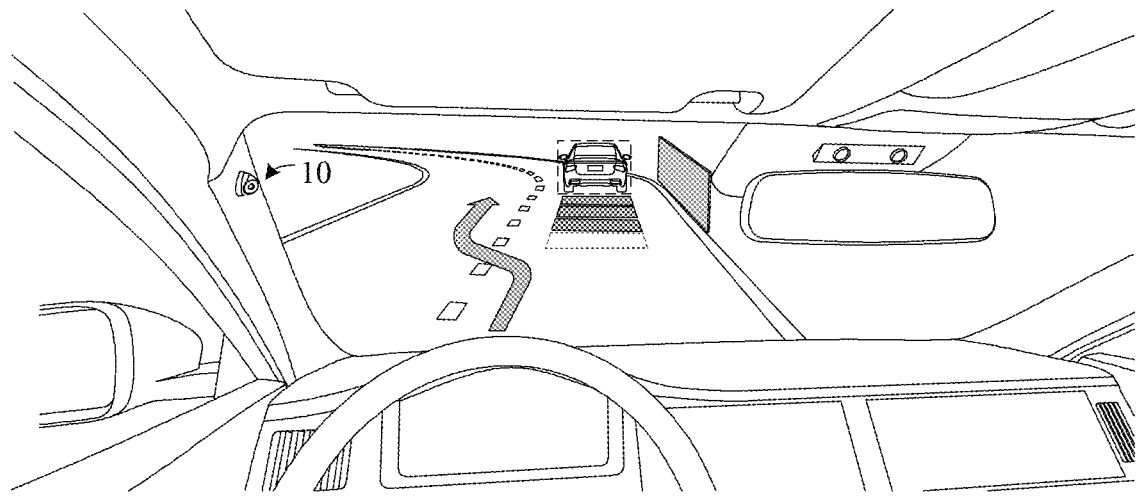

FIG. 1 is a schematic diagram of a structure of a cockpit of a vehicle according to an embodiment of this application. In the cockpit of the vehicle, an automobile head unit, also referred to as an in-vehicle audio and video entertainment system, may be disposed in a central control region of the vehicle, and a screen connected to the automobile head unit may also be referred to as a central control display or a central control screen. With gradual expansion of digital display in cockpits, in some vehicles, a plurality of displays or a large screen that supports split-screen are disposed in a cockpit, to display content such as a digital dashboard, an in-vehicle entertainment system, and related information. As shown in FIG. 1, a plurality of displays are disposed in the cockpit, including a digital instrument display 101, a central control screen 102, an entertainment display 103 in front of a passenger in a co-driver seat, and entertainment displays 104 and 105 in front of passengers in rear seats. To implement different visual functions in the cockpit, a plurality of independent cameras 106 may be usually mounted at different locations in the cockpit, for example, at locations such as an A-pillar, a B-pillar, a steering pillar, a central control region, an internal rearview mirror region, and a steering wheel region. In addition, one or more display devices with a projection function, such as a HUD, an AR-HUD, or another type of projector, may be further disposed in the cockpit. The HUD is a display device for projecting an image into a front field of view of a driver or a passenger. The HUD may project, according to a principle of optical reflection, important related information in a form of a two-dimensional image to a front windshield of a vehicle or an independently displayed transparent screen. As shown in FIG. 1, the two-dimensional image may be projected to a windshield 100 at a height roughly horizontal to eyes of the driver or the passenger. When looking forward through the windshield 100, the driver or the passenger may see that the two-dimensional image projected by the HUD is displayed on a virtual image plane in front of the windshield 100. Compared with a conventional instrument and central control screen, the driver or the passenger does not need to lower the head when observing the image of the HUD. This avoids frequent switching between the image and a road surface, reduces emergency response time, and improves driving safety. In addition, the AR-HUD may integrate the image displayed by the HUD and real road surface information to enhance obtaining of the road information by the driver or the passenger and implement functions such as virtual display (or AR) navigation and AR warning. FIG. 2 to FIG. 4 are schematic diagrams of an application scenario according to an embodiment of this application. As shown in FIG. 2 to FIG. 4, the application scenario in this embodiment may include a vehicle, and the vehicle 1 has a capture device 10, a display device 20, and an imaging device 30.

For example, the capture device 10 may include an out-of-vehicle capture device and an in-vehicle capture device. The out-of-vehicle capture device may be a sensing apparatus with a capture or measurement function, for example, may be a lidar, an infrared sensor, a brightness sensor, a vehicle-mounted camera, a digital video recorder (DVR), or one or a combination of other devices with an image capture, optical scanning, or light intensity detection function. The out-of-vehicle capture device may be disposed on the top or at the head of the vehicle 1, or on a side, facing the outside of the vehicle, of a rearview mirror in a cockpit of the vehicle, and may be mounted in the vehicle or outside the vehicle. The out-of-vehicle capture device is mainly configured to detect and capture environment information in front of the vehicle 1. An environment in front of the vehicle 1 may include one or more of related information such as a road surface in front, a vehicle in front, an obstacle, a road sign (for example, a sign for a tunnel, an overpass, or an elevated highway), and ambient light. For example, location information of the environment in front of the vehicle 1 may be detected by the lidar, light intensity information of the environment in front of the vehicle 1 may be further cap-
tured by the brightness sensor, and image information of the environment in front of the vehicle 1 may be further captured by the vehicle-mounted camera or the DVR. The in-vehicle capture device may be a device such as a vehicle-mounted camera or an eye detector. During specific implementation, a mounting location of the in-vehicle capture device may be set according to a requirement. For example, the in-vehicle capture device may be disposed at the A-pillar or the B-pillar in the cockpit of the vehicle, or on a side, facing the driver or the passenger, of the rearview mirror in the cockpit of the vehicle, or may be disposed in a region near a steering wheel or a center console, or may be disposed above a display behind a seat. The in-vehicle capture device is mainly configured to detect and capture eye location information of the driver or the passenger in the cockpit of the vehicle. There may be one or more in-vehicle capture devices. A mounting location, a quantity, a type, and the like of in-vehicle capture devices are not limited in this embodiment of this application.

For example, the display device 20 may be a HUD, an AR-HUD, or another device with a projection function, and may be mounted above or inside the center console in the cockpit of the vehicle. The display device 20 may usually include one or more of a projector, a reflector, a projection mirror, an adjustment motor, and a control unit. The control unit is an electronic device, and may be a conventional chip processor such as a central processing unit (CPU) or a microprocessor (or microcontroller unit (MCU)), or may be terminal hardware such as a mobile phone or a tablet computer. The control unit may be communicatively connected to the capture device 10. An imaging model may be preset in the control unit, or the control unit may obtain an imaging model preset in another device of the vehicle. A parameter of the imaging model is associated with the eye location information captured by the in-vehicle capture device, and the parameter can be calibrated based on the eye location information. Then a to-be-projected image is generated based on the environment information captured by the out-of-vehicle capture device, and is output on the projector. As shown in FIG. 3, the projected image may include an augmented reality display image generated based on the environment information, and may further include images of a vehicle speed, navigation, and the like, or may include some prompt information, vehicle status information, or the like, for example, a battery level.

For example, the imaging device 30 may be a front windshield of the vehicle or an independently displayed transparent screen, and is configured to reflect image light transmitted by the display device 20 to eyes of the driver or the passenger, so that the driver or the passenger can see a virtual image with depth-of-field effect when looking out of the vehicle through the imaging device 30. In addition, the virtual image blends with a real-world environment, to present augmented reality display effect to the driver or the passenger.

For example, the capture device 10, the display device 20, and other devices may perform data communication through wired communication or wireless communication (for example, BLUETOOTH or WI-FI). For example, after capturing the environment information, the capture device 10 may transmit the environment information to the display device 20 through BLUETOOTH communication. For another example, the display device 20 may send control signaling to the capture device 10 through BLUETOOTH communication, and adjust a capture parameter, for example, a shooting angle, of the capture device 10. It should be understood that data processing may be completed in the display device 20, the capture device 10, or another processing device, for example, a device such as the automobile head unit or a vehicle-mounted computer.

According to the foregoing structure, as shown in FIG. 4, a vehicle can implement augmented reality display effect based on real-world environment information, and can adjust a generated projected image based on eye location information of a driver or a passenger, so that an augmented reality display image displayed through projection blends with the real-world environment information as much as possible, to improve immersive visual experience of the driver or the passenger.

This application provides a display method (for details, refer to the following descriptions). According to the display method in embodiments of this application, environment information corresponding to a vehicle can be obtained, and a display mode of a display device is adjusted based on the environment information. The method may be performed by one or more apparatuses, so that the display mode of the display device can adapt to a current environment, to improve display effect and driving safety.

A type of the apparatus for performing the display method is not limited in embodiments of this application. For example, the apparatus for performing the display method may be the vehicle 1, or another component with a data processing function in the vehicle 1, for example, a vehicle-mounted terminal, a vehicle-mounted controller, a vehicle-mounted module, a vehicle-mounted assembly, a vehicle-mounted component, a vehicle-mounted chip, a vehicle-mounted unit, or a vehicle-mounted sensor. The vehicle 1 may perform the display method by using the vehicle-mounted terminal, the vehicle-mounted controller, the vehicle-mounted module, the vehicle-mounted assembly, the vehicle-mounted component, the vehicle-mounted chip, the vehicle-mounted unit, the vehicle-mounted sensor, or the like. For example, the apparatus for performing the display method may alternatively be an intelligent terminal with a data processing capability other than the vehicle 1, or a component or a chip disposed in an intelligent terminal. The intelligent terminal may be a general-purpose device or a dedicated device. During specific implementation, the intelligent terminal may include a desktop computer, a portable computer, a network server, a palmtop computer (or personal digital assistant (PDA)), a mobile phone, a tablet computer, a wireless terminal device, an embedded device, or another device with a data processing function. For example, the apparatus for performing the display method may alternatively be a chip or a processor with a processing function, and the apparatus for performing the display method may include a plurality of processors. The processor may be a single-core processor or a multi-core processor.

In an example, the apparatus for performing the display method may include one or more of a display device, a processing apparatus, or a control apparatus. For example, the processing apparatus and the control apparatus may be apparatuses such as a processor and a controller. The display device, the processing apparatus, and the control apparatus may be separately disposed, or may be integrated into one device. The display device may be a device with a display capability in a vehicle-mounted component such as a HUD, an AR-HUD, or a display. For example, the display device may be the display device 20 in FIG. 3. The processing apparatus may be configured to obtain environment information for processing. For example, the processing apparatus may be the display device 20 or the capture device 10 in FIG. 3, or may be a device such as an automobile head unit or a vehicle-mounted computer. The control apparatus may be further configured to control a display mode of the display device. For example, the control apparatus may be the display device 20 in FIG. 3.

It should be noted that the foregoing application scenarios described in embodiments of this application are intended to describe technical solutions in embodiments of this application more clearly, and do not constitute a limitation on technical solutions provided in embodiments of this application. A person of ordinary skill in the art may know that technical solutions provided in embodiments of this application are also applicable to a similar technical problem.

The following describes in detail the display method provided in embodiments of this application.

Figure 5:
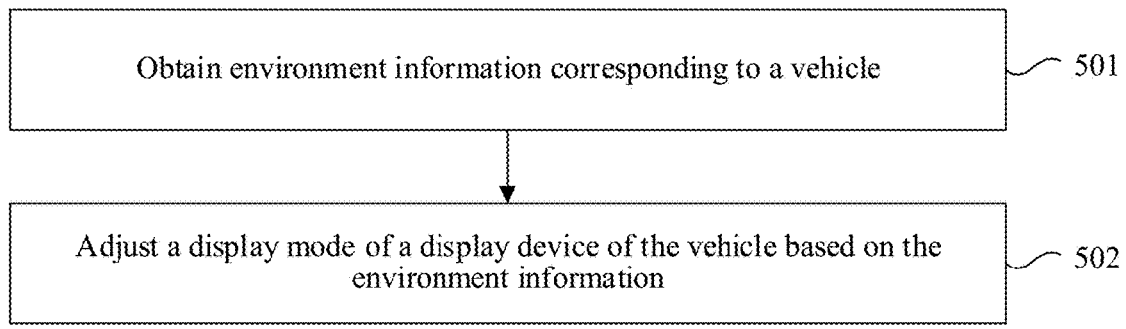
FIG. 5 is a flowchart of a display method according to an embodiment of this application.

FIG. 5 is a flowchart of a display method according to an embodiment of this application. As shown in FIG. 5, the method may include the following steps.

Step 501: Obtain environment information corresponding to a vehicle, where the environment information may include light intensity information and/or location information.

In an example, the light intensity information may include one or more of display brightness of a display device, intensity of ambient light corresponding to an imaging region of the display device, intensity of ambient light received by an optical element of the display device, intensity of ambient light corresponding to an imaging location of the display device, and the like. For example, the display device may be a HUD, and the light intensity information may include one or more of intensity of emergent light of an optical device of the HUD, intensity of ambient light received by an optical element of the optical device of the HUD, and intensity of ambient light corresponding to a virtual image plane of the HUD. In another example, the light intensity information may include intensity of ambient light corresponding to at least one imaging region of the display device, for example, may include intensity of ambient light corresponding to each imaging region on the virtual image plane of the HUD. For example, the light intensity information may be information directly captured by a brightness sensor, or may be information processed by the brightness sensor or another apparatus.

For example, the display device may be a vehicle-mounted display, for example, may be the digital instrument display 101, the central control screen 102, the display 103, the display 104, or the display 105 in FIG. 1, or the display device may be a HUD, an AR-HUD, or another device with a projection function, for example, may be the display device 20 in FIG. 3. The display device may alternatively be a vehicle atmosphere lamp, for example, may be an atmosphere lamp disposed at the following location in the vehicle: a steering wheel, a center console, a footlight, a cup holder, a vehicle roof, a courtesy light, a scuff plate, a vehicle door, a trunk, or a vehicle light.

For example, the ambient light may include direct sunlight and/or sunlight reflected by a reflective object. The reflective object may include a ground, a building with a glass wall, or the like.

In an example, the location information may include a location of the vehicle and a location of an environment in front of the vehicle. For example, the location of the vehicle may include a positioning location of the vehicle, for example, Global Positioning System (GPS) or longitude/latitude information. The location of the vehicle may further include a scenario in which the vehicle is currently located, for example, in a tunnel, under an elevated highway, on an expressway, or on a smooth road. For example, the location of the environment in front of the vehicle may include one or more of a location of a region in which ambient light is blocked in a traveling direction of the vehicle, a location of a mark point corresponding to the region in which ambient light is blocked, a location of the reflective object, and the like. For example, the region in which ambient light is blocked may include one or more of an overpass, a tunnel, an elevated highway, and the like. A location of a region in which ambient light is blocked, such as an overpass, a tunnel, or an elevated highway, within a specific range in front of the vehicle or a location of a mark point corresponding to the region in which ambient light is blocked, and a location of a building with a glass wall within a specific range in front of the vehicle, which are marked in a navigation map or sensed by a vehicle-mounted sensor in real time, may be obtained.

For example, in some scenarios, time information may be further obtained. The time information may include one or more of a current time point, a current season, estimated time of arrival at a destination, estimated time of arrival at the region in which ambient light is blocked, estimated time of arrival at the mark point corresponding to the region in which ambient light is blocked, and the like.

Step 502: Adjust a display mode of the display device of the vehicle based on the environment information, where the display mode may include at least one of display brightness, a display location, display content, a display color, a display style, or a display size.

In an example, the display brightness of the display device may be adjusted based on the environment information. For example, during traveling of the vehicle, when intensity of ambient light changes abruptly or is to change abruptly as predicted, display brightness for the vehicle may be adjusted. For example, when it is determined, based on a location of the vehicle and a location of a tunnel or based on estimated time of arrival at the tunnel, that the vehicle is to enter the tunnel, the display brightness of the display device may be correspondingly pre-decreased, so that the display brightness adapts to dim light in the tunnel. For example, in a scenario in which it is determined that sunlight affects visual experience of a driver or a passenger and the driver or the passenger cannot clearly see a road surface in front or sees a light spot, the display brightness of the display device is adjusted. For example, the display brightness of the display device may be increased when both intensity of sunlight received by an optical element of the display device and intensity of sunlight corresponding to an image location of the display device are high.

In another example, the display location of the display device may be adjusted based on the environment information. For example, the display location of the display device may be adjusted, based on intensity of ambient light corresponding to a plurality of imaging regions of the display device, from an imaging region in which intensity of ambient light is excessively high or low to an imaging region in which intensity of ambient light does not cause interference to sight of the driver or the passenger. For example, when strong sunlight is irradiated at a current display location, the display location may be adjusted, based on intensity of sunlight corresponding to each imaging region, to an imaging region in which weak sunlight is irradiated.

In another example, the display content of the display device may be adjusted based on the environment information. For example, the display content may include one or more of an instrument, road condition information (for example, information about a pedestrian, a vehicle, or an obstacle), road information (for example, speed limiting information or signal light status information), navigation information, entertainment information, prompt information, or the like. For example, when the vehicle travels in a road section in which intensity of ambient light is high, light is good, and the display content may be adjusted to be richer. However, after the vehicle enters a road section in which intensity of ambient light is low, for example, a tunnel, light is dim, and the driver needs to focus more on driving. In this case, the display content may be adjusted to be simpler to avoid distraction of the driver and ensure driving safety, or the display content may be adjusted to be prompt information to prompt the driver to drive carefully.

In another example, the display color of the display device may be adjusted based on the environment information. For example, when the vehicle is to enter a tunnel, a color of an atmosphere lamp in the vehicle may be pre-adjusted. For example, the color of the atmosphere lamp may be adjusted to a darker color.

In another example, the display style of the display device may be adjusted based on the environment information. For example, the display style may include one or more of a simple style, a rich style, and the like. Display content, a display icon, and the like corresponding to the simple style are fewer and simpler. When the vehicle travels in a road section in which intensity of ambient light is low, the display style may be adjusted to the simple style.

Figure 6:
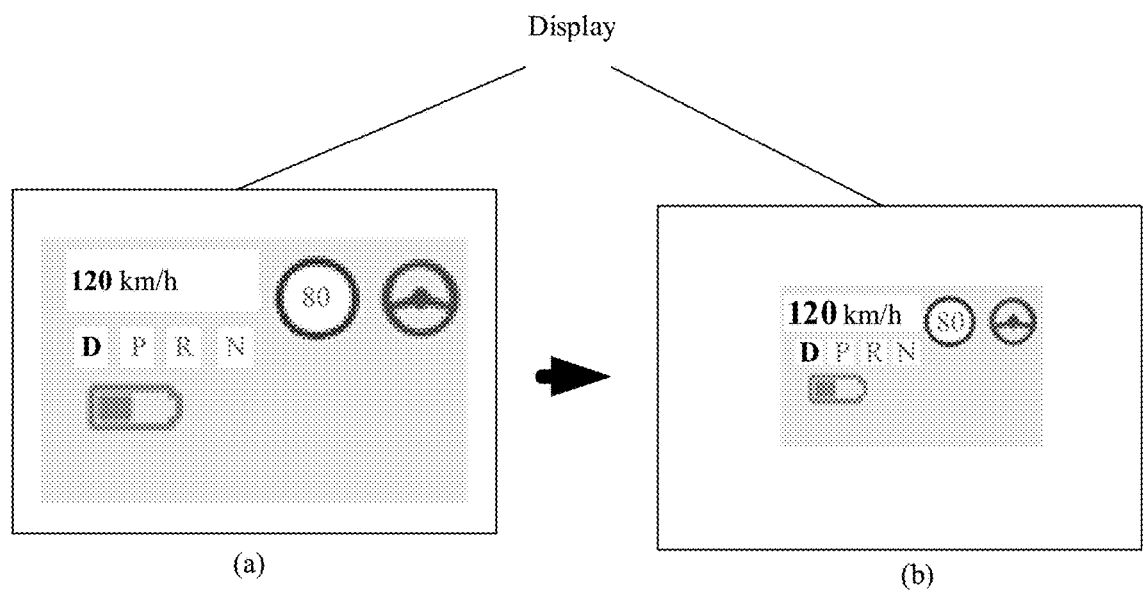
FIG. 6 is a schematic diagram of adjusting a display size according to an embodiment of this application.

In another example, the display size of the display device may be adjusted based on the environment information. For example, the display size may include a size of one or more of an image, an icon, text, and the like displayed on the display device. For example, when the vehicle enters a tunnel, light becomes dim, and a size of an image, an icon, text, or the like that is displayed may be reduced, to reduce blocking of sight of the driver. For example, FIG. 6 is a schematic diagram of adjusting a display size according to an embodiment of this application. As shown in FIG. 6, before the vehicle enters a tunnel, an image, an icon, text, and the like displayed on a display are shown in (a) in FIG. 6. When the vehicle enters the tunnel, sizes of the image, the icon, the text, and the like displayed on the display are reduced, as shown in (b) in FIG. 6, to reduce impact on sight of the driver. For example, when the vehicle leaves the tunnel, the image, the icon, and the text displayed on the display may be adjusted to original sizes, for example, may be adjusted from sizes of the image, the icon, and the text shown in (b) in FIG. 6 to sizes of the image, the icon, and the text shown in (a) in FIG. 6.

In this embodiment of this application, the environment information corresponding to the vehicle is obtained, and the display mode of the display device is adjusted based on the environment information, so that the display mode of the display device can adapt to a current environment. This effectively reduces impact of a change of the environment information on visual experience of the driver or the passenger, and improves display effect and driving safety.

The following describes the display method provided in embodiments of this application by using an example in which location information includes a location of a vehicle and/or a location of a region in which ambient light is blocked in a traveling direction of the vehicle.

Figure 7:
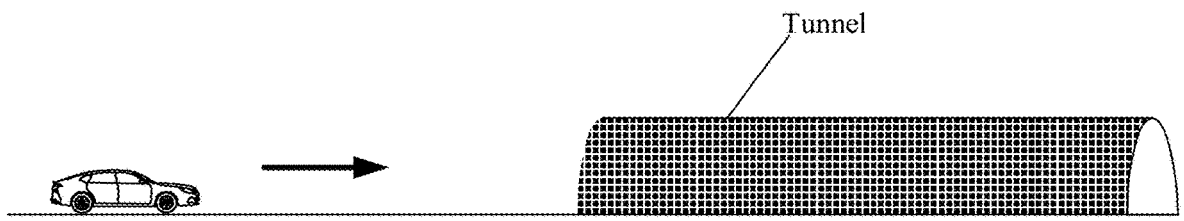
FIG. 7 is a schematic diagram of a region in which ambient light is blocked according to an embodiment of this application.

During traveling of the vehicle, when the vehicle enters a region in which ambient light is blocked from a region in which ambient light is not blocked, intensity of ambient light changes abruptly. A display mode of a display device that is used in the region in which ambient light is not blocked cannot well adapt to the region in which ambient light is blocked, and needs to be adjusted. For example, the display device is a HUD. FIG. 7 is a schematic diagram of a region in which ambient light is blocked according to an embodiment of this application. As shown in FIG. 7, when the vehicle enters a tunnel at daytime, light changes abruptly. Compared with ambient light outside the tunnel, intensity of ambient light in the tunnel suddenly decreases, and display brightness of the HUD needs to be adjusted. Because a vehicle speed is usually high, a distance between a virtual image plane of the HUD and a vehicle front is usually within 10 meters, and time between a moment at which it is detected that light intensity near the virtual image plane becomes weak and a moment at which the HUD interferes with sight of the driver is quite short. If brightness of the virtual image plane of the HUD is adjusted manually by the driver or the passenger or when it is detected that the light intensity near the virtual image plane becomes weak, it cannot be ensured that adjustment of the display brightness of the HUD is completed before the vehicle enters the tunnel, causing an adjustment lag. Consequently, after the vehicle enters the tunnel, the bright virtual image plane blocks sight of the driver. This increases a danger of driving.

Figure 8:
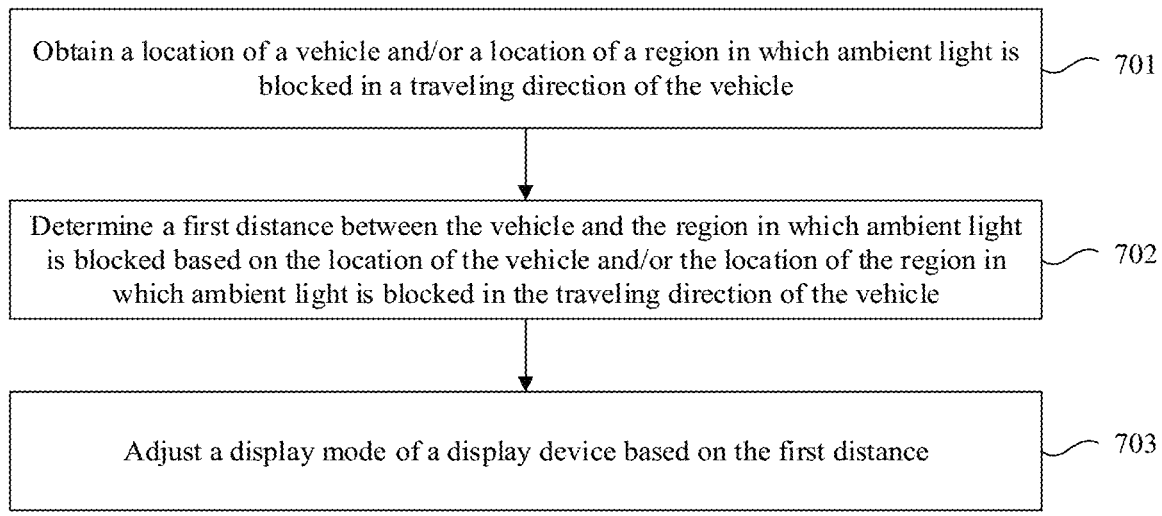
FIG. 8 is a flowchart of a display method according to an embodiment of this application.

FIG. 8 is a flowchart of a display method according to an embodiment of this application. The display method may be applied to a processing apparatus. The processing apparatus may be a processor, a processing chip, a display device, or a vehicle-mounted apparatus or a vehicle with a processing function. The processor or the processing chip may be located in a display device or a vehicle-mounted apparatus, or may communicate with a display device a vehicle-mounted apparatus in a wired or wireless manner, for example, may be a processor of a HUD or a processor of an automobile head unit. As shown in FIG. 8, the method may include the following steps.

Step 701: Obtain a location of a vehicle and/or a location of a region in which ambient light is blocked in a traveling direction of the vehicle.

For example, data such as a location and an attitude of the vehicle in a vehicle positioning system may be obtained. The vehicle positioning system may include one or more of a GPS, a BEIDOU system, another positioning system, an inertial measurement unit (IMU), and the like.

The region in which ambient light is blocked in the traveling direction of the vehicle may include a region in which ambient light is blocked and that the vehicle is to enter in the traveling direction of the vehicle. For example, the region in which ambient light is blocked may include one or more of regions in which ambient light is blocked, such as a tunnel, an overpass, and an elevated highway, for example, a tunnel in FIG. 7. For example, a road or a road condition environment that the vehicle is to pass in the future or the like may be predicted based on a location of the vehicle and a navigation map such as a high-definition map or a standard-definition map, or based on estimated arrival time, to predetermine a location of a region in which ambient light is blocked. For example, when there is a tunnel in front of the vehicle, a location of a tunnel entrance in front of the vehicle may be obtained based on the location of the vehicle and the navigation map. For example, an image in front of the vehicle may be obtained by a vehicle-mounted image capture device, to determine a region in which ambient light is blocked. For example, a road signpost may be photographed by a camera mounted in the front of the vehicle, and then a tunnel identifier and a tunnel entrance location that are indicated by the road signpost are recognized by using a conventional image recognition algorithm such as a neural network.

Step 702: Determine a first distance between the vehicle and the region in which ambient light is blocked based on the location of the vehicle and/or the location of the region in which ambient light is blocked in the traveling direction of the vehicle.

It can be understood that, as the vehicle travels forward, the first distance between the vehicle and the region in which ambient light is blocked continuously changes. For example, during traveling of the vehicle, when the vehicle is to enter the region in which ambient light is blocked, the location of the vehicle and the location of the region in which ambient light is blocked may be periodically obtained, and then the first distance between the vehicle and the region in which ambient light is blocked is periodically determined.

For example, positioning data and navigation data may be periodically obtained, where the navigation data may include the location of the region in which ambient light is blocked, to periodically determine the first distance between the vehicle and the region in which ambient light is blocked. A quantity of frames of the positioning data and the navigation data is usually small, and consequently, a frequency at which the first distance is determined is low. To avoid this problem, frame interpolation may be performed on the first distance. For example, an acceleration (for example, a linear acceleration and an angular acceleration) of the vehicle that is captured by the IMU in real time and a current speed of the vehicle may be obtained, and then frame interpolation is performed on the first distance by using the acceleration of the vehicle, to determine the first distance at a high frequency (above 60 hertz (Hz)) and meet a requirement for real-time performance. For example, when the first distance is less than a preset distance, frame interpolation may be performed on the first distance.

For example, it is assumed that, a distance that is between the vehicle and the region in which ambient light is blocked and that is determined at a current moment t based on the navigation data is $S_t$. In this case, a distance $S_{t+1}$ that is between the vehicle and the blocked region and that is obtained at a moment t+1 by the IMU through data compensation is as follows:

$$S_{t+1} = S_t - \int_t^{t+1} (v_t + at)dt, \quad (1)$$

where a is an acceleration of the vehicle at the moment t, and $v_t$ is a speed of the vehicle at the moment t.

Step 703: Adjust a display mode of a display device based on the first distance.

In this embodiment of this application, when the vehicle is to enter the region in which ambient light is blocked, the display mode of the display device is pre-adjusted based on the distance between the vehicle and the region in which ambient light is blocked, to effectively avoid an adjustment lag. This ensures that, when the vehicle enters the region in which ambient light is blocked, the display mode of the display device can better adapt to the region in which ambient light is blocked, without interfering with sight of a driver. This effectively reduces impact of an ambient light intensity change perceived by the driver or a passenger on sight, improves user experience, and ensures driving safety.

In a possible implementation, the display mode of the display device is adjusted when the first distance is less than the preset distance. The preset distance may be preset according to a requirement. This is not limited herein. In this way, when the distance between the vehicle and the region in which ambient light is blocked is less than the preset distance, it indicates that the vehicle is to enter the region in which ambient light is blocked. In this case, the display mode of the display device is pre-adjusted, so that the display mode adapts to the region in which ambient light is blocked when the vehicle reaches the region in which ambient light is blocked. This effectively avoids impact of an adjustment lag on sight of the driver or the passenger, and greatly improves driving safety.

Figure 9:
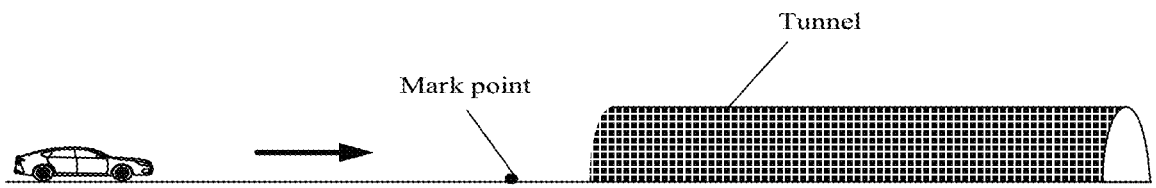
FIG. 9 is a schematic diagram of a mark point corresponding to a region in which ambient light is blocked according to an embodiment of this application.

In a possible implementation, a distance between a mark point corresponding to the region in which ambient light is blocked and the region in which ambient light is blocked may be obtained, and then the display mode of the display device is adjusted based on the first distance, the preset distance, and the distance between the mark point and the region in which ambient light is blocked. The mark point is set beyond the region in which ambient light is blocked. FIG. 9 is a schematic diagram of a mark point corresponding to a region in which ambient light is blocked according to an embodiment of this application. As shown in FIG. 9, the mark point may be preset at a location at a specific distance from the region in which ambient light is blocked before the vehicle enters the region in which ambient light is blocked. For example, a first difference between the first distance and the distance between the mark point and the region in which ambient light is blocked, and a second difference between the preset distance and the distance between the mark point and the region in which ambient light is blocked may be calculated, and then the display mode of the display device is adjusted based on a ratio of the first difference to the second difference. A larger ratio indicates that a corresponding display mode is more applicable to the region in which ambient light is blocked. In this way, the display mode of the display device is pre-adjusted based on the first distance, the preset distance, and the distance between the mark point and the region in which ambient light is blocked. Therefore, adjustment of the display mode can be completed before the vehicle enters the region in which ambient light is blocked, and an adjusted display mode can better adapt to the region in which ambient light is blocked, to further improve driving safety.

For an optional manner of adjusting the display mode in this step, refer to related descriptions in step 502. In an example, display brightness of the display device may be adjusted based on the first distance. For example, the display brightness of the display device may be adjusted based on the first distance, the preset distance, and the distance between the mark point and the region in which ambient light is blocked. The display brightness of the display device is negatively correlated with the first distance. To be specific, a smaller distance between the vehicle and the region in which ambient light is blocked indicates lower display brightness. In this way, in a process in which the vehicle is to enter the region in which ambient light is blocked, weighted correction is performed on the display brightness based on the first distance between the vehicle and the region in which ambient light is blocked. As the vehicle continuously approaches the region in which ambient light is blocked, the display brightness is continuously adjusted, so that the display brightness gradually decreases with a smooth transition. In addition, it is ensured that adjustment of the display brightness is completed before the vehicle reaches the region in which ambient light is blocked.

For example, the display device is a HUD. Display brightness of a virtual image plane of the HUD may be adjusted based on the distance between the vehicle and the region in which ambient light is blocked by using the following formula (2):

$$L = L_N + (L_M - L_N) \times q_t, \quad (2)$$

where L indicates display brightness of the HUD that corresponds to a moment t, $L_N$ indicates target display brightness of the HUD that corresponds to the mark point, and a value of $L_N$ may be set according to a requirement, $L_M$ indicates brightness of the HUD that is used before adjustment, for example, may be brightness of the HUD that is used when there is a preset distance between the vehicle and the region in which ambient light is blocked, and $q_t$ indicates a weighting factor corresponding to a distance $S_t$ between the vehicle and the region in which ambient light is blocked at the moment t.

For example, the weighting factor $q_t$ may be shown in the following formula (3):

$$q_t = \cos\left(\left(\frac{S_t - S_N}{S_M - S_N}\right) \times \frac{\pi}{2}\right), \quad (3)$$

where $S_M$ indicates the preset distance, to be specific, a distance between the vehicle and the region in which ambient light is blocked when the adjustment starts, $S_N$ indicates the distance between the mark point and the blocked region, to be specific, a distance between the vehicle and the region in which ambient light is blocked when the adjustment is completed, and $S_t$ indicates the distance between the vehicle and the region in which ambient light is blocked at the current moment t.

It can be learned from the foregoing formulas (2) and (3) that, when the distance between the vehicle and the region in which ambient light is blocked is $S_M$, that is, $S_t=S_M$, the weighting factor $q_t$ is correspondingly 1, and correspondingly, $L=L_M$, to be specific, the display brightness L of the HUD remains at original brightness of the HUD. The vehicle continues to travel toward the region in which ambient light is blocked, the distance between the vehicle and the region in which ambient light is blocked gradually decreases, that is, $S_t$ gradually decreases, the weighting factor $q_t$ continuously decreases correspondingly, and the display brightness L of the HUD gradually decreases correspondingly, until the distance between the vehicle and the region in which ambient light is blocked is $S_N$, that is, $S_t=S_N$, the weighting factor $q_t$ is correspondingly 0, and correspondingly, $L=L_N$, to be specific, the display brightness L of the HUD is adjusted to the brightness of the HUD that corresponds to the mark point. In this case, the pre-adjustment of the display brightness is completed. In this way, when the distance between the vehicle and the region in which ambient light is blocked is $S_N$, that is, when the vehicle reaches the mark point, the pre-adjustment of the display brightness has been completed. This ensures that the display brightness of the HUD does not block sight of the driver when the vehicle enters the region in which ambient light is blocked, and ensures driving safety.

Figure 10:
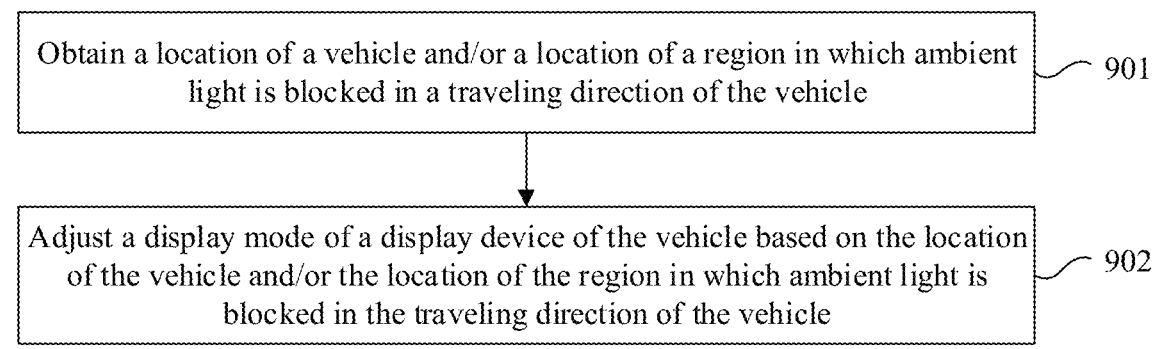
FIG. 10 is a flowchart of a display method according to an embodiment of this application.

The following describes the display method provided in embodiments of this application by using an example in which location information includes a location of a vehicle or a location of a region in which ambient light is blocked in a traveling direction of the vehicle. FIG. 10 is a flowchart of a display method according to an embodiment of this application. As shown in FIG. 10, the method includes the following steps.

Step 901: Obtain a location of a vehicle and/or a location of a region in which ambient light is blocked in a traveling direction of the vehicle.

For specific descriptions of the location of the vehicle and the location of the region in which ambient light is blocked, refer to step 701. Details are not described herein again.

Step 902: Adjust a display mode of a display device of the vehicle based on the location of the vehicle and/or the location of the region in which ambient light is blocked in the traveling direction of the vehicle.

In this way, when environment information of the vehicle changes greatly, for example, when the vehicle enters a tunnel or is greatly blocked, ambient light seen by a driver changes greatly. In this case, the display mode may be adjusted to ensure that sight of the driver is not affected, to ensure driving safety.

In an example, the location of the vehicle may be obtained, a scenario in which the vehicle is located is determined, and the display mode of the display device of the vehicle may be adjusted based on the scenario in which the vehicle is located, for example, in a tunnel, under an elevated highway, on an expressway, or on a smooth road. For example, when the vehicle travels in a tunnel, light is dim, and display brightness of a display of the vehicle may be decreased, to avoid impact on driving safety due to excessively high brightness of the display device of the vehicle. When the vehicle travels on an expressway, sight is open, and extraneous light is abundant. In this case, display brightness of the display of the vehicle may be increased, so that the driver can more clearly see information such as vehicle navigation displayed on the display, to ensure driving safety of the vehicle.

In another example, the location of the region in which ambient light is blocked in the traveling direction of the vehicle may be obtained, and the display mode of the display device of the vehicle is adjusted based on the location of the region in which ambient light is blocked in the traveling direction of the vehicle. For example, when there is a tunnel in the traveling direction of the vehicle, ambient light seen by the driver changes greatly. In this case, the display mode is adjusted to ensure that sight of the driver is not affected, to ensure driving safety. For example, when the vehicle enters the tunnel, display brightness for the vehicle is decreased, to avoid impact on driving safety due to excessively high brightness of the display device of the vehicle, and when the vehicle leaves the tunnel, display brightness for the vehicle is increased, so that the driver can properly view information such as vehicle navigation, to ensure driving safety of the vehicle. For another example, when the vehicle enters the tunnel, the display mode of the vehicle is adjusted to a nighttime display mode, and when the vehicle leaves the tunnel, the display mode of the vehicle is adjusted to a daytime display mode, to ensure driving safety of the driver. For example, when the vehicle enters the tunnel, a display icon, information, or the like on the vehicle is moved to a region away from sight of the driver or is not displayed, or display transparency is improved, or a display color, display brightness, or the like is decreased, to reduce impact on eyes of the driver. Further, when the vehicle leaves the tunnel, display of the icon and the information may be restored.

In another example, the location of the vehicle and/or the location of the region in which ambient light is blocked in the traveling direction of the vehicle may be obtained, to adjust the display mode of the display device of the vehicle. For example, the display mode of the display device of the vehicle may be adjusted based on the location of the vehicle and a location of a tunnel in the traveling direction of the vehicle when the vehicle is to enter the tunnel. For example, display brightness of the display of the vehicle may be decreased, to avoid impact on driving safety due to excessively high brightness of the display device of the vehicle.

The following describes the display method provided in embodiments of this application by using an example in which a display mode includes display brightness, and light intensity information includes intensity of ambient light received by an optical element of a display device and/or intensity of ambient light corresponding to an imaging location of the display device.

Figure 11:
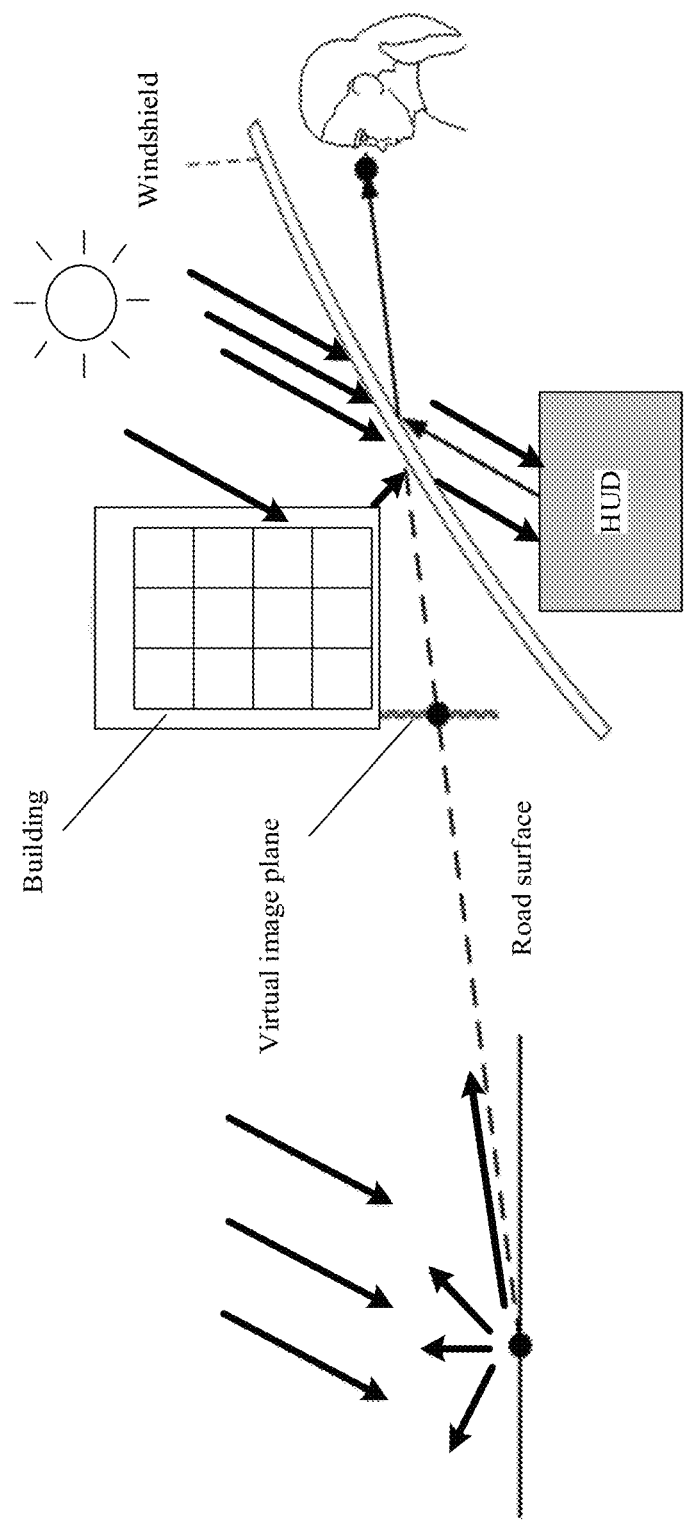
FIG. 11 is a schematic diagram of a source of ambient light that affects display brightness of a HUD according to an embodiment of this application.

During traveling of a vehicle, intensity of ambient light continuously changes, and the change of the intensity of ambient light affects visual experience of a driver or a passenger for a display device and driving safety. To ensure driving safety, display brightness of the display device needs to be adaptively adjusted. Ambient light that affects the visual experience of the driver or the passenger for the display device comes from a wide range of sources. For example, the display device is a HUD. FIG. 11 is a schematic diagram of a source of ambient light that affects display brightness of a HUD according to an embodiment of this application. As shown in FIG. 11, when a driver watches a virtual image plane of the HUD, ambient light reflected by a road surface corresponding to the virtual image plane of the HUD enters eyes of the driver. This affects visual experience of the driver for the virtual image plane of the HUD, and the driver may not clearly see the virtual image plane of the HUD. In addition, an operating principle of an optical device of the HUD is as follows: Emergent light is projected by a reflection optical path including a plurality of reflectors onto a windshield through an opening of the optical device, and then is reflected by the windshield to eyes. If ambient light enters the optical device along the reflection optical path, after reaching the reflector, the ambient light is reflected by the reflector and is projected onto the windshield along the reflection optical path through the opening of the optical device, and then is reflected by the windshield to the eyes. This also affects visual experience of the driver for the virtual image plane of the HUD, and the driver cannot clearly see the virtual image plane of the HUD. In the related technology, only impact of ambient light near the virtual image plane of the HUD on visual experience of the driver for the virtual image plane of the HUD is considered, and display brightness of the virtual image plane of the HUD is adjusted based on intensity of the ambient light near the virtual image plane of the HUD. Intensity of ambient light that comes from a single source may deviate from intensity of light observed by the driver on the virtual image plane of the HUD, adjusted display brightness may not meet a requirement for clear display, and the driver needs to manually adjust the display brightness. An operation is complex, and a danger of driving increases.

Figure 12:
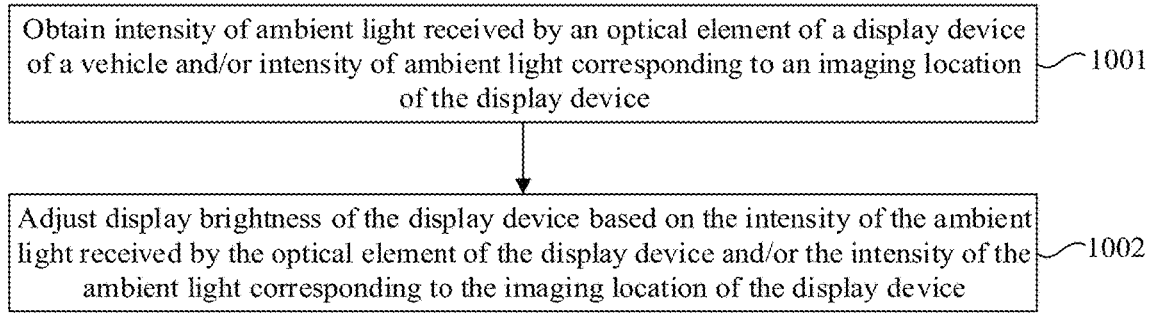
FIG. 12 is a flowchart of a display method according to an embodiment of this application.

FIG. 12 is a flowchart of a display method according to an embodiment of this application. As shown in FIG. 12, the method may include the following steps:

Step 1001: Obtain intensity of ambient light received by an optical element of a display device of a vehicle and/or intensity of ambient light corresponding to an imaging location of the display device.

In a possible implementation, when a first distance between the vehicle and a region in which ambient light is blocked is greater than or equal to a preset distance, the intensity of the ambient light received by the optical element of the display device of the vehicle and/or the intensity of the ambient light corresponding to the imaging location of the display device may be obtained. For example, intensity of ambient light received by the optical element of the display device and/or intensity of ambient light corresponding to the imaging location of the display device that are captured by a brightness sensor may be obtained.

For example, the intensity $E_d$ of the ambient light corresponding to the imaging location of the display device may be obtained, or the intensity $E_s$ of the ambient light received by the optical element of the display device may be obtained, or the intensity of the ambient light corresponding to the imaging location of the display device and the intensity of the ambient light received by the optical element of the display device may be obtained, that is, fusion light intensity E is obtained, where $E=E_d+E_s$.

For example, the display device is a HUD. Intensity of ambient light received by an optical element of the HUD and intensity of ambient light corresponding to a location of a virtual image plane of the HUD may be obtained, and then fusion light intensity may be obtained. For example, intensity, captured by a brightness sensor mounted in the front of the vehicle, of ambient light on the virtual image plane of the HUD may be obtained, and intensity of ambient light received by an optical element of an optical device of the HUD may be further determined in the following example manners.

Manner 1: An incidence angle corresponding to ambient light received at a light outlet of the optical device of the HUD, an emergence angle corresponding to emergent light of the HUD, and intensity of the ambient light received at the light outlet of the optical device of the HUD may be obtained. The intensity of the ambient light received by the optical element of the optical device of the HUD is determined based on the incidence angle, the emergence angle, and the intensity of the ambient light received at the light outlet. The intensity of the ambient light received by the optical element of the optical device of the HUD is positively correlated with the intensity of the ambient light received at the light outlet, and is negatively correlated with a difference between the incidence angle and the emergence angle.

The incidence angle of the ambient light and the intensity of the ambient light at the light outlet of the optical device of the HUD affect the intensity of the ambient light reaching the optical element of the optical device of the HUD. Therefore, the intensity of the ambient light received by the optical element of the optical device of the HUD is more accurately determined based on the intensity of the ambient light received at the light outlet of the optical device of the HUD and a deviation between the incidence angle of the ambient light and the emergence angle corresponding to the emergent light of the HUD.

For example, an incidence angle of ambient light and an emergence angle corresponding to emergent light of the HUD that captured by a light angle sensor mounted at the light outlet of the optical device of the HUD may be obtained. In addition, the emergence angle corresponding to the emergent light of the HUD may alternatively be precalibrated. For example, intensity, captured by the brightness sensor, of ambient light received at the light outlet of the optical device of the HUD may be obtained.

Figure 13:
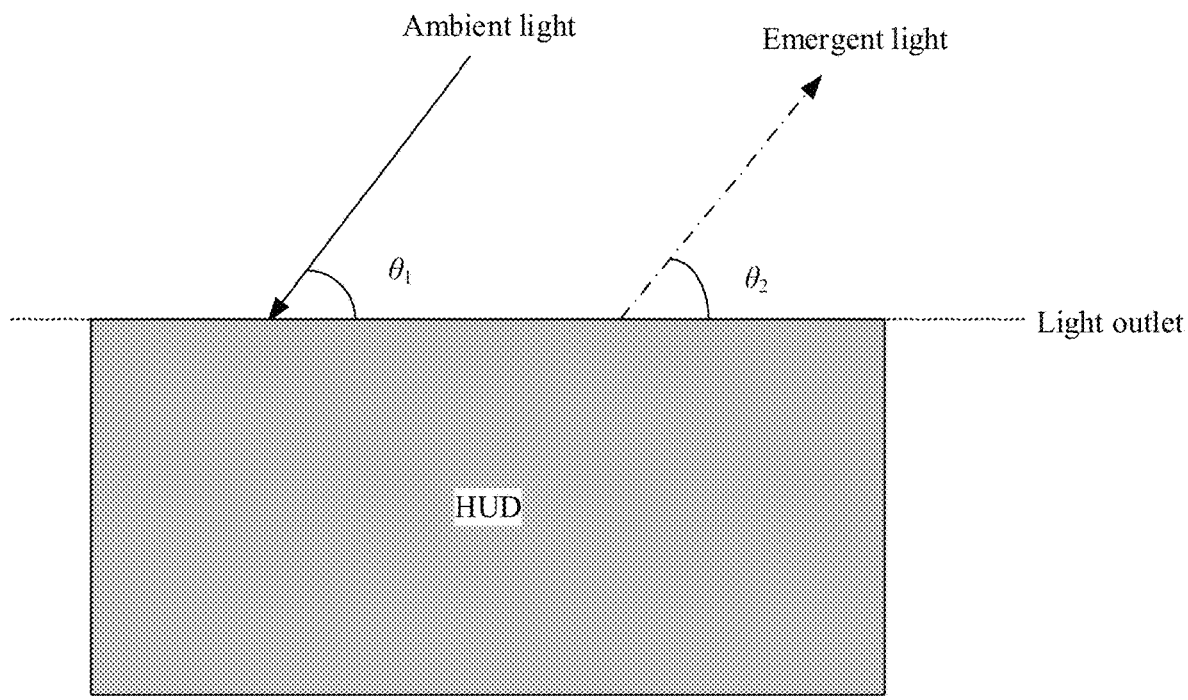
FIG. 13 is a schematic diagram of an incidence angle and an emergence angle at a light outlet of an optical device of a HUD according to an embodiment of this application.

FIG. 13 is a schematic diagram of an incidence angle and an emergence angle at a light outlet of an optical device of a HUD according to an embodiment of this application. As shown in FIG. 13, $\theta_1$ is an incidence angle corresponding to ambient light received at the light outlet of the optical device of the HUD, and $\theta_2$ is an emergence angle corresponding to emergent light of the HUD. A smaller difference between the incidence angle $\theta_1$ and the emergence angle $\theta_2$ indicates that ambient light entering the optical device of the HUD is more likely to be parallel to the emergent light of the HUD. Correspondingly, when the intensity of the ambient light received at the light outlet of the optical device of the HUD remains unchanged, intensity of ambient light received by an optical element of the optical device of the HUD is higher. On the contrary, a larger difference between the incidence angle $\theta_1$ and the emergence angle $\theta_2$ indicates lower intensity of ambient light received by the optical element of the optical device of the HUD. In addition, when a difference between the incidence angle $\theta_1$ and the emergence angle $\theta_2$ remains unchanged, higher intensity of ambient light received at the light outlet of the optical device of the HUD indicates higher intensity of ambient light received by the optical element of the optical device of the HUD.

For example, the ambient light may include direct sunlight and sunlight reflected by a reflective object. As shown in FIG. 11, both direct sunlight and sunlight reflected by a highly reflective building near the vehicle may reach the optical device of the HUD. After reaching the optical element of the optical device of the HUD, the sunlight is reflected by the optical element and is projected to a windshield along a reflection optical path through an opening of the optical device, and finally enters eyes of a driver. In this way, impact of ambient light that comes from a plurality of sources on experience of watching a virtual image plane of the HUD by the driver or a passenger is comprehensively considered, and intensity of the direct sunlight received by the optical element of the optical device of the HUD and intensity of the sunlight reflected by the reflective object are determined, to further improve effect of adjusting display brightness of the virtual image plane of the HUD.

Manner 2: A first included angle between the ambient light and a horizontal plane and a second included angle between a projection of the ambient light on the horizontal plane and a traveling direction of the vehicle are determined. A third included angle between emergent light of the HUD and the horizontal plane and a fourth included angle between a projection of the emergent light of the HUD on the horizontal plane and the traveling direction of the vehicle are determined. A first difference between the first included angle and the third included angle and a second difference between the second included angle and the fourth included angle are determined. The intensity of the ambient light received by the optical element of the optical device of the HUD is determined based on the first difference, the second difference, and intensity of ambient light received at a light outlet of the optical device of the HUD. The intensity of the ambient light received by the optical element of the optical device of the HUD is positively correlated with the intensity of the ambient light received at the light outlet of the optical device of the HUD, is negatively correlated with the first difference, and is negatively correlated with the second difference.

A deviation of the included angle between the ambient light and the horizontal plane relative to the included angle between the emergent light of the HUD and the horizontal plane, a deviation of the included angle between the projection of the ambient light on the horizontal plane and the traveling direction of the vehicle relative to the included angle between the projection of the emergent light of the HUD on the horizontal plane and the traveling direction of the vehicle, and the intensity of the ambient light at the light outlet of the optical device of the HUD affect the intensity of the ambient light reaching the optical element of the optical device of the HUD. Therefore, the intensity of the ambient light received by the optical element of the optical device of the HUD is more accurately determined based on the deviation of the included angle between the ambient light and the horizontal plane relative to the included angle between the emergent light of the HUD and the horizontal plane, the deviation of the included angle between the projection of the ambient light on the horizontal plane and the traveling direction of the vehicle relative to the included angle between the projection of the emergent light of the HUD on the horizontal plane and the traveling direction of the vehicle, and the intensity of the ambient light received at the light outlet of the optical device of the HUD.

For example, vehicle attitude data captured by a vehicle positioning system may be obtained, to determine the traveling direction of the vehicle, and intensity, captured by the brightness sensor, of ambient light received at the light outlet of the optical device of the HUD may be obtained.

Figure 14:
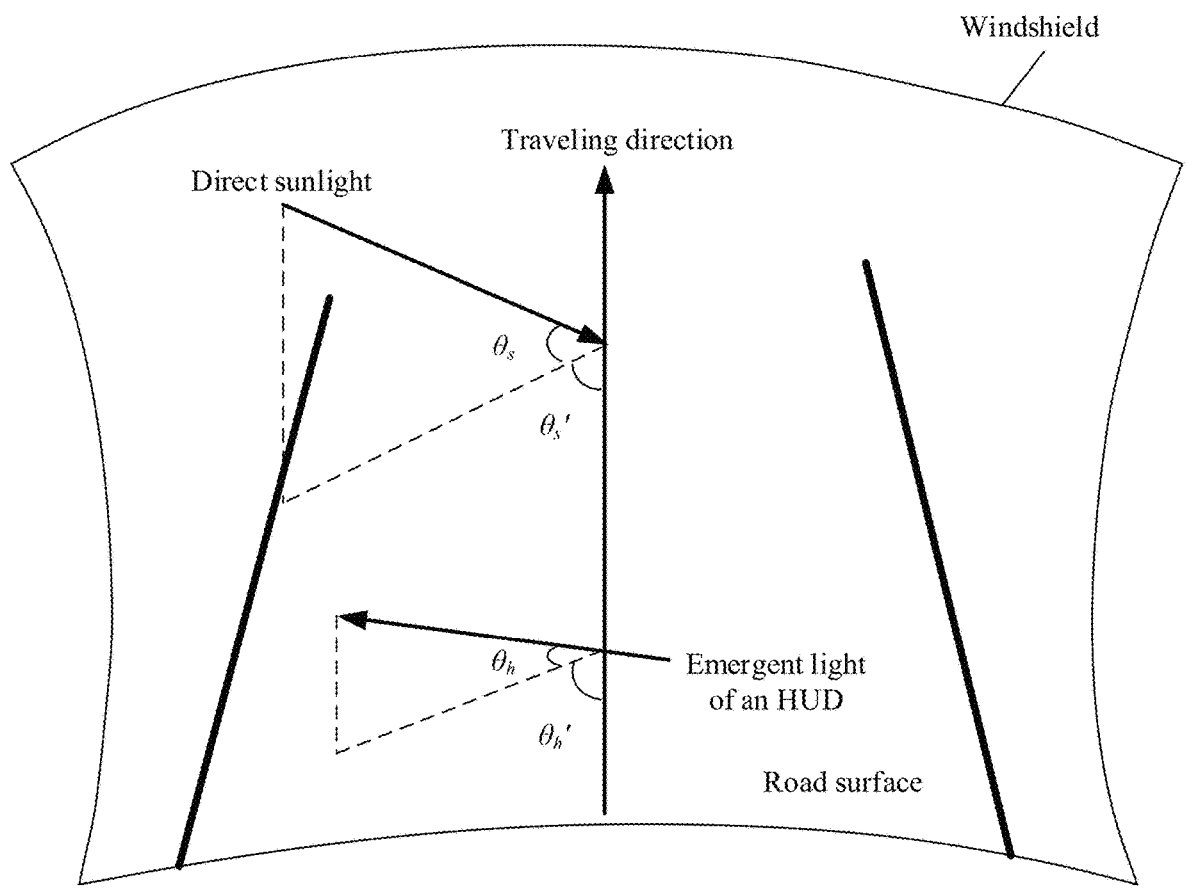
FIG. 14 is a schematic diagram of direct sunlight and emergent light of a HUD according to an embodiment of this application.

In an example, the ambient light is direct sunlight. FIG. 14 is a schematic diagram of direct sunlight and emergent light of a HUD according to an embodiment of this application. FIG. 14 shows a front view of the driver in the vehicle. $\theta_s$ is an included angle between the direct sunlight and a horizontal plane, that is, a solar altitude angle at a current moment. $\theta_s'$ is an included angle between a projection of the direct sunlight on the horizontal plane at the current moment and the traveling direction of the vehicle. $\theta_h$ is an included angle between the emergent light of the HUD and the horizontal plane. $\theta_h'$ is an included angle between a projection of the emergent light of the HUD on the horizontal plane and the traveling direction of the vehicle. It can be understood that, when a difference between $\theta_s'$ and $\theta_h'$ and intensity of direct sunlight received at the light outlet of the optical device of the HUD remain unchanged, a smaller difference between $\theta_s$ and $\theta_h$ indicates that direct sunlight entering the optical device of the HUD is more likely to be parallel to the emergent light of the HUD, and correspondingly, intensity of direct sunlight received by the optical element of the optical device of the HUD is higher. On the contrary, a larger difference between $\theta_s$ and $\theta_h$ indicates lower intensity of direct sunlight received by the optical element of the optical device of the HUD. Similarly, when a difference between $\theta_s$ and $\theta_h$ and intensity of direct sunlight received at the light outlet of the optical device of the HUD remain unchanged, intensity of direct sunlight received by the optical element of the optical device of the HUD increases as a difference between $\theta_s'$ and $\theta_h'$ decreases. In addition, when both a difference between $\theta_s$ and $\theta_h$ and a difference between $\theta_s'$ and $\theta_h'$ remain unchanged, higher intensity of direct sunlight received at the light outlet of the optical device of the HUD indicates higher intensity of direct sunlight received by the optical element of the optical device of the HUD.

For example, the intensity $E_1'$ of the direct sunlight received by the optical element of the optical device of the HUD may be calculated by using the following formula (4):

$$E_1' = \left(\cos\frac{|\theta_h - \theta_s|}{2}\right)^k \left(\cos\frac{|\theta_h' - \theta_s'|}{2}\right)^w E_1, \tag{4}$$

where k and w respectively indicate light shrinkage intensity in two dimensions: horizontal and vertical, for example, both k and w may be 1, $E_1$ is the intensity of the direct sunlight received at the light outlet of the optical device of the HUD, $\theta_s$ is the solar altitude angle at the current moment, $\theta_s'$ is the included angle between the projection of the direct sunlight on the horizontal plane at the current moment and the traveling direction of the vehicle, $\theta_h$ is the included angle between the emergent light of the HUD and the horizontal plane, and $\theta_h'$ is the included angle between the projection of the emergent light of the HUD on the horizontal plane and the traveling direction of the vehicle.

Figure 15:
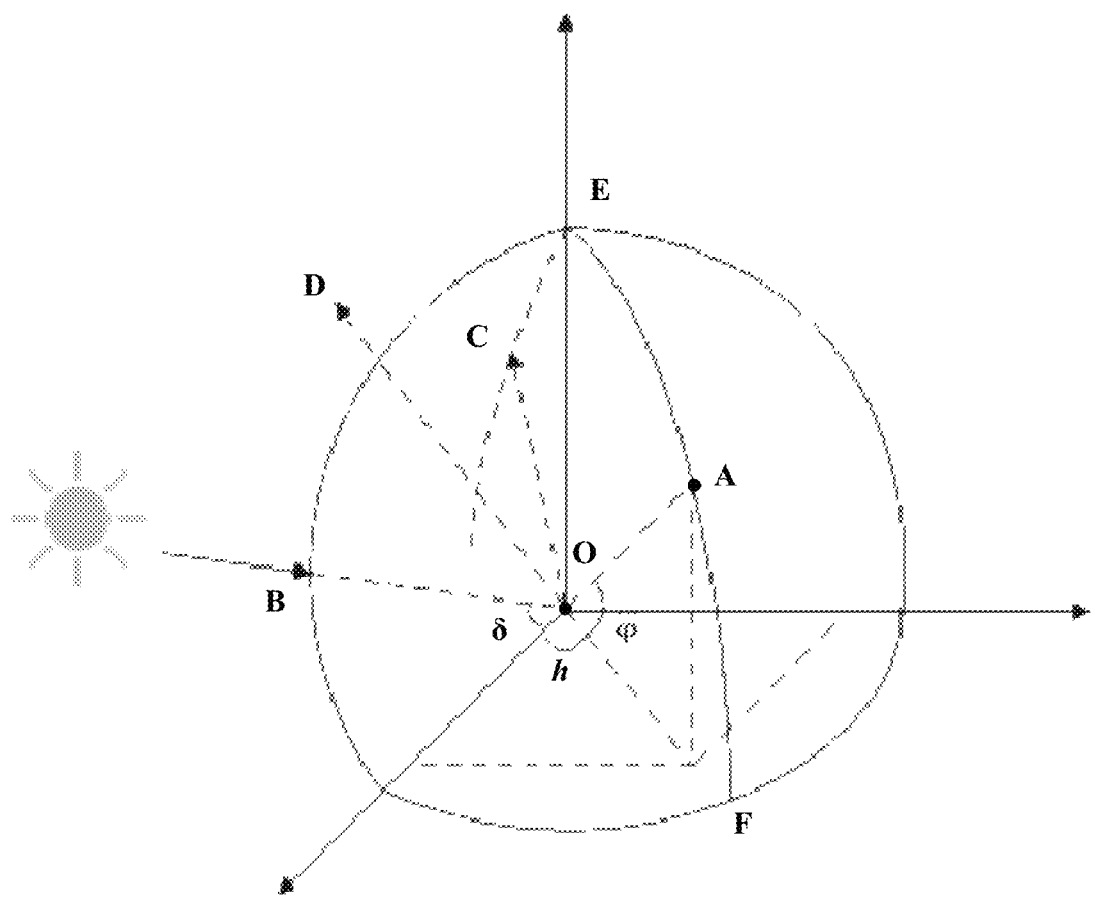
FIG. 15 is a schematic diagram of a relative location relationship between direct sunlight and the earth according to an embodiment of this application.
Figure 16:
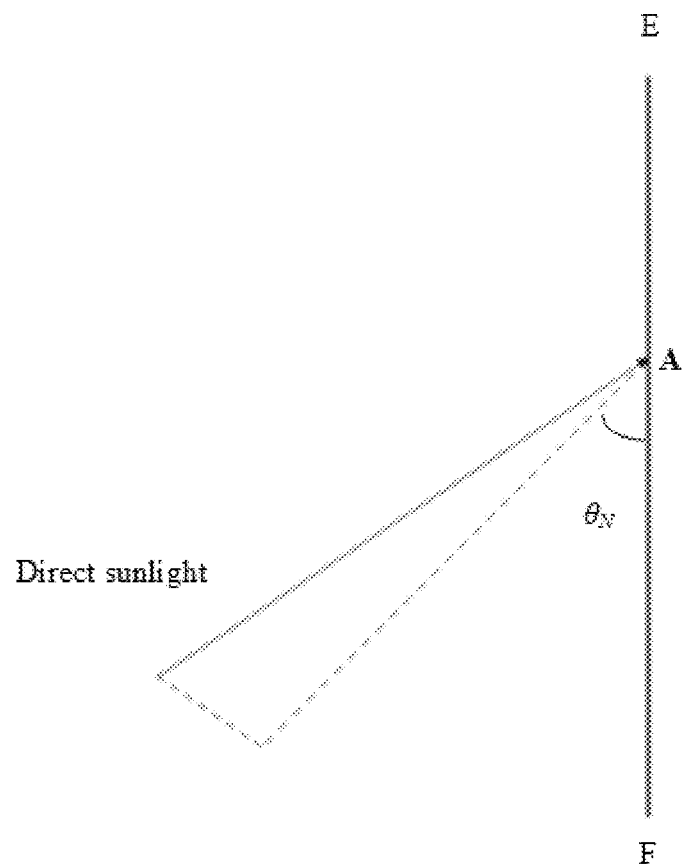
FIG. 16 is a schematic diagram of an included angle between a projection of direct sunlight on a horizontal plane and a meridian line EF according to an embodiment of this application.

For example, a pre-calibrated included angle $\theta_h$ between the emergent light of the HUD and the horizontal plane and a pre-calibrated included angle $\theta_h'$ between the projection of the emergent light of the HUD on the horizontal plane and the traveling direction of the vehicle may be obtained. For example, as shown in FIG. 15 and FIG. 16, the solar altitude angle $\theta_s$ at the current moment and the included angle $\theta_s'$ between the projection of the direct sunlight on the horizontal plane at the current moment and the traveling direction of the vehicle may be calculated in the following formula (5). FIG. 15 is a schematic diagram of a relative location relationship between direct sunlight and the earth according to an embodiment of this application. FIG. 16 is a schematic diagram of an included angle between a projection of direct sunlight on a horizontal plane and a meridian line EF according to an embodiment of this application. As shown in FIG. 15, a point O is a center of the earth. It is assumed that the vehicle is traveling at a point A at the current moment. EF is a meridian line passing through the point A. h is an hour angle in an equatorial coordinate system, to be specific, an included angle between a right ascension and the meridian line at which the point A is located. δ is a declination of sunlight at the current moment, to be specific, an opening angle between the equator and a point with direct sunlight. φ is an opening angle between the equator and a latitude of a location of the vehicle at the current moment.

For example, the solar altitude angle $\theta_s$ may be calculated by using the following formula (5):

$$\sin\theta_s = \cos h \cos\delta \cos\varphi + \sin\delta \sin\varphi, \tag{5}$$

where h is the hour angle in the equatorial coordinate system, δ is the declination of the sunlight at the current moment, and φ is the opening angle between the equator and the latitude of the location of the vehicle at the current moment. Specific values of h, δ, and φ may be determined based on information such as time information and a location of the vehicle.

For example, an included angle between the projection of the direct sunlight on the horizontal plane and a due north or due south direction may be first calculated, and an included angle between the traveling direction of the vehicle and the due north or due south direction is calculated. For example, an included angle between the projection of the direct sunlight on the horizontal plane and a meridian line corresponding to the location of the vehicle (a positive direction of the meridian line may be set to the due north direction), and an included angle between the traveling direction of the vehicle and the meridian line corresponding to the location of the vehicle may be calculated, to calculate the included angle $\theta_s'$ between the projection of the direct sunlight on the horizontal plane and the traveling direction of the vehicle. Sunlight irradiated on the earth may be considered as parallel light. As shown in FIG. 15, a point B is an intersection point between the earth's surface and a connection line between the sun and the center of the earth, and direct sunlight passing through the point A is parallel to OB and intersects a plane OAB, that is, the direct sunlight passing through the point A is on the plane OAB. Therefore, an included angle between the projection of the direct sunlight on the horizontal plane and a meridian line may be obtained. As shown in FIG. 16, an included angle $\theta_N$ between the meridian line EF and a projection, on the horizontal plane, of direct sunlight passing through the point A may be obtained, that is, an included angle between the plane OAB and a plane OEF is obtained.

For example, in FIG. 15, $\overrightarrow{OC}$ is drawn on the plane OEF, $\overrightarrow{OC}$ is perpendicular to $\overrightarrow{OA}$, and $\overrightarrow{OD}$ is perpendicular to the plane OAB. In this case, the vectors $\overrightarrow{OA}$, $\overrightarrow{OB}$, and $\overrightarrow{OC}$ are shown in the following formula (6):

$$\overrightarrow{OA} = (\cos\phi \cos h, \cos\varphi \sin h, \sin\varphi) \qquad (6)$$
$$\overrightarrow{OB} = (\cos\delta, 0, \sin\delta),$$
$$\overrightarrow{OC} = (-\sin\varphi \cos h, -\sin\varphi \sin h, \cos\varphi)$$

where h is the hour angle in the equatorial coordinate system, $\delta$ is the declination of the sunlight at the current moment, and $\varphi$ is the opening angle between the equator and the latitude of the location of the vehicle at the current moment.

Because $\overrightarrow{OD}$ is perpendicular to the plane OAB, $\overrightarrow{OD}$ may be obtained by multiplying $\overrightarrow{OB}$ by $\overrightarrow{OA}$, as shown in the following formula (7):

$$\overrightarrow{OD} = (-\sin\varphi \cos\varphi \sin h, -\cos\delta \sin\varphi + \sin\delta \cos\varphi \cos h, \cos\delta \cos\varphi \sin h) \qquad (7),$$

where h is the hour angle in the equatorial coordinate system, $\delta$ is the declination of the sunlight at the current moment, and $\varphi$ is the opening angle between the equator and the latitude of the location of the vehicle at the current moment.

Because the included angle $\theta_N$ between the meridian line EF and the projection, on the horizontal plane, of the direct sunlight passing through the point A is complementary to $\angle COD$, $\theta_N$ may be calculated by using the following formula (8):

$$\theta_N = \frac{\pi}{2} - \angle COD = \frac{\pi}{2} - \cos^{-1}\frac{\overrightarrow{OC} \cdot \overrightarrow{OD}}{|\overrightarrow{OC}| \times |\overrightarrow{OD}|}, \qquad (8)$$

where $|\overrightarrow{OC}|$ is a modulus of the vector $\overrightarrow{OC}$, and $|\overrightarrow{OD}|$ is a modulus of the vector $\overrightarrow{OD}$.

In this way, an included angle between the traveling direction of the vehicle and the meridian line EF is determined based on a heading angle of the vehicle. Then the included angle $\theta_s'$ between the projection of the direct sunlight on the horizontal plane at the current moment and the traveling direction of the vehicle may be determined based on the included angle $\theta_N$ between the meridian line EF and the projection, on the horizontal plane, of the direct sunlight passing through the point A, and the included angle between the traveling direction of the vehicle and the meridian line EF.

Figure 17:
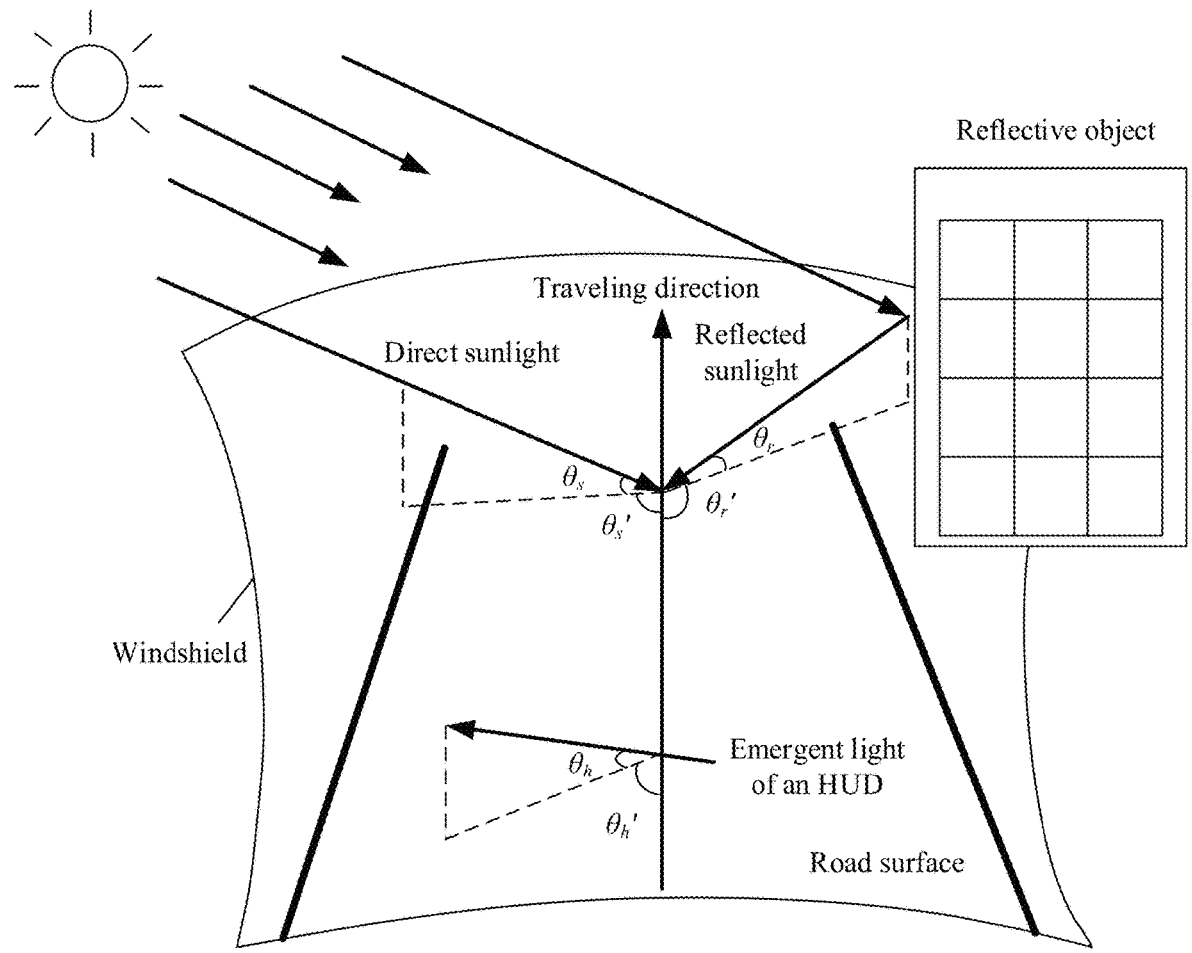
FIG. 17 is a schematic diagram of sunlight reflected by a reflective object and emergent light of a HUD according to an embodiment of this application.

In another example, the ambient light is sunlight reflected by a reflective object. FIG. 17 is a schematic diagram of sunlight reflected by a reflective object and emergent light of a HUD according to an embodiment of this application. FIG. 17 shows a front view of the driver in the vehicle. $\theta_r$ is an included angle between the sunlight reflected by the reflective object and a horizontal plane. $\theta_r'$ is an included angle between a projection of the sunlight reflected by the reflective object on the horizontal plane and the traveling direction of the vehicle. $\theta_s$ is an included angle between direct sunlight and the horizontal plane, that is, a solar altitude angle at a current moment. $\theta_s'$ is an included angle between a projection of the direct sunlight on the horizontal plane at the current moment and the traveling direction of the vehicle. $\theta_h$ is an included angle between the emergent light of the HUD and the horizontal plane. $\theta_h'$ is an included angle between a projection of the emergent light of the HUD on the horizontal plane and the traveling direction of the vehicle. It can be understood that, when a difference between $\theta_r'$ and $\theta_h'$ and intensity of sunlight that is reflected by the reflective object and that is received at the light outlet of the optical device of the HUD remain unchanged, a smaller difference between $\theta_r$ and $\theta_h$ indicates that sunlight reflected by the reflective object into the optical device of the HUD is more likely to be parallel to the emergent light of the HUD, and correspondingly, intensity of sunlight that is reflected by the reflective object and that is received by the optical element of the optical device of the HUD is higher. On the contrary, a larger difference between $\theta_r$ and $\theta_h$ indicates lower intensity of sunlight that is reflected by the reflective object and that is received by the optical element of the optical device of the HUD. Similarly, when a difference between $\theta_r$ and $\theta_h$ and intensity of sunlight that is reflected by the reflective object and that is received at the light outlet of the optical device of the HUD remain unchanged, intensity of sunlight that is reflected by the reflective object and that is received by the optical element of the optical device of the HUD increases as a difference between $\theta_r'$ and $\theta_h'$ decreases. In addition, when both a difference between $\theta_r$ and $\theta_h$ and a difference between $\theta_r'$ and $\theta_h'$ remain unchanged, higher intensity of sunlight that is reflected by the reflective object and that is received at the light outlet of the optical device of the HUD indicates higher intensity of sunlight that is reflected by the reflective object and that is received by the optical element of the optical device of the HUD.

For example, a pre-calibrated included angle $\theta_h$ between the emergent light of the HUD and the horizontal plane and a pre-calibrated included angle $\theta_h'$ between the projection of the emergent light of the HUD on the horizontal plane and the traveling direction of the vehicle may be obtained. For example, an included angle $\theta_r$ between sunlight reflected by the reflective object at the current moment and the horizontal plane, and an included angle $\theta_r'$ between a projection, on the horizontal plane, of the sunlight reflected by the reflective object at the current moment and the traveling direction of the vehicle may be calculated by using the following formula (9) and formula (10):

Because a reflective surface of the reflective object is perpendicular to the ground, the included angle $\theta_r$ between the sunlight reflected by the reflective object and the horizontal plane may be expressed as follows:

$$\theta_r = \theta_s, \qquad (9)$$

where $\theta_s$ is the solar altitude angle at the current moment, and a value of $\theta_s$ may be calculated by using the foregoing formula (5).

For example, an included angle between the projection, on the horizontal plane, of the sunlight reflected by the reflective object and a due north or due south direction may be first calculated, and an included angle between the traveling direction of the vehicle and the due north or due south direction is calculated. For example, an included angle between the projection of the sunlight reflected by the reflective object and a meridian line corresponding to a location of the vehicle, and an included angle between the traveling direction of the vehicle and the meridian line corresponding to the location of the vehicle may be calculated, to calculate the included angle $\theta_r'$ between the projection, on the horizontal plane, of the sunlight reflected by the reflective object and the traveling direction of the vehicle. It is assumed that, at the current moment, a set $\Theta=\{\theta_i\}_{i=1:n}$ of included angles between reflective surfaces of n reflective objects near the vehicle and the meridian line is obtained from navigation data. An included angle $\theta_i$ between a reflective surface of an $i^{th}$ reflective object and the meridian line may be calculated in the foregoing manner of calculating $\theta_N$ based on the formula (6) to the formula (8). In this case, an included angle $\theta'_{ri}$ between a projection, on the horizontal plane, of sunlight reflected by the $i^{th}$ reflective object and the traveling direction of the vehicle may be expressed as follows:

$$\theta'_{ri} = (2\theta_i - \theta'_s)\mod 2\pi, \qquad (10)$$

where $\theta_i$ is the included angle between the reflective surface of the $i^{th}$ reflective object and the meridian line, mod indicates a modulo operation, and $\theta_s'$ is the included angle between the projection of the direct sunlight on the horizontal plane at the current moment and the traveling direction of the vehicle.

For example, the intensity $E_1''$ of the sunlight that is reflected by the reflective object and that is received by the optical element of the optical device of the HUD may be calculated by using the following formula (11):

$$E_1'' = \frac{\sum_{i=1}^{n}\left(\cos\frac{|\theta_h - \theta_r|}{2}\right)^k\left(\cos\frac{|\theta_h' - (2\theta_i - \theta_s')\mod 2\pi|}{2}\right)^w E_1}{n}, \qquad (11)$$

where k and w respectively indicate light shrinkage intensity in two dimensions: horizontal and vertical, for example, both k and w may be 1, n is a quantity of reflective objects, $\theta_i$ is the included angle between the reflective surface of the $i^{th}$ reflective object and the meridian line, $E_1$ is intensity of sunlight received at the light outlet of the optical device of the HUD, $\theta_r$ is the included angle between the sunlight reflected by the reflective object at the current moment and the horizontal plane, $\theta_h$ is the included angle between the emergent light of the HUD and the horizontal plane, $\theta_h'$ is the included angle between the projection of the emergent light of the HUD on the horizontal plane and the traveling direction of the vehicle, and $\theta_s'$ is the included angle between the projection of the direct sunlight at the current moment on the horizontal plane and the traveling direction of the vehicle.

In another example, the ambient light is direct sunlight and sunlight reflected by a reflective object. Intensity $E_1'$ of direct sunlight received by the optical element of the optical device of the HUD, and intensity $E_1''$ of sunlight that is reflected by the reflective object and that is received by the optical element of the optical device of the HUD may be calculated with reference to the foregoing examples. Fusion intensity $E_s$ of the sunlight received by the optical element of the optical device of the HUD may be obtained by using the following formula (12):

$$E_s = E_1' + E_1'' = \frac{\sum_{i=1}^{n}\left(\cos\frac{|\theta_h - \theta_r|}{2}\right)^k\left(\cos\frac{|\theta_h' - (2\theta_i - \theta_s')\mod 2\pi|}{2}\right)^w E_1 + \left(\cos\frac{|\theta_h - \theta_s|}{2}\right)^k\left(\cos\frac{|\theta_h' - \theta_s'|}{2}\right)^w E_1}{n+1}, \qquad (12)$$

where $E_1'$ is the intensity of the direct sunlight received by the optical element of the optical device of the HUD, $E_1''$ is the intensity of the sunlight that is reflected by the reflective object and that is received by the optical element of the optical device of the HUD, k and w respectively indicate light shrinkage intensity in two dimensions: horizontal and vertical, for example, both k and w may be 1, n is a quantity of reflective objects, $\theta_i$ is an included angle between a reflective surface of an $i^{th}$ reflective object and a due north direction, $E_1$ is intensity of sunlight received at the light outlet of the optical device of the HUD, $\theta_r$ is an included angle between sunlight reflected by the reflective object at a current moment and a horizontal plane, $\theta_h$ is an included angle between emergent light of the HUD and the horizontal plane, $\theta_h'$ is an included angle between a projection of the emergent light of the HUD on the horizontal plane and the traveling direction of the vehicle, $\theta_s$ is a solar altitude angle at the current moment, and $\theta_s'$ is an included angle between a projection of direct sunlight at the current moment on the horizontal plane and the traveling direction of the vehicle.

Step 1002: Adjust display brightness of the display device based on the intensity of the ambient light received by the optical element of the display device and/or the intensity of the ambient light corresponding to the imaging location of the display device. The display brightness of the display device is positively correlated with the intensity of the ambient light received by the optical element of the display device, and is positively correlated with the intensity of the ambient light corresponding to the imaging location of the display device.

For example, the display brightness of the display device may be adjusted based on the intensity of the ambient light received by the optical element of the display device and the intensity of the ambient light corresponding to the imaging location of the display device. It can be understood that higher intensity of the ambient light received by the optical element of the display device or higher intensity of the ambient light corresponding to the imaging location of the display device indicates stronger interference caused by the ambient light to the driver watching an image generated by the display device. Correspondingly, the display brightness of the display device may be adjusted to a large value. Similarly, lower intensity of the ambient light received by the optical element of the display device or lower intensity of the ambient light corresponding to the imaging location of the display device indicates smaller interference caused by the ambient light to the driver watching an image generated by the display device. Correspondingly, the display brightness of the display device may be adjusted to a small value.

For example, the display device is a HUD. Display brightness of the HUD may be adjusted based on intensity of ambient light received by an optical element of the HUD and intensity of ambient light corresponding to an imaging location of the HUD.

For example, target display brightness L corresponding to a current moment may be calculated by using the following formula (13), to adjust the display brightness of the HUD:

$$L = \text{clamp}(a \times \sqrt{E}, \text{MIN\_VALUE}, \text{MAX\_VALUE}), \quad (13)$$

where E indicates fusion light intensity of the intensity of the ambient light corresponding to the imaging location of the HUD and the intensity of the ambient light received by the optical element of the HUD, for example, may be the fusion intensity $E_s$ of the sunlight received by the optical element of the optical device of the HUD in the foregoing formula (12), a is an adjustment coefficient, and may be determined based on an empirical value, for example, a maybe 35, and MIN_VALUE and MAX_VALUE are respectively minimum brightness and maximum brightness that can be reached on a virtual image plane the HUD. For example, values of MIN_VALUE and MAX_VALUE may be pre-calibrated or preset. A Clamp function may limit a value of L within a normal operation range [MIN_VALUE, MAX_VALUE] corresponding to the display device, that is, a value of a×√E is calculated. If the value of a×√E is within the range [MIN_VALUE, MAX_VALUE], L corresponding to the current moment is a×√E, if the value of a×√E is greater than MAX_VALUE, L corresponding to the current moment is MAX_VALUE, or if the value of a×√E is less than MIN_VALUE, L corresponding to the current moment is MIN_VALUE. In this way, dynamic adjustment may be performed within the normal operation range corresponding to the display device based on the fusion light intensity of the intensity of the ambient light corresponding to the imaging location of the HUD and the intensity of the ambient light received by the optical element of the HUD.

In this embodiment of this application, ambient light reaching the optical element of the display device is reflected by the optical element and then enters eyes of the driver or the passenger along an optical path of the display device, affecting experience of watching the display device by the driver or the passenger. In addition, the ambient light corresponding to the imaging location of the display device also affects sight of the driver or the passenger. Therefore, impact of ambient light that comes from a plurality of sources on experience of watching the display device by the driver or the passenger is comprehensively considered, and the intensity of the ambient light received by the optical element of the display device is combined with the intensity of the ambient light corresponding to the imaging region of the display device, so that real light intensity of an image that is generated by the display device and that is observed by the driver or the passenger can be truly restored. Display brightness of the display device is automatically adjusted based on combined intensity of ambient light. Adjusted display brightness better adapts to real visual experience of eyes, and meets a requirement for clear display. This effectively resolves a problem that the driver or the passenger cannot clearly see an image generated by the display device because only ambient light that comes from a single source is considered, and improves driving safety. In addition, the driver or the passenger does not need to perform a manual operation. This improves user experience and has high practicability.

The following describes the display method provided in embodiments of this application by using an example in which a display mode includes a display location, and light intensity information includes intensity of ambient light corresponding to at least one imaging region of a display device.

Figure 18:
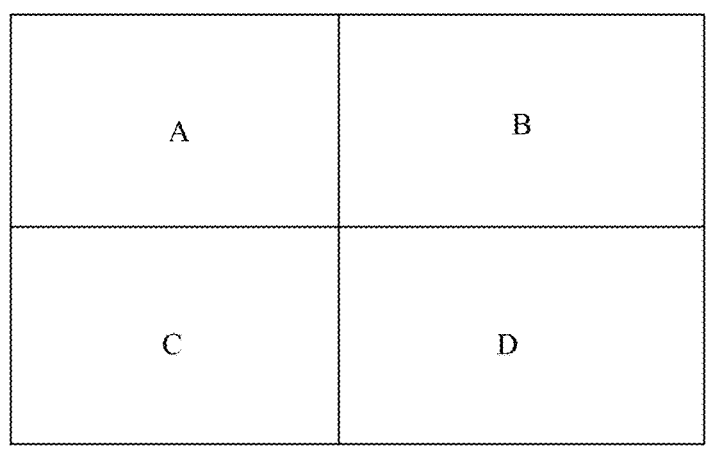
FIG. 18 is a schematic diagram of a plurality of imaging regions on a virtual image plane of a HUD according to an embodiment of this application.
Figure 19:
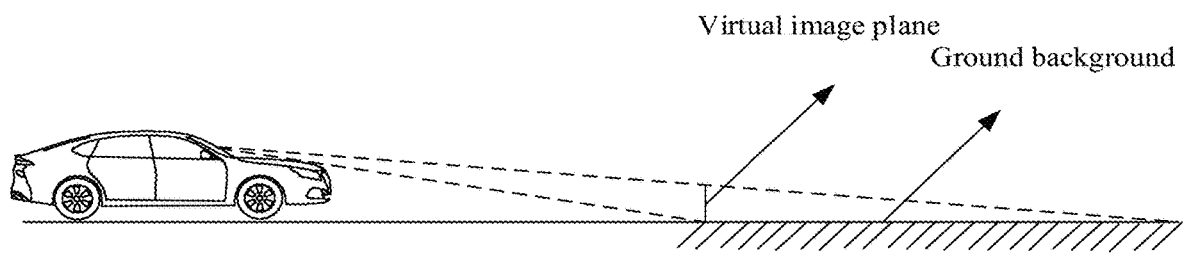
FIG. 19 is a schematic diagram of a ground background corresponding to a virtual image plane of a HUD from a side view outside a vehicle according to an embodiment of this application.
Figure 20:
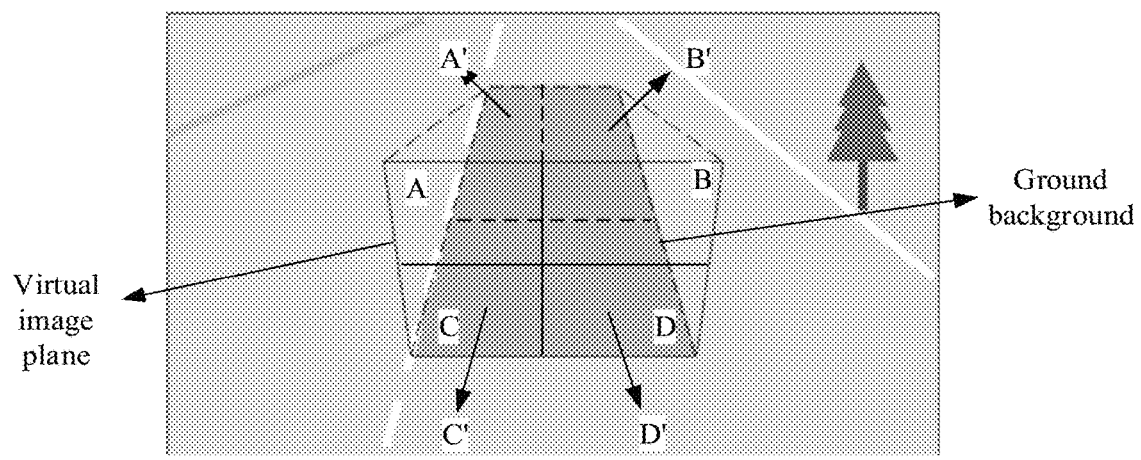
FIG. 20 is a schematic diagram of a ground background corresponding to a virtual image plane of a HUD from a front view inside a vehicle according to an embodiment of this application.

When the display device includes a plurality of imaging regions, different imaging regions correspond to different intensity of ambient light, and correspondingly, different interference is caused to sight of a driver or a passenger. For example, the display device is a HUD. FIG. 18 is a schematic diagram of a plurality of imaging regions on a virtual image plane of a HUD according to an embodiment of this application. As shown in FIG. 18, the virtual image plane of the HUD may include four imaging regions: A, B, C, and D. The HUD may perform imaging in one or more of the imaging regions A, B, C, and D. It should be noted that the imaging regions shown in FIG. 18 are merely an example, and a quantity, a shape, and the like of imaging regions are not limited in this embodiment of this application. FIG. 19 is a schematic diagram of a ground background corresponding to a virtual image plane of a HUD from a side view outside a vehicle according to an embodiment of this application. FIG. 20 is a schematic diagram of a ground background corresponding to a virtual image plane of a HUD from a front view inside a vehicle according to an embodiment of this application. As shown in FIG. 19 and FIG. 20, when a driver in the vehicle looks at the virtual image plane of the HUD, a ground coverage region determined based on sight of the driver and a range of the virtual image plane is the ground background corresponding to the virtual image plane of the HUD. As shown in FIG. 20, A', B', C', and D' are ground backgrounds corresponding to the imaging regions A, B, C, and D respectively. The ground background reflects ambient light, and intensity of ambient light reflected by ground backgrounds corresponding to different imaging regions is different, that is, intensity of ambient light corresponding to different imaging regions is different. When intensity of ambient light reflected by a ground background corresponding to an imaging region is high, the driver cannot clearly see content presented in the imaging region, increasing a danger of driving. Therefore, a display location on the virtual image plane of the HUD may be dynamically adjusted based on intensity of ambient light corresponding to different imaging regions.

Figure 21:
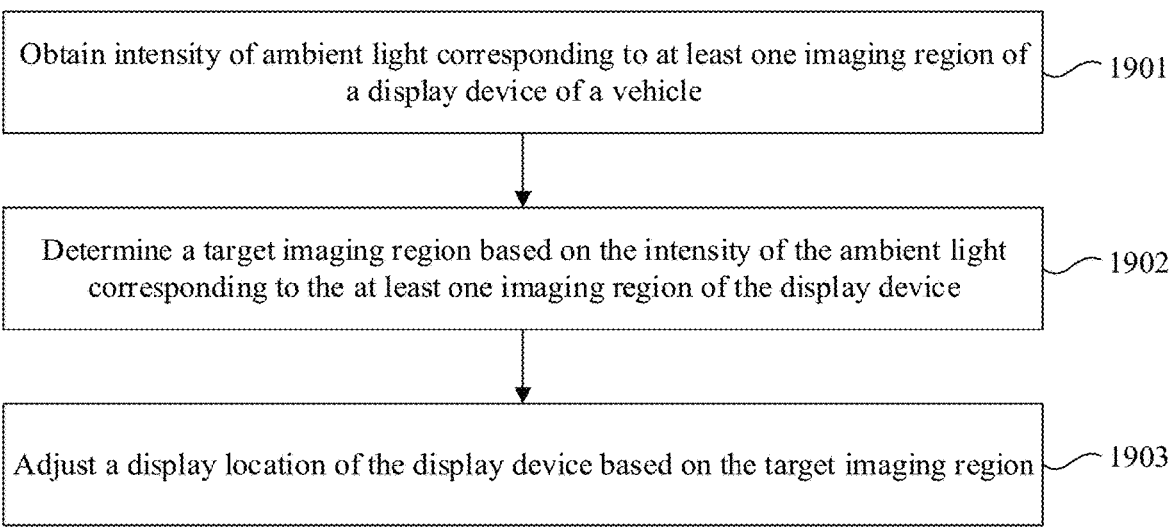
FIG. 21 is a flowchart of a display method according to an embodiment of this application.

FIG. 21 is a flowchart of a display method according to an embodiment of this application. As shown in FIG. 21, the method may include the following steps:

Step 1901: Obtain intensity of ambient light corresponding to at least one imaging region of a display device of a vehicle.

For example, the display device may include a plurality of imaging regions. During operation of the display device, one or more of the plurality of imaging regions are used to present content. For example, intensity of ambient light corresponding to each imaging region of the display device of the vehicle may be obtained, or intensity of ambient light corresponding to an imaging region currently used to present content may be obtained.

In an example, intensity, captured by a brightness sensor mounted in the front of the vehicle, of ambient light corresponding to at least one imaging region may be obtained. For example, intensity, captured by a plurality of brightness sensors, of ambient light corresponding to imaging regions may be obtained, where different brightness sensors capture intensity of ambient light corresponding to different imaging regions.

In another example, image information in front of the vehicle and an eye location may be obtained, and the intensity of the ambient light corresponding to the at least one imaging region of the display device is determined based on the image information and the eye location. An image in front of the vehicle may include a ground background corresponding to the at least one imaging region of the display device. For example, the image information in front of the vehicle may include grayscale values of pixels in the image in front of the vehicle. It can be understood that a higher grayscale value of a pixel in the image in front of the vehicle indicates higher intensity of ambient light reflected at a ground location corresponding to the pixel, and a lower grayscale value of a pixel in the image in front of the vehicle indicates lower intensity of ambient light reflected at a ground location corresponding to the pixel. Therefore, a grayscale value of a ground background corresponding to each imaging region of the display device may represent intensity of ambient light reflected by a ground background corresponding to each imaging region of the display device, that is, intensity of ambient light corresponding to each imaging region. In addition, the ground background corresponding to each imaging region of the display device is determined based on an eye location of a driver and a location of each imaging region of the display device. The location of each imaging region of the display device is usually fixed, and the eye location of the driver may change. Therefore, the ground background corresponding to each imaging region is accurately determined based on the eye location. In this way, the intensity of the ambient light corresponding to each imaging region of the display device is accurately determined based on the image information in front of the vehicle and the eye location.

For example, an image in front of the vehicle that is captured by a DVR of the vehicle may be obtained, and grayscale values of pixels in the image are obtained. Intensity information of ambient light reflected by a ground in front of the vehicle may be obtained based on the grayscale values of the pixels in the image in front of the vehicle. Coordinates of each imaging region of the display device are aligned with those of the image in front of the vehicle based on the eye location, to determine a ground background corresponding to each imaging region in the image in front of the vehicle. Then intensity of ambient light corresponding to each imaging region of the display device is determined based on the ground background corresponding to each imaging region in the image in front of the vehicle and the intensity information of the ambient light reflected by the ground in front of the vehicle.

The HUD in FIG. 19 and FIG. 20 is used as an example. For example, an image in front of the vehicle that is captured by a DVR camera may be obtained. For example, the image in front of the vehicle that is captured by the DVR may be obtained through a Controller Area Network (CAN) of the vehicle, and then a format of the image in front of the vehicle is converted into a red, green, and blue (RGB) three-channel format. It is assumed that an expression of an RGB image obtained through conversion is as follows: $G=\{(R_i, G_i, B_i)\}_{i=1:w \times h}$, where w and h indicate an image resolution. In this case, the RGB image is converted into a grayscale image and is normalized to obtain a final grayscale image $G_{gray}$, as shown in the following formula (14):

$$G_{gray} = \{(R_i \times 0.299 + G_i \times 0.587 + B_i \times 0.114)/255\}_{i=1:w \times h}, \quad (14)$$

where w and h indicate the image resolution of the RGB image, $R_i$ is light intensity of a red light channel of an $i^{th}$ pixel in an $i^{th}$ RGB image, $G_i$ is light intensity of a green light channel of the $i^{th}$ pixel in the $i^{th}$ RGB image, and $B_i$ is light intensity of a blue light channel of the $i^{th}$ pixel in the $i^{th}$ RGB image.

Because a location of a virtual image plane of the HUD in a coordinate system of a vehicle body is fixed, coordinates, in the coordinate system of the vehicle body, of spatial points corresponding to pixels in the image in front of the vehicle that is captured by the DVR camera may be pre-calibrated. It is assumed that a coordinate set of the spatial points in the coordinate system of the vehicle body is $P_w$. It is assumed that an intrinsic parameter of the DVR camera is K. It is assumed that extrinsic parameters of a coordinate system of the DVR camera relative to the coordinate system of the vehicle body are $R_x$ and $T_x$, and a coordinate set of pixels in the coordinate system of the DVR camera is $P_x$. In this case, a mapping relationship shown in the following formula (15) exists between the coordinates, in the coordinate system of the vehicle body, of the spatial points corresponding to the pixels in the image in front of the vehicle that is captured by the DVR camera and coordinates of corresponding points in the coordinate system of the DVR camera.

$$P_x = \frac{1}{Z} K \begin{bmatrix} R_x & T_x \\ 0 & 1 \end{bmatrix} P_w, \quad (15)$$

where Z is the straight-line distance between the DVR camera and a spatial point in $P_w$.

It is assumed that coordinates of current locations of eyes of the driver in the coordinate system of the vehicle body are $\{x_e, y_e, z_e\}$, a set of coordinates of center points of imaging regions in a coordinate system of the virtual image plane of the HUD on a two-dimensional (2D) plane of the virtual image plane of the HUD is $P_v$, and a current downwards angle of visibility of the virtual image plane of the HUD is θ. In this case, extrinsic parameters $R_e$ and $T_e$ of a coordinate system of the eyes relative to the coordinate system of the vehicle body are as follows:

$$R_e = \begin{bmatrix} 1 & 0 & 0 \\ 0 & \cos\theta & -\sin\theta \\ 0 & \sin\theta & \cos\theta \end{bmatrix} \quad (16)$$

$$T_e = \begin{bmatrix} x_e \\ y_e \\ z_e \end{bmatrix} \quad (17)$$

In this case, a mapping relationship shown in the following formula (18) exists between the coordinates, in the coordinate system of the vehicle body, of the spatial points corresponding to the pixels in the image in front of the vehicle that is captured by the DVR camera and coordinates of corresponding points in the coordinate system of the virtual image plane of the HUD.

$$P_v = \frac{L_{VID}}{Z_e} \begin{bmatrix} R_e^{-1} & T_e \\ 0 & 1 \end{bmatrix} P_w, \quad (18)$$

where $L_{VID}$ is a straight-line distance between the eyes of the driver and a center of the virtual image plane of the HUD, and $Z_e$ is a straight-line distance between the eyes of the driver and a spatial point in the set $P_w$.

With reference to the foregoing formulas (15) to (18), it can be learned that a mapping relationship shown in the following formula (19) exists between coordinates, in the coordinate system of the DVR camera, of the pixels in the image in front of the vehicle that is captured by the DVR camera and coordinates of corresponding points on the virtual image plane of the HUD.

$$P_x = \frac{Z_e}{Z \times L_{VID}} K \begin{bmatrix} R_x & T_x \\ 0 & 1 \end{bmatrix} \begin{bmatrix} R_e^{-1} & T_e \\ 0 & 1 \end{bmatrix}^{-1} P_y, \qquad (19)$$

where $P_x$ is the set of the coordinates of the pixels in the coordinate system of the DVR camera, $P_y$ is the set of the coordinates of the center points of the imaging regions in the coordinate system of the virtual image plane of the HUD, $Z_e$ is the straight-line distance between the eyes of the driver and the spatial point in the set $P_w$, Z is the straight-line distance between the DVR camera and the spatial point in the set $P_w$, $P_w$ is a set of the coordinates, in the coordinate system of the vehicle body, of the spatial points corresponding to the pixels in the image in front of the vehicle that is captured by the DVR camera, $L_{VID}$ is the straight-line distance between the eyes of the driver and the center of the virtual image plane of the HUD, K is the intrinsic parameter of the coordinate system of the DVR camera, $R_x$ and $T_x$ are the extrinsic parameters of the coordinate system of the DVR camera relative to the coordinate system of the vehicle body, and $R_e$ and $T_e$ are the extrinsic parameters of the coordinate system of the eyes relative to the coordinate system of the vehicle body.

Figure 22:
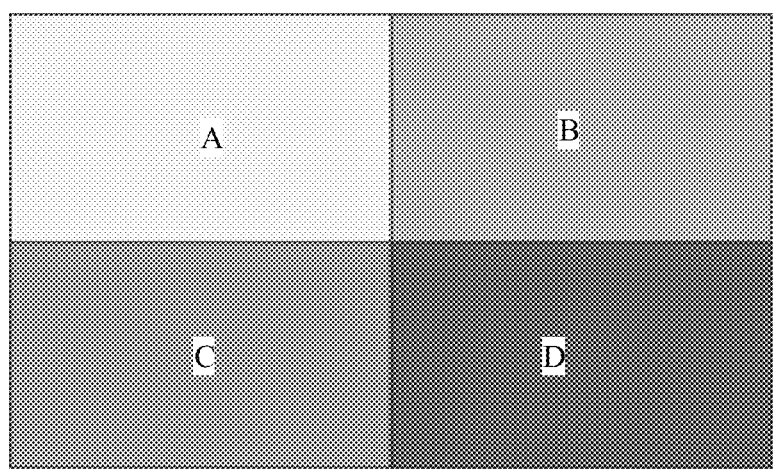
FIG. 22 shows a grayscale image of imaging regions on a virtual image plane of a HUD according to an embodiment of this application.

In this way, coordinates of a center point of each imaging region of the HUD may be aligned with those of the image in front of the vehicle that is captured by the DVR camera based on the formula (19), the eye location, and the coordinates of the center points of the imaging regions of the HUD in the coordinate system of the virtual image plane of the HUD, to obtain a pixel, in the coordinate system of the DVR camera, that corresponds to the center point of each imaging region of the HUD, that is, determine the ground background corresponding to each imaging region in the image in front of the vehicle. Then a grayscale value of the pixel, in the coordinate system of the DVR camera, that corresponds to the center point of each imaging regions of the HUD is selected from the grayscale image obtained in the foregoing formula (14). Further, an average grayscale value of each imaging region may be calculated based on the grayscale value of the pixel, in the coordinate system of the DVR camera, that corresponds to the center point of each imaging region of the HUD. In this way, a grayscale value of the ground background corresponding to each imaging region in the image in front of the vehicle that is captured by the DVR camera is converted into a grayscale value of each imaging region on the virtual image plane of the HUD. In this way, the dynamically determined grayscale value of each imaging region on the virtual image plane of the HUD can more appropriately represent the intensity of the ambient light corresponding to each imaging region. For example, FIG. 22 shows a grayscale image of imaging regions on a virtual image plane of a HUD according to an embodiment of this application. FIG. 22 shows a grayscale image corresponding to the imaging regions A, B, C, and D shown in FIG. 18.

Step 1902: Determine a target imaging region based on the intensity of the ambient light corresponding to the at least one imaging region of the display device.

For example, the target imaging region may be determined based on the intensity of the ambient light corresponding to each imaging region of the display device.

For example, if intensity of ambient light corresponding to an imaging region currently used by the display device to present content causes no interference or slight interference to sight of the driver or a passenger, the imaging region used by the display device to present content at the current moment is the target imaging region, or if intensity of ambient light corresponding to an imaging region used by the display device to present content at a current moment causes interference or large interference to sight of the driver or the passenger, an imaging region, of other imaging regions of the display device, that causes smallest interference to sight of the driver or the passenger is the target imaging region.

For example, the target imaging region may be determined based on the average grayscale value corresponding to each imaging region. For example, if an average grayscale value corresponding to the imaging region currently used to present content is greater than a preset value, for example, is 0.8, it is considered that the imaging region is overexposed and causes interference to sight of the driver or the passenger, and therefore another imaging region needs to be selected as the target imaging region. For another example, if an average grayscale value corresponding to the imaging region currently used to present content is less than the preset value, for example, is 0.1, it is considered that the imaging region is underexposed and causes interference to sight of the driver or the passenger, and therefore another imaging region needs to be selected as the target imaging region.

Step 1903: Adjust a display location of the display device based on the target imaging region.

It can be understood that, if the determined target imaging region is the imaging region that currently presents content, the display location of the display device is still the imaging region that currently presents content, or if the determined target imaging region is not the imaging region that currently presents content, the display location of the display device is adjusted to the target imaging region, that is, content is presented in the target imaging region.

Figure 23:
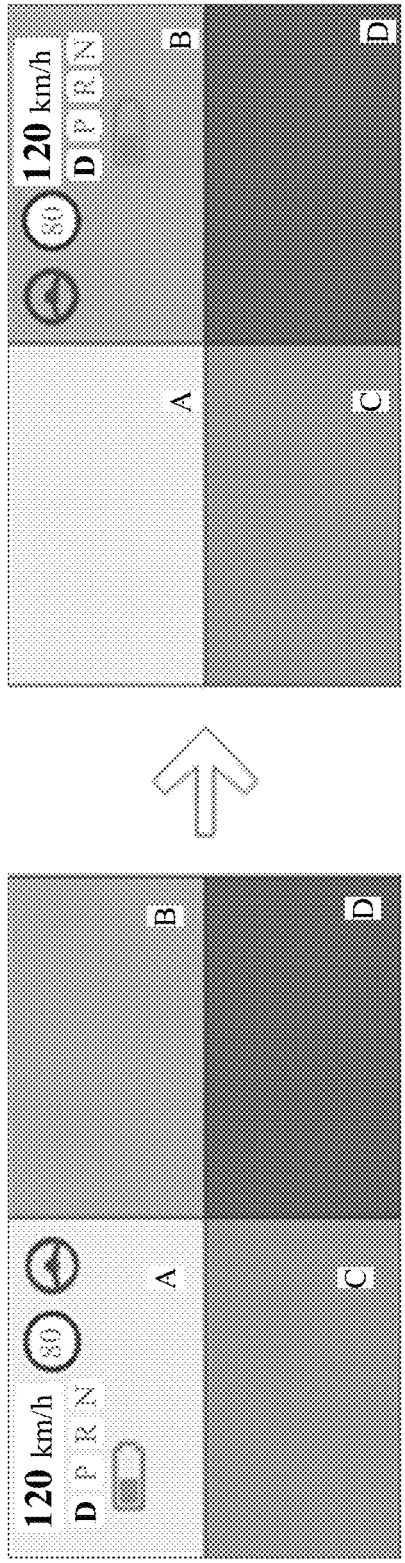
FIG. 23 is a schematic diagram of adjusting a display location on a virtual image plane of a HUD according to an embodiment of this application.

For example, FIG. 23 is a schematic diagram of adjusting a display location on a virtual image plane of a HUD according to an embodiment of this application. As shown in FIG. 23, an imaging region A is an imaging region that currently presents a 2D instrument, and an imaging region B is the determined target imaging region. In this case, the display location is adjusted to the imaging region B, and the imaging region B is used to present the 2D instrument.

In this embodiment of this application, the display location of the display device may be dynamically adjusted based on the intensity of the ambient light corresponding to each imaging region of the display device, for example, based on the grayscale value corresponding to each imaging region, to ensure that the driver can clearly see content displayed on the display device, avoid impact on sight of the driver due to excessively high or low intensity of the ambient light corresponding to the imaging region, and greatly improve driving safety.

It should be understood that the display methods shown in FIG. 5, FIG. 8, FIG. 12, and FIG. 21 may be combined with each other. For related implementation details of the display method shown in any one of FIG. 5, FIG. 8, FIG. 12, or FIG. 21 and the optional embodiments, cross reference may be made between the display methods and the related optional embodiments. Details are not described herein again.

Based on an inventive concept same as that of the foregoing method embodiments, an embodiment of this application further provides an electronic apparatus, and the electronic apparatus is configured to perform the technical solutions described in the foregoing method embodiments. For example, the steps of the display method shown in FIG. 5, FIG. 8, FIG. 12, or FIG. 21 may be performed.

Figure 24:
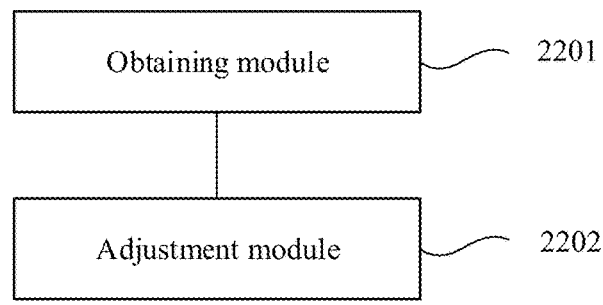
FIG. 24 is a diagram of a structure of an electronic apparatus according to an embodiment of this application.

FIG. 24 is a diagram of a structure of an electronic apparatus according to an embodiment of this application. As shown in FIG. 24, the electronic apparatus may include an obtaining module 2201 configured to obtain environment information corresponding to a vehicle, where the environment information includes light intensity information and/or location information, and an adjustment module 2202 configured to adjust a display mode of a display device of the vehicle based on the environment information, where the display mode includes at least one of display brightness, a display location, display content, a display color, a display style, or a display size.

In this embodiment of this application, the environment information corresponding to the vehicle is obtained, and the display mode of the display device is adjusted based on the environment information, so that the display mode of the display device can adapt to a current environment, to improve display effect and driving safety.

In a possible implementation, the location information includes a location of the vehicle and/or a location of a region in which ambient light is blocked in a traveling direction of the vehicle, and the adjustment module 2202 is further configured to determine a first distance between the vehicle and the region in which ambient light is blocked based on the location of the vehicle and/or the location of the region in which ambient light is blocked, and adjust the display mode of the display device based on the first distance.

In a possible implementation, the location information includes a location of the vehicle and/or a location of a region in which ambient light is blocked in a traveling direction of the vehicle, and the adjustment module 2202 is further configured to adjust the display mode of the display device of the vehicle based on the location of the vehicle and/or the location of the region in which ambient light is blocked in the traveling direction of the vehicle.

In a possible implementation, the display mode includes first display brightness, the light intensity information includes intensity of ambient light received by an optical element of the display device and/or intensity of ambient light corresponding to an imaging location of the display device, and the adjustment module 2202 is further configured to adjust the first display brightness of the display device based on the intensity of the ambient light received by the optical element of the display device and/or the intensity of the ambient light corresponding to the imaging location of the display device, where the first display brightness is positively correlated with the intensity of the ambient light received by the optical element of the display device, and is positively correlated with the intensity of the ambient light corresponding to the imaging location of the display device.

In a possible implementation, the light intensity information further includes intensity of ambient light corresponding to at least one imaging region of the display device, the display mode includes the display location, and the adjustment module 2202 is further configured to determine a target imaging region based on the intensity of the ambient light corresponding to the at least one imaging region of the display device, and adjust the display location of the display device based on the target imaging region.

In a possible implementation, the adjustment module 2202 is further configured to adjust the display mode of the display device when the first distance is less than a preset distance.

In a possible implementation, the display mode includes second display brightness, and the adjustment module 2202 is further configured to adjust the second display brightness based on the first distance, where the second display brightness is negatively correlated with the first distance.

In a possible implementation, the display device includes a HUD, the light intensity information includes intensity of ambient light received by an optical element of an optical device of the HUD, and the obtaining module 2201 is further configured to obtain an incidence angle corresponding to ambient light received at a light outlet of the optical device of the HUD, an emergence angle corresponding to emergent light of the HUD, and intensity of the ambient light received at the light outlet of the optical device of the HUD, and determine, based on the incidence angle, the emergence angle, and the intensity of the ambient light received at the light outlet, the intensity of the ambient light received by the optical element of the optical device of the HUD, where the intensity of the ambient light received by the optical element of the optical device of the HUD is positively correlated with the intensity of the ambient light received at the light outlet, and is negatively correlated with a difference between the incidence angle and the emergence angle.

In a possible implementation, the display device includes a HUD, the light intensity information includes intensity of ambient light received by an optical element of an optical device of the HUD, and the obtaining module 2201 is further configured to determine a first included angle between the ambient light and a horizontal plane and a second included angle between a projection of the ambient light on the horizontal plane and a traveling direction of the vehicle, determine a third included angle between emergent light of the HUD and the horizontal plane and a fourth included angle between a projection of the emergent light of the HUD on the horizontal plane and the traveling direction of the vehicle, determine a first difference between the first included angle and the third included angle and a second difference between the second included angle and the fourth included angle, and determine, based on the first difference, the second difference, and intensity of ambient light received at a light outlet of the optical device of the HUD, the intensity of the ambient light received by the optical element of the optical device of the HUD, where the intensity of the ambient light received by the optical element of the optical device of the HUD is positively correlated with the intensity of the ambient light received at the light outlet of the optical device of the HUD, is negatively correlated with the first difference, and is negatively correlated with the second difference.

In a possible implementation, the obtaining module 2201 is further configured to obtain image information in front of the vehicle and an eye location, and determine, based on the image information and the eye location, the intensity of the ambient light corresponding to the at least one imaging region of the display device.

In a possible implementation, the ambient light includes direct sunlight and/or sunlight reflected by a reflective object.

In a possible implementation, the obtaining module 2201 is further configured to obtain a distance between a mark point corresponding to the region in which ambient light is blocked and the region in which ambient light is blocked, where the mark point is set beyond the region in which ambient light is blocked, and the adjustment module 2202 is further configured to adjust the display mode of the display device based on the first distance, the preset distance, and the distance between the mark point and the region in which ambient light is blocked.

For technical effect and specific descriptions of the electronic apparatus shown in FIG. 24 and the possible implementations of the electronic apparatus, refer to the foregoing display methods. Details are not described herein again.

It should be understood that the module division of the foregoing apparatus is merely logical function division. During actual implementation, all or some of the modules may be integrated into one physical entity or may be physically separated. In addition, the modules of the apparatus may be implemented in a form of a processor invoking software. For example, the apparatus includes a processor, the processor is connected to a memory, the memory stores instructions, and the processor invokes the instructions stored in the memory to implement any one of the foregoing methods or implement functions of the modules of the apparatus. For example, the processor is a general purpose processor, for example, a CPU or a microprocessor, and the memory is a memory inside the apparatus or a memory outside the apparatus. Alternatively, the modules of the apparatus may be implemented in a form of a hardware circuit, and functions of some or all of the modules may be implemented through a design of the hardware circuit. The hardware circuit may be understood as one or more processors. For example, in an implementation, the hardware circuit is an application-specific integrated circuit (ASIC), and functions of some or all of the foregoing modules are implemented through a design of a logical relationship between elements in the circuit. For another example, in another implementation, the hardware circuit may be implemented by using a programmable logic device (PLD), for example, a field-programmable gate array (FPGA). The field programmable gate array may include a large quantity of logic gate circuits, and a connection relationship between the logic gate circuits is configured by using a configuration file, to implement functions of some or all of the foregoing modules. All modules of the foregoing apparatus may be implemented in a form of a processor invoking software, or all modules may be implemented in a form of a hardware circuit, or some modules may be implemented in a form of a processor invoking software, and remaining modules may be implemented in a form of a hardware circuit.

In this embodiment of this application, the processor is a circuit with a signal processing capability. In an implementation, the processor may be a circuit with an instruction reading and running capability, for example, a CPU, a microprocessor, a graphics processing unit (GPU) (which may be understood as a microprocessor), or a digital signal processor (DSP). In another implementation, the processor may implement a specific function based on a logical relationship of a hardware circuit. The logical relationship of the hardware circuit is fixed or reconfigurable. For example, the processor is a hardware circuit implemented by using an ASIC or a PLD, for example, is an FPGA. In a reconfigurable hardware circuit, a process of loading, by a processor, a configuration file to configure the hardware circuit may be understood as a process of loading, by the processor, instructions to implement functions of some or all of the foregoing modules.

It can be learned that the modules of the foregoing apparatus may be configured as one or more processors (or processing circuits) for implementing the methods in the foregoing embodiments, for example, a CPU, a GPU, a microprocessor, a DSP, an ASIC, an FPGA, or a combination of processors in at least two of these forms.

In addition, all or some of the modules of the foregoing apparatus may be integrated, or the modules may be implemented independently. In an implementation, the modules are integrated and implemented in a form of an SOC. The SOC may include at least one processor configured to implement any one of the foregoing methods or implement functions of the modules of the apparatus. The at least one processor may include different types, for example, include a CPU and an FPGA, a CPU and an artificial intelligence processor, or a CPU and a GPU.

An embodiment of this application further provides an electronic apparatus, including a processor and a memory configured to store executable instructions of the processor, where the processor is configured to execute the instructions to implement the methods in the foregoing embodiments. For example, the steps of the display method shown in FIG. 5, FIG. 8, FIG. 12, or FIG. 21 may be implemented.

Figure 25:
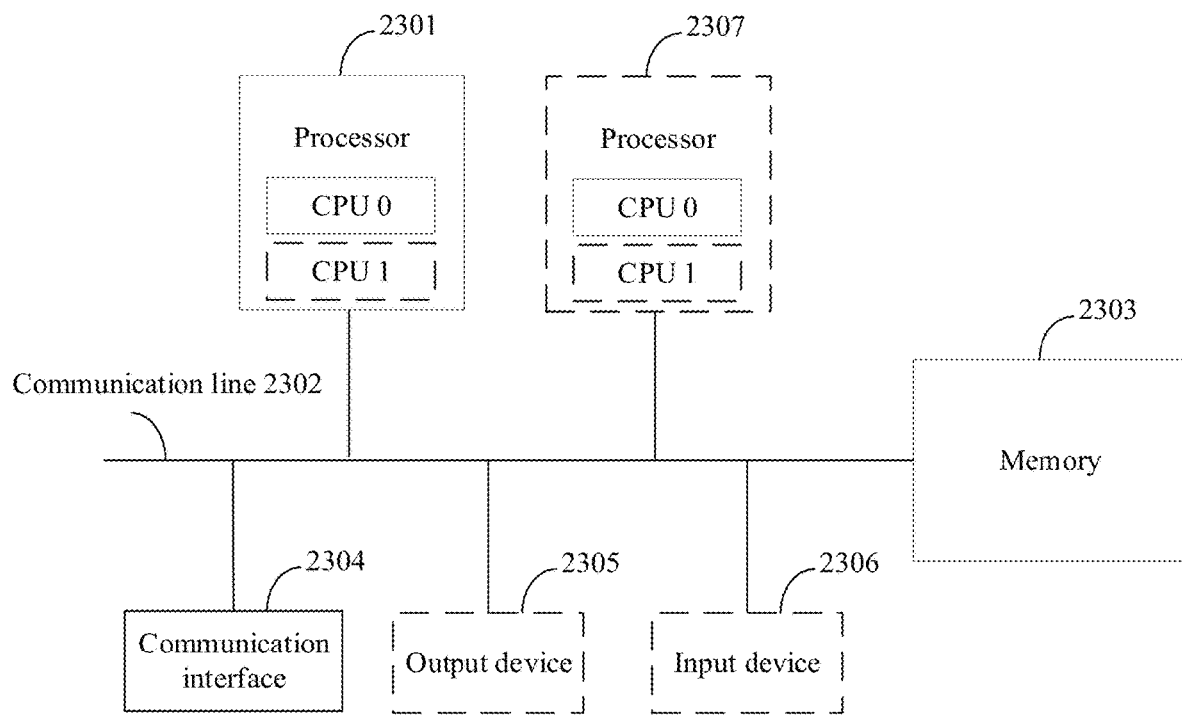
FIG. 25 is a schematic diagram of a structure of an electronic apparatus according to an embodiment of this application.

FIG. 25 is a schematic diagram of a structure of an electronic apparatus according to an embodiment of this application. As shown in FIG. 25, the electronic apparatus may include at least one processor 2301, a communication line 2302, a memory 2303, and at least one communication interface 2304.

The processor 2301 may be a general-purpose central processing unit, a microprocessor, an application-specific integrated circuit, or one or more integrated circuits for controlling execution of programs of solutions of this application.

The communication line 2302 may include a channel for transmitting information between the foregoing components.

The communication interface 2304 is any apparatus such as a transceiver, and is configured to communicate with another device or a communication network such as Ethernet, a radio access network (RAN), or a wireless local area network (WLAN).

The memory 2303 may be a read-only memory (ROM) or another type of static storage device capable of storing static information and instructions, or a random-access memory (RAM) or another type of dynamic storage device capable of storing information and instructions, or may be an electrically erasable programmable ROM (EEPROM), a compact disc (CD) ROM (CD-ROM) or another optical disk storage, an optical disc storage (including a CD, a laser disc, an optical disc, a DIGITAL VERSATILE DISC (DVD), a BLU-RAY disc, or the like), a magnetic disk storage medium or another magnetic storage device, or any other medium that can carry or store expected program code in a form of an instruction or a data structure and that can be accessed by a computer, but is not limited thereto. The memory may exist independently, and is connected to the processor through the communication line 2302. The memory may alternatively be integrated with the processor. Usually, the memory provided in this embodiment of this application may be non-volatile. The memory 2303 is configured to store computer-executable instructions for performing solutions in this application, and the processor 2301 controls execution of the computer-executable instructions. The processor 2301 is configured to execute the computer-executable instructions stored in the memory 2303, to implement the methods provided in the foregoing embodiments of this application. For example, the steps of the display method shown in FIG. 5, FIG. 8, FIG. 12, or FIG. 21 may be implemented.

The processor, the processing chip, the processing apparatus, and the like in this embodiment of this application may also be referred to as a controller, a control chip, and a control apparatus. It should be understood that the unit division of the foregoing apparatus is merely logical function division. During actual implementation, all or some of the units may be integrated into one physical entity or may be physically separated. In addition, the units of the apparatus may be implemented in a form of a processor invoking software. For example, the apparatus includes a processor, the processor is connected to a memory, the memory stores instructions, and the processor invokes the instructions stored in the memory to implement any one of the foregoing methods or implement functions of the units of the apparatus. For example, the processor is a general purpose processor, for example, a CPU or a microprocessor, and the memory is a memory inside the apparatus or a memory outside the apparatus. Alternatively, the units of the apparatus may be implemented in a form of a hardware circuit, and functions of some or all of the units may be implemented through a design of the hardware circuit. The hardware circuit may be understood as one or more processors. For example, in an implementation, the hardware circuit is an ASIC, and functions of some or all of the foregoing units are implemented through a design of a logical relationship between elements in the circuit. For another example, in another implementation, the hardware circuit may be implemented by using a PLD, for example, an FPGA. The FPGA may include a large quantity of logic gate circuits, and a connection relationship between the logic gate circuits is configured by using a configuration file, to implement functions of some or all of the foregoing units. All units of the foregoing apparatus may be implemented in a form of a processor invoking software, or all units may be implemented in a form of a hardware circuit, or some units may be implemented in a form of a processor invoking software, and remaining units may be implemented in a form of a hardware circuit.

In this embodiment of this application, the processor is a circuit with a signal processing capability. In an implementation, the processor may be a circuit with an instruction reading and running capability, for example, a CPU, a microprocessor, a GPU (which may be understood as a microprocessor), or a DSP. In another implementation, the processor may implement a specific function based on a logical relationship of a hardware circuit. The logical relationship of the hardware circuit is fixed or reconfigurable. For example, the processor is a hardware circuit implemented by using an ASIC or a PLD, for example, is an FPGA. In a reconfigurable hardware circuit, a process of loading, by a processor, a configuration file to configure the hardware circuit may be understood as a process of loading, by the processor, instructions to implement functions of some or all of the foregoing units. In addition, the processor may alternatively be a hardware circuit designed for artificial intelligence, and may be understood as an ASIC, for example, a neural network processing unit (NPU), a tensor processing unit (TPU), or a deep learning processing unit (DPU).

It can be learned that the units of the foregoing apparatus may be configured as one or more processors (or processing circuits) for implementing the foregoing methods, for example, a CPU, a GPU, an NPU, a TPU, a DPU, a microprocessor, a DSP, an ASIC, an FPGA, or a combination of processors in at least two of these forms.

Optionally, the computer-executable instructions in this embodiment of this application may also be referred to as application program code. This is not limited in this embodiment of this application.

For example, the processor 2301 may include one or more CPUs, for example, a CPU 0 and a CPU 1 in FIG. 25.

For example, the electronic apparatus may include a plurality of processors, for example, the processor 2301 and a processor 2307 in FIG. 25. Each of the processors may be a single-core processor, or may be a multi-core processor. The processor herein may be one or more devices, circuits, and/or processing cores for processing data (for example, computer program instructions).

During specific implementation, in an embodiment, the electronic apparatus may further include an output device 2305 and an input device 2306. The output device 2305 communicates with the processor 2301, and may display information in a plurality of manners. For example, the output device 2305 may be a liquid-crystal display (LCD), a light-emitting diode (LED) display device, a cathode-ray tube (CRT) display device, or a projector, for example, may be a display device such as a vehicle-mounted HUD, an AR-HUD, or a display. The input device 2306 communicates with the processor 2301, and may receive user input in a plurality of manners. For example, the input device 2306 may be a mouse, a keyboard, a touchscreen device, or a sensing device.

In an example, with reference to the electronic apparatus shown in FIG. 25, the obtaining module 2201 in FIG. 24 may be implemented by using the communication interface 2304 in FIG. 25, and the adjustment module 2202 in FIG. 24 may be implemented by using the processor 2301 in FIG. 25.

An embodiment of this application provides a display system, including a display device, a capture device configured to capture environment information, and the electronic apparatus according to any one of the foregoing embodiments.

In an example, the display system may be a vehicle, a display system including an automobile head unit and a display device, or a display device having a processor and a display. For example, the display device may be a device with a display capability in a vehicle-mounted component such as a HUD, an AR-HUD, or a display, and the capture device may be a sensing apparatus with a capture or measurement function. For example, the display device may be the display device 20 shown in FIG. 2 or FIG. 3, the capture device may be the capture device 10 shown in FIG. 3, and the electronic apparatus may include the electronic apparatus shown in FIG. 24.

Figure 26:
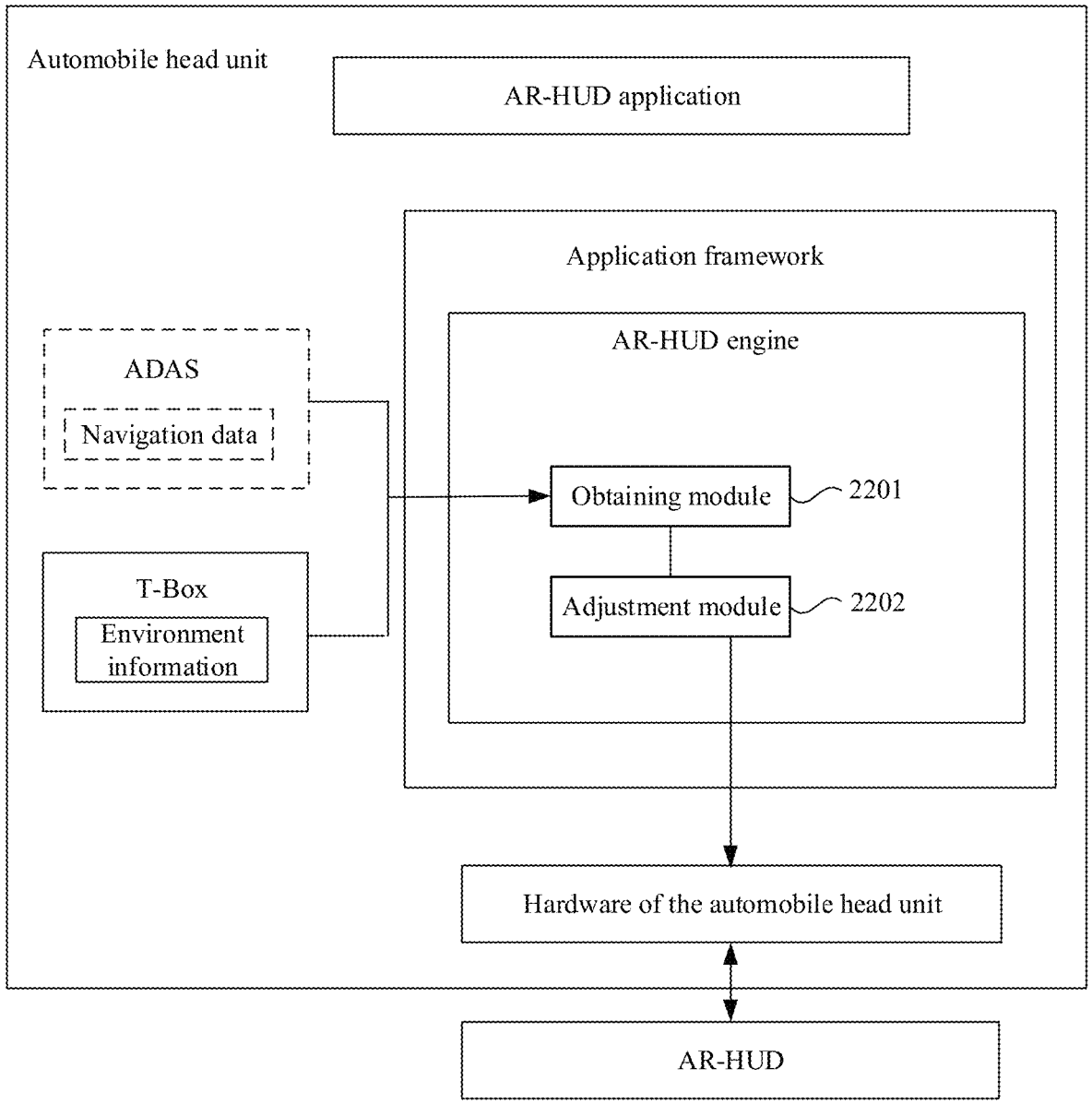
FIG. 26 is a schematic diagram of a structure of a display system according to an embodiment of this application.

In another example, the electronic apparatus shown in FIG. 24 may be deployed in an automobile head unit, and the display device may be an AR-HUD. FIG. 26 is a schematic diagram of a structure of a display system according to an embodiment of this application. As shown in FIG. 26, the electronic apparatus may be deployed in an AR-HUD engine at an application framework layer of the automobile head unit. The obtaining module 2201 may obtain, through a vehicle-mounted intelligent terminal (or telematics box (T-Box)), environment information captured by the capture device, and may further obtain navigation data from an advanced driver-assistance systems (ADAS). The adjustment module 2202 processes the data obtained by the obtaining module 2201 to obtain a display parameter value of an optical device of the AR-HUD, and sends the display parameter value to the AR-HUD. The AR-HUD adjusts a display mode based on the display parameter value, to complete adjustment of the display mode.

An embodiment of this application provides a computer-readable storage medium. The computer-readable storage medium stores program code. When the program code is executed by an electronic apparatus or a processor in an electronic apparatus, the methods in the foregoing embodiments are implemented. For example, the steps of the display method shown in FIG. 5, FIG. 8, FIG. 12, or FIG. 21 may be implemented.

An embodiment of this application provides a computer program product. For example, the computer program product may include computer-readable code, or a non-volatile computer-readable storage medium that carries computer-readable code. Program code included in the computer program product is executed by an electronic apparatus or a processor in an electronic apparatus to implement the methods in the foregoing embodiments. For example, the steps of the display method shown in FIG. 5, FIG. 8, FIG. 12, or FIG. 21 may be performed.

The computer-readable storage medium may be a tangible device capable of retaining and storing instructions to be used by an instruction execution device. For example, the computer-readable storage medium may be but is not limited to an electronic storage device, a magnetic storage device, an optical storage device, an electromagnetic storage device, a semiconductor storage device, or any suitable combination thereof. More specific examples (a non-exhaustive list) of the computer-readable storage media include a portable computer disk, a hard disk, a RAM, a ROM, an erasable programmable ROM (EPROM), a flash memory), a static RAM (SRAM), a portable CD-ROM, a DVD, a memory stick, a floppy disk, a mechanical encoding device, for example, a punched card storing instructions or a protrusion structure in a groove, and any suitable combination thereof. The computer-readable storage medium used herein is not construed as a transient signal, such as a radio wave or another freely propagating electromagnetic wave, an electromagnetic wave propagating through a waveguide or another transmission medium (for example, an optical pulse propagating through a fiber-optic cable), or an electrical signal transmitted through a wire.

The computer-readable program instructions described herein may be downloaded from the computer-readable storage medium to each computing/processing device or to an external computer or an external storage device through a network such as the Internet, a local area network, a wide area network, and/or a wireless network. The network may include a copper transmission cable, fiber-optic transmission, wireless transmission, a router, a firewall, a switch, a gateway computer, and/or an edge server. A network adapter card or a network interface in each computing/processing device receives the computer-readable program instructions from the network, and forwards the computer-readable program instructions for storage in a computer-readable storage medium in the computing/processing device.

The computer program instructions for performing operations in this application may be assembly instructions, instruction set architecture (ISA) instructions, machine instructions, machine-related instructions, microcode, firmware instructions, status setting data, or source code or object code written in one programming language or any combination of a plurality of programming languages. The programming languages include an object-oriented programming language such as SMALLTALK or C++, and a conventional procedural programming language such as a "C" language or a similar programming language. The computer-readable program instructions may be completely executed on a user computer, partially executed on a user computer, executed as a separate software package, partially executed on a user computer and partially executed on a remote computer, or completely executed on a remote computer or server. When a remote computer is used, the remote computer may be connected to a user computer through any type of network, including a local area network (LAN) or a wide area network (WAN), or may be connected to an external computer (for example, connected through the Internet via an Internet service provider). In some embodiments, an electronic circuit, for example, a programmable logic circuit, an FPGA, or a programmable logic array (PLA), is customized by using status information of the computer-readable program instructions. The electronic circuit may execute the computer-readable program instructions to implement various aspects of this application.

Various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

The computer-readable program instructions may be provided for a processor of a general-purpose computer, a dedicated computer, or another programmable data processing apparatus to produce a machine. Therefore, when the instructions are executed by the processor of the computer or the other programmable data processing apparatus, an apparatus for implementing functions/actions specified in one or more blocks in the flowcharts and/or block diagrams is produced. The computer-readable program instructions may alternatively be stored in the computer-readable storage medium. The instructions enable a computer, a programmable data processing apparatus, and/or another device to operate in a specific manner. Therefore, the computer-readable medium storing the instructions includes an artifact that includes instructions for implementing various aspects of functions/actions specified in one or more blocks in the flowcharts and/or block diagrams.

The computer-readable program instructions may alternatively be loaded to a computer, another programmable data processing apparatus, or another device, so that a series of operation steps are performed on the computer, the other programmable data processing apparatus, or the other device to produce a computer-implemented process. Therefore, the instructions executed on the computer, the other programmable data processing apparatus, or the other device implement functions/actions specified in one or more blocks in the flowcharts and/or block diagrams.

The flowcharts and block diagrams in the accompanying drawings show system architectures, functions, and operations of possible implementations of systems, methods, and computer program products in a plurality of embodiments of this application. In this regard, each block in the flowcharts or block diagrams may represent a module, a program segment, or some instructions, and the module, the program segment, or the instructions include one or more executable instructions for implementing a specified logical function. In some alternative implementations, functions marked in blocks may alternatively be performed in a sequence different from that marked in the accompanying drawings. For example, two consecutive blocks may actually be performed substantially in parallel, or may sometimes be performed in a reverse order. This depends on a function to be implemented. It should also be noted that each block in the block diagrams and/or flowcharts, and a combination of blocks in the block diagrams and/or flowcharts may be implemented by a dedicated hardware-based system that performs a specified function or action, or may be implemented by a combination of dedicated hardware and computer instructions.

Embodiments of this application are described above. The foregoing descriptions are examples but are not exhaustive, and are not limited to the disclosed embodiments. Many modifications and variations are clear to a person of ordinary skill in the art without departing from the scope and spirit of the described embodiments. Selection of terms used in this specification is intended to best explain principles and practical applications of embodiments or improvements made to technologies on the market, or to enable a person of ordinary skill in the art to understand embodiments disclosed in this specification.

With development of economy and a rapid increase of a vehicle population, vehicle technologies and computer technologies are increasingly integrated. Intelligent vehicles have become a new trend of vehicle development. In addition to technologies such as automated driving and a high-definition map, man-machine interaction for an intelligent cockpit has also become a hot technology that attracts much attention.

Figure 27:
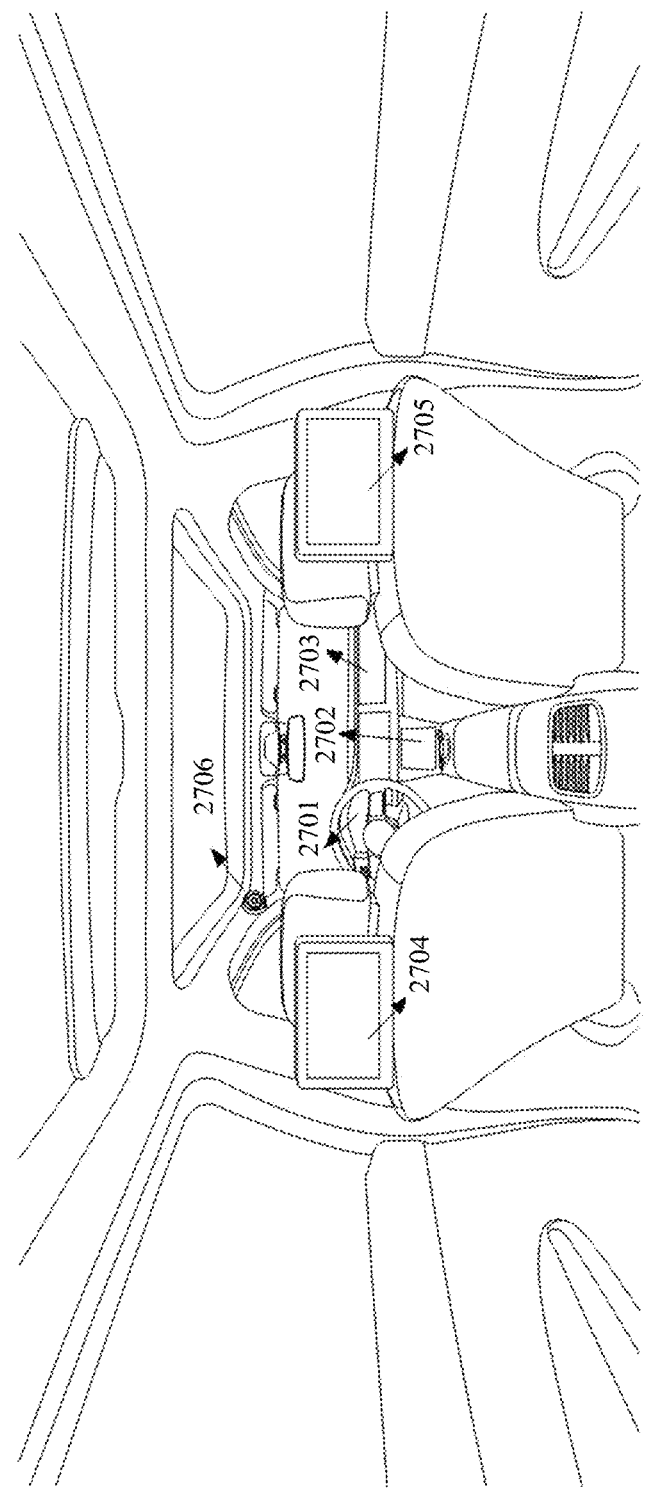
FIG. 27 is a schematic diagram of a structure of a cockpit of a vehicle according to an embodiment of this application.

FIG. 27 is a schematic diagram of a structure of a cockpit of a vehicle according to an embodiment of this application. In the cockpit of the vehicle, an automobile head unit, also referred to as an in-vehicle audio and video entertainment system, may be disposed in a central control region of the vehicle, and a screen connected to the automobile head unit may also be referred to as a central control display or a central control screen. With gradual expansion of digital display in cockpits, in some vehicles, a plurality of displays or a large screen that supports split-screen are disposed in a cockpit, to display content such as a digital dashboard, and an in-vehicle entertainment system. As shown in FIG. 27, a plurality of displays is disposed in the cockpit, including a digital instrument display 2701, a central control screen 2702, an entertainment display 2703 in front of a passenger in a co-driver seat, and entertainment displays 2704 and 2705 in front of passengers in rear seats. To implement different visual functions in the cockpit, a plurality of independent cameras 2706 may be usually mounted at different locations in the cockpit, for example, at locations such as an A-pillar, a B-pillar, a steering pillar, a central control region, an internal rearview mirror region, and a steering wheel region.

Vehicles are highly sensitive scenarios, and display experience of vehicles is worth studying.

Figure 28:
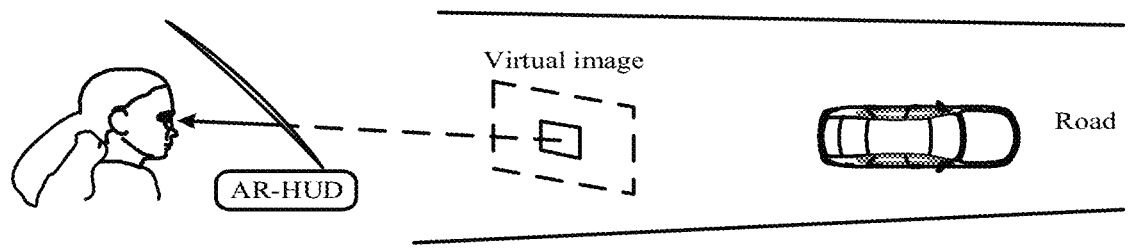
FIG. 28 and FIG. 29 are schematic diagrams of an application scenario of a projection method according to an embodiment of this application.
Figure 29:
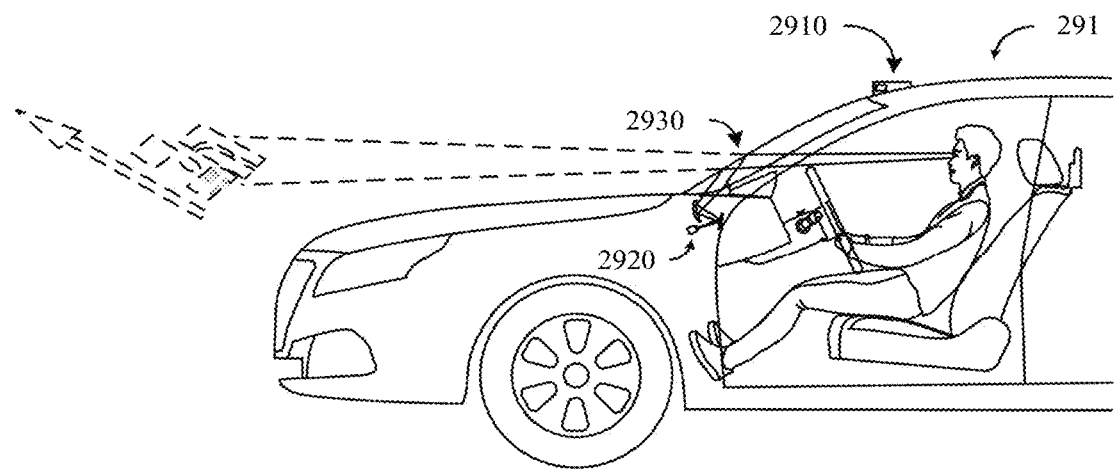

As shown in FIG. 27 to FIG. 29, a HUD is a display apparatus for projecting an image to a field of view in front of a driver. The HUD may project, according to a principle of optical reflection, important related information in a form of a two-dimensional image to a windshield of the vehicle at a height roughly horizontal to eyes of the driver. When looking forward through the windshield, the driver may see that the two-dimensional image projected by the HUD is displayed on a virtual image plane in front of the windshield. Compared with a conventional instrument and central control screen, the driver does not need to lower the head when observing the image of the HUD. This avoids frequent switching between the image and a road surface, reduces emergency response time, and improves driving safety. An AR-HUD proposed in recent years may integrate an image displayed by a HUD and real road surface information to enhance obtaining of road information by the driver and implement functions such as virtual display (or AR) navigation and AR warning.

To implement functions such as road navigation and warning of the AR-HUD, three-dimensional perception data obtained by a sensor needs to be sent to virtual three-dimensional space for rendering based on augmented reality effect. After the rendering is completed, the three-dimensional perception data is mapped to a two-dimensional virtual image plane displayed by the HUD, and is finally mapped back to the three-dimensional space through eyes.

FIG. 28 and FIG. 29 are schematic diagrams of an application scenario of a projection method according to an embodiment of this application. As shown in FIG. 28 to FIG. 29, the application scenario in this embodiment relates to a vehicle. The vehicle 291 has a capture apparatus 2910, a projection apparatus 2920, and a display apparatus 2930.

The capture apparatus 2910 may include an out-of-vehicle capture apparatus and an in-vehicle capture apparatus. The out-of-vehicle capture apparatus may be a light detection and ranging (lidar), a vehicle-mounted camera, or another one or more devices with an image capture or optical scanning function, may be disposed on the top or at the head of the vehicle 291, or on a side, facing the outside of the vehicle, of a rearview mirror in a cockpit of the vehicle, and may be mounted in the vehicle or outside the vehicle. The out-of-vehicle capture apparatus is mainly configured to detect and capture image information and location information of an environment in front of the vehicle. The environment in front of the vehicle may include related information such as a vehicle in front, an obstacle, and a road sign. The in-vehicle capture apparatus may be a device such as a vehicle-mounted camera or an eye detector. During specific implementation, a mounting location of the in-vehicle capture apparatus may be set according to a requirement. For example, the in-vehicle capture apparatus may be disposed at an A-pillar or a B-pillar in the cockpit of the vehicle, or on a side, facing a user, of the rearview mirror in the cockpit of the vehicle, or may be disposed in a region near a steering wheel or a center console, or may be disposed above a display behind a seat. The in-vehicle capture apparatus is mainly configured to detect and capture eye location information of a driver or a passenger in the cockpit of the vehicle. There may be one or more in-vehicle capture apparatuses. A location and a quantity of in-vehicle capture apparatuses are not limited in this application.

The projection apparatus 2920 may be a HUD, an AR-HUD, or another device with a projection function, and may be mounted above or inside the center console in the cockpit of the vehicle. The projection apparatus 2920 usually includes a projector, a reflector, a projection mirror, an adjustment motor, and a control unit. The control unit is an electronic device, and may be a conventional chip processor such as a CPU or a microprocessor (or MCU), or may be terminal hardware such as a mobile phone or a tablet computer. The control unit is communicatively connected to the capture apparatus 2910 and the display apparatus 2930. An imaging model may be preset in the control unit, or the control unit may obtain an imaging model preset in another device of the vehicle. A parameter of the imaging model is associated with the eye location information captured by the in-vehicle capture apparatus, and the parameter can be calibrated based on the eye location information. Then a to-be-projected image is generated based on the environment information captured by the out-of-vehicle capture apparatus, and is output on the projector. As shown in FIG. 29, the projected image may include an augmented reality display image generated based on the environment information, and may further include images of a vehicle speed, navigation, and the like.

The display apparatus 2930 may be a front windshield of the vehicle or an independently displayed transparent screen, and is configured to reflect image light transmitted by the projection apparatus to eyes of the user, so that the user can see a virtual image with depth-of-field effect when looking out of the vehicle through the display apparatus 2930. In addition, the virtual image blends with a real-world environment, to present augmented reality display effect to the user.

In an example, the capture apparatus 2910 may be the capture device 10 in FIG. 2 to FIG. 4, the projection apparatus 2920 may be the display device 20 in FIG. 2 to FIG. 4, and the display apparatus 2930 may be the imaging device 30 in FIG. 2 to FIG. 4.

The capture apparatus 2910, the projection apparatus 2920, and another apparatuses may perform data communication through wired communication or wireless communication (for example, BLUETOOTH or WI-FI). For example, after capturing image information, the capture apparatus 2910 may transmit the image information to the projection apparatus 2920 through BLUETOOTH communication. For another example, the projection apparatus 2920 may send control signaling to the capture apparatus 2910 through BLUETOOTH communication, and adjust a capture parameter, for example, a shooting angle, of the capture apparatus 2910. It should be understood that data processing may be completed in the projection apparatus 2920, the capture apparatus 2910, or another processing device, for example, a device such as the automobile head unit or a vehicle-mounted computer.

According to the foregoing structure, the vehicle can implement augmented reality display effect based on real-world environment information, and can adjust a generated projected image based on eye location information of the user, so that an augmented reality display image displayed through projection blends with the real-world environment information as much as possible, to improve immersive visual experience of the user.

Figure 30:
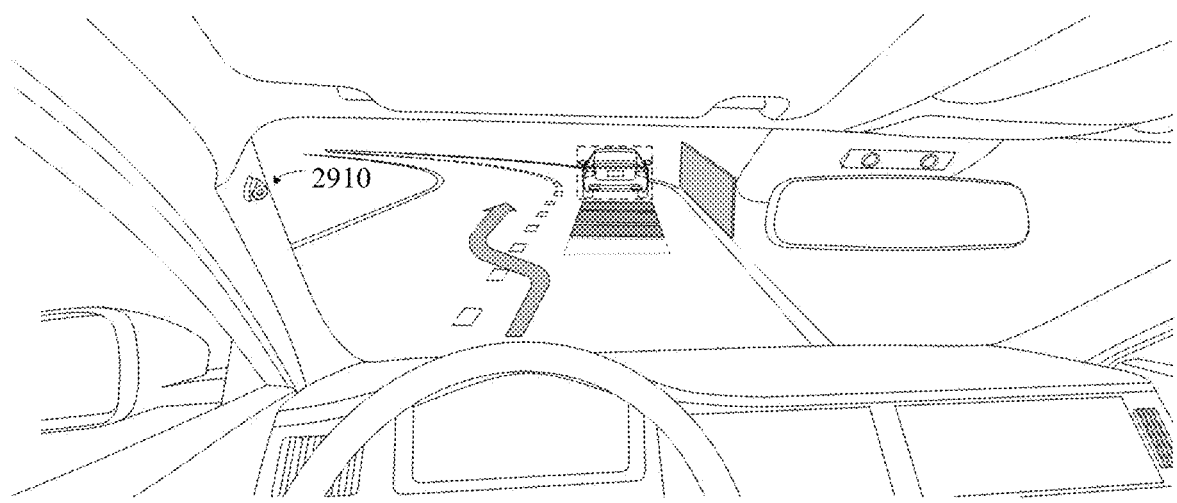
FIG. 30 is a flowchart of a display method according to an embodiment of this application.

FIG. 30 of shows a display method according to an embodiment of this application. The method may be performed by one or more of a display apparatus, a processing apparatus, or a control apparatus. The display apparatus may be a device with a display capability in a vehicle-mounted apparatus such as a HUD, an AR-HUD, or a display. The processing apparatus may be configured to obtain information and process data. The control apparatus may be further configured to control the display apparatus to perform display. The processing apparatus and the control apparatus may be apparatuses such as a processor and a controller.

S401: Obtain environment information of a vehicle.

Herein, the environment information of the vehicle may be one or more of parameters such as location information of the vehicle, ambient brightness, a height, road condition information, time information, information about a surrounding building, and sensing information. The location information of the vehicle may include a positioning location of the vehicle, for example, GPS positioning or a longitude/latitude. The location information of the vehicle may further include a current scenario, for example, in a tunnel, under an elevated highway, on an elevated highway, or on a smooth road. The time information may include one or more of parameters such as a current time point, estimated time of arrival at a destination, and estimated time of arrival at a key node in a trip. The sensing information may be one or more of the following information obtained by a sensor: light intensity of an optical device of a HUD, an incidence angle, brightness of ambient light for the vehicle, display brightness of a display, and brightness in a cockpit. The sensor may be a brightness sensor, a geographical location sensor, or the like. The foregoing information may be information directly captured by the sensor, or may be information processed by the sensor or another apparatus.

S402: Adjust display brightness for the vehicle based on the environment information of the vehicle.

The display brightness for the vehicle may be adjusted based on the foregoing vehicle information. For example, display brightness of a vehicle-mounted display of the vehicle is adjusted. The vehicle-mounted display may be a central control screen, a digital instrument display, an entertainment display, or the like in the vehicle. The vehicle-mounted display may alternatively be a display apparatus such as a HUD or an AR-HUD.

For example, the display brightness for the vehicle may be adjusted when the vehicle is to enter or has entered a tunnel environment. For another example, the display brightness for the vehicle may be adjusted during traveling of the vehicle when it is found that light is blocked by another building (for example, a high-rise building, an elevated highway, or an overpass) and display effect is poor. For another example, the display brightness for the vehicle may be adjusted during traveling of the vehicle when there is strong light or brightness changes abruptly. For another example, the display brightness for the vehicle may be adjusted if a user is affected by sunlight. Impact of sunlight on eyes may be determined based on one or more of parameters such as a season, weather, and a vehicle location. For example, the display brightness for the vehicle is adjusted in a scenario in which visual experience of the user affected, a road surface in front is unclear, or a light spot is seen.

Through the foregoing adjustment, impact of a brightness change perceived by the user on display effect can be reduced, to improve driving safety. A road or a road condition environment that the vehicle is to pass in the future or the like may be predicted, and then adjustment is performed in advance, to weaken awareness of the user, reduce impact of a light window of the HUD on sight of the user, and reduce a probability of a danger during driving in a special road section.

Figure 31:
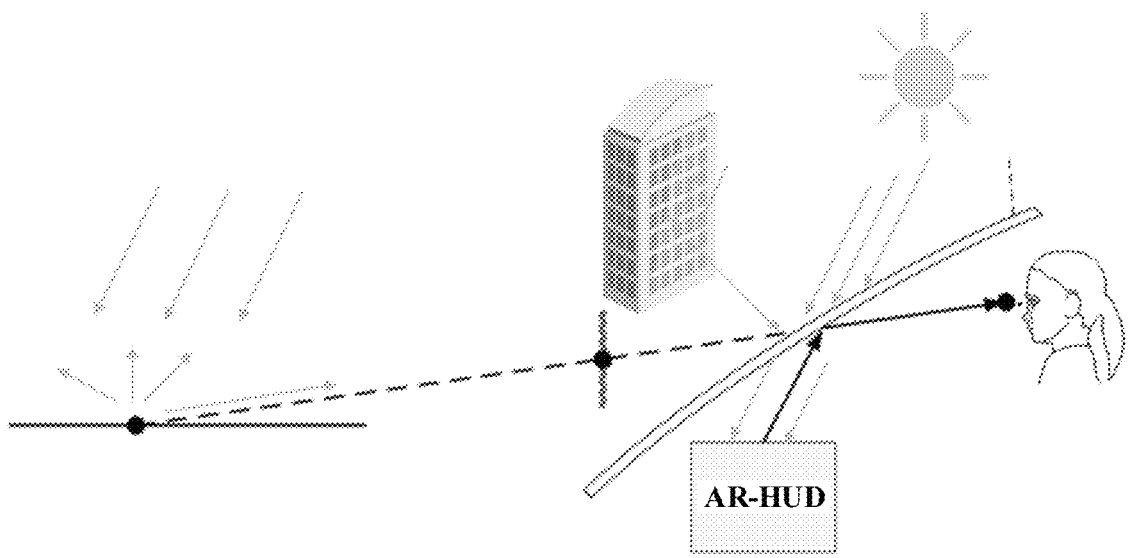
FIG. 31 is a schematic diagram of a source of light for an AR-HUD.

When the AR-HUD is used in daily driving, brightness of a virtual image plane of the AR-HUD is usually adjusted manually by the user or based on an ambient light intensity value sensed by the sensor. In this case, in a road section with a sudden light change, for example, in a tunnel section, a system cannot complete adjustment before the vehicle enters the tunnel because the vehicle is fast. Consequently, after the vehicle enters the tunnel, the virtual image plane is excessively bright and blocks sight of a driver, increasing a danger of driving. A principle of the optical device of the HUD is as follows: Light is reflected by a reflection path including a plurality of reflectors to a windshield, and then is reflected by the windshield to eyes. If external light enters the optical device along the same optical path, the external light also enters the eyes. As a result, the driver cannot clearly see the virtual image plane. FIG. 31 is a schematic diagram of a source of light for an AR-HUD. As shown in FIG. 31, intensity and an incidence angle of sunlight entering the optical device also greatly affect the brightness of the virtual image plane of the HUD.

This application provides an adjustment method based on geographical location information, to resolve a problem that adjustment in a special road section lags and factors affecting brightness adjustment are not comprehensively introduced, quickly respond to a road section with a sudden brightness change, and adjust brightness more accurately. This greatly reduces a danger of driving while making brightness adjustment more accurate, and has great practical significance.

Figure 32:
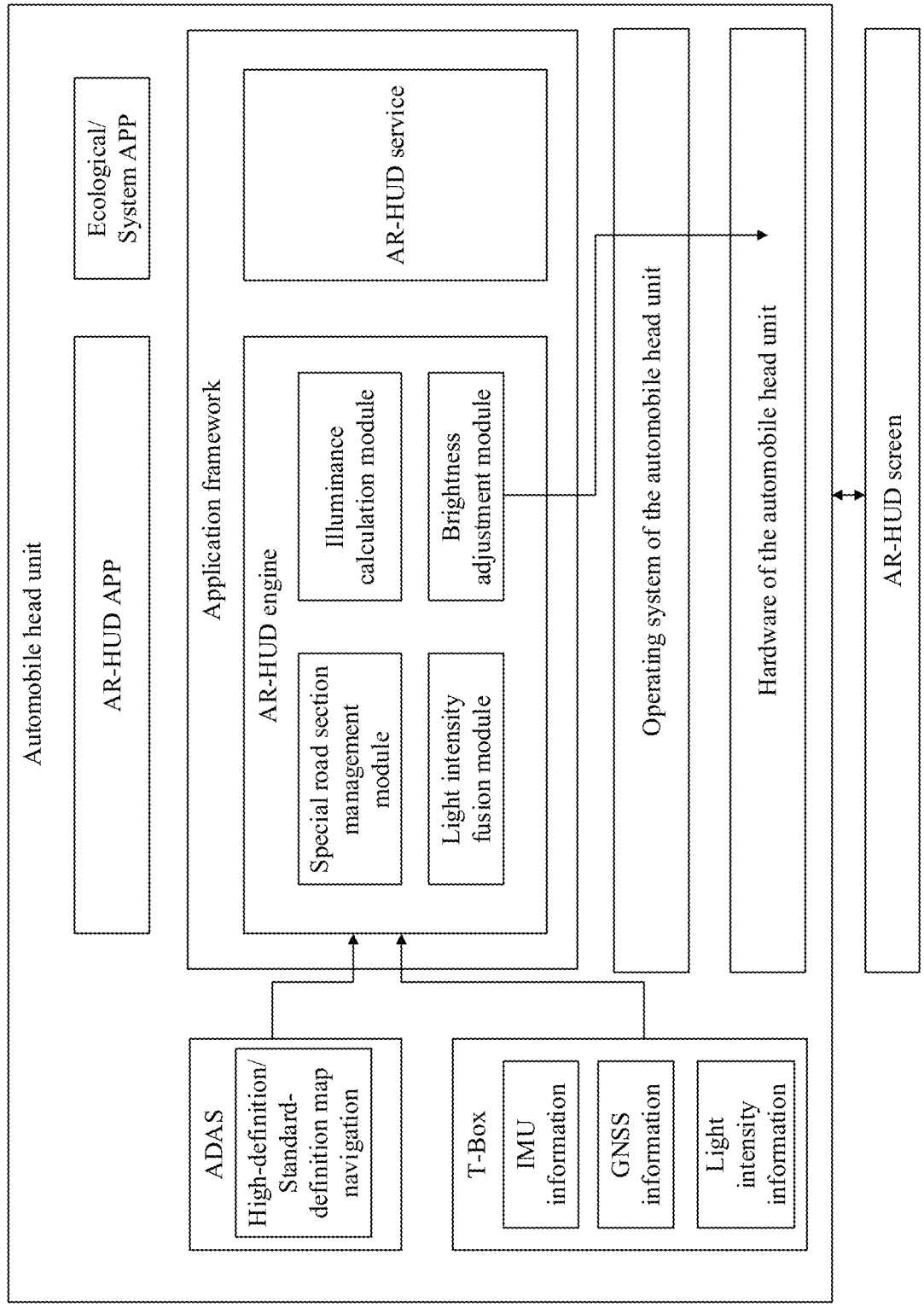
FIG. 32 shows a system architecture according to an embodiment of this application.

As shown in FIG. 32, an embodiment of this application provides a system architecture that may be deployed in an AR-HUD engine at an application framework layer of an automobile head unit. Signals of an ADAS and a T-Box are input to each algorithm module of the AR-HUD engine, and a calculated brightness adjustment value is sent to an optical device of an AR-HUD for brightness adjustment.

Figure 33:
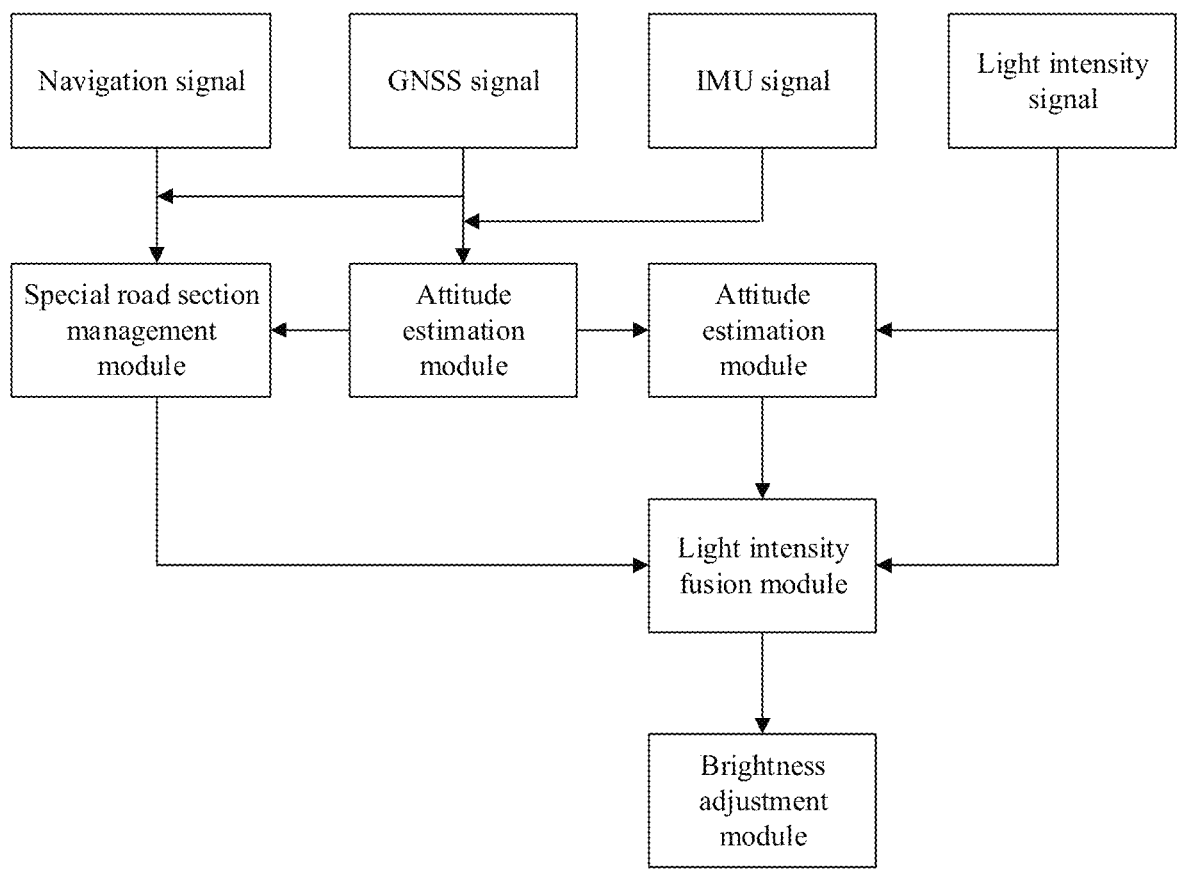
FIG. 33 shows detailed data flows between modules.

Detailed data flows between modules are shown in FIG. 33. An attitude estimation module calculates, based on a global navigation satellite system (GNSS) signal and an IMU signal, a current vehicle body attitude of a vehicle, including a current geographical location and orientation attitude of the vehicle. An illuminance calculation module may calculate a solar altitude angle based on current time and a current season, and calculate, based on the current vehicle body attitude and the current geographical location information, an incidence angle and light intensity of direct sunlight or reflected light that enters the optical device of the HUD. A special road section management module dynamically changes a weighting factor for brightness adjustment of the HUD based on a current vehicle body location, to complete brightness adjustment for the HUD before the vehicle enters a road section with a sudden light intensity change. A light intensity fusion module performs fusion correction for brightness adjustment of the HUD based on light information of an opening of the optical device of the HUD, light intensity near a virtual image plane, and a distance from the special road section, to obtain a final value to which brightness of the HUD should be adjusted at a moment. A brightness adjustment module performs brightness adjustment on the optical device of the HUD based on the calculated final value.

This embodiment of this application may be applied to a vehicle-mounted AR-HUD device, to resolve a problem that adjustment in a special road section lags and factors affecting brightness adjustment are not comprehensively introduced. This embodiment of this application may be used with an optical device of an AR-HUD in a hardware form, or may be independently loaded in other HUD hardware in a form of software.

In this embodiment of this application, a distance between the vehicle body and a region with a sudden light intensity change may be sensed by the special road section management module in real time, and correction is performed for brightness adjustment correspondingly, to ensure that adjustment is completed before the vehicle reaches the region. Further, an incidence angle of sunlight on a surface of the HUD may be calculated by the illuminance calculation module in real time, and intensity of light entering the optical device is comprehensively calculated in combination with a sensor of the optical device of the HUD. Further, modeling may be performed by the brightness adjustment module based on the distance from the region with a sudden light intensity change, the intensity of the light entering the optical device, and light intensity near the virtual image plane, to perform brightness adjustment. In this way, influencing factors such as an adjustment lag in a special road section and brightness adjustment can be more comprehensively considered, to avoid blocking a field of view and ensure driving safety.

Figure 34:
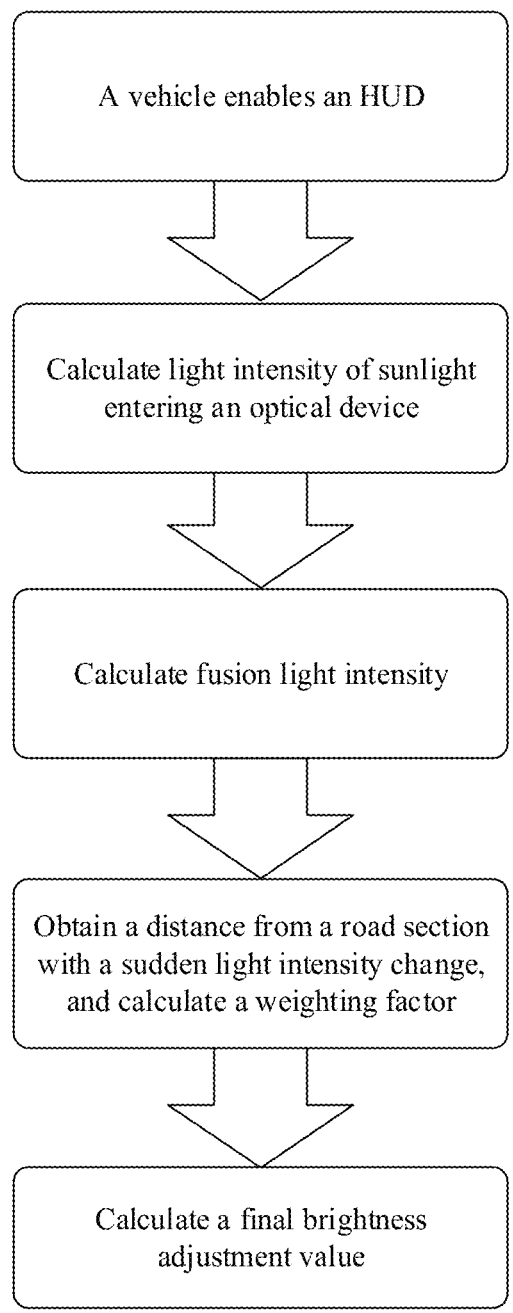
FIG. 34 is a flowchart of a display method according to an embodiment of this application.

As shown in FIG. 34, an embodiment of this application provides a method. Step 1: Enable a HUD function. An algorithm module is simultaneously enabled. Step 2: Calculate intensity and an incidence angle of light at an opening of an optical device of a HUD based on a current vehicle body location, road condition information, current moment information, a light sensor, and the like, to obtain intensity of light entering the optical device. The light is directly reflected by the optical device to eyes, affecting visual experience of the eyes for brightness of a virtual image plane. Step 3: Obtain light intensity of ambient light near the virtual image plane of the HUD by using a sensor, and perform modeling based on the light intensity of the ambient light and the intensity of the light entering the optical device, to preliminarily obtain fusion light intensity. Step 4: Calculate a current distance between the vehicle and a region with a sudden brightness change based on a navigation signal, and calculate a weighting factor for brightness adjustment. Step 5: Obtain a final brightness adjustment value based on the obtained fusion light intensity and the weighting factor, to ensure that brightness adjustment for the HUD is completed at a specific distance from a sudden change point.

The fusion light intensity may be calculated in the following optional manner:

To more accurately restore brightness, observed by a driver, of the virtual image plane, impact of the intensity of the light entering the optical device on perception of the eyes needs to be calculated. Therefore, light intensity and an incidence angle of sunlight entering the optical device needs to be first calculated. The light entering the optical device may include direct sunlight entering the optical device and sunlight reflected by a highly reflective building near the vehicle to the optical device.

Figure 35:
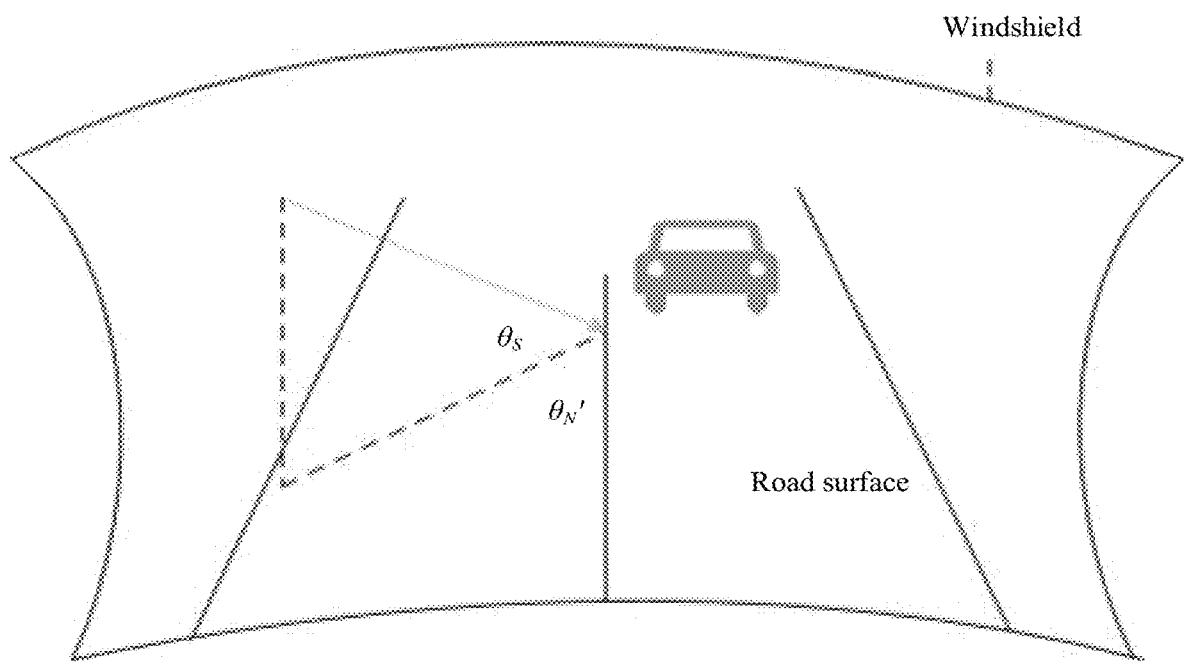
FIG. 35 is a schematic diagram of an included angle between sunlight and a vehicle.

FIG. 35 is a schematic diagram of an included angle between sunlight and a vehicle. FIG. 35 shows a front view of a driver in the vehicle. A gray arrow indicates a current sunlight direction. $\theta_s$ is a solar altitude angle at a current moment. $\theta_s'$ is an included angle between a projection of the sunlight on the ground and a forward direction of the vehicle.

First, an incidence angle of direct sunlight entering an optical device of a HUD. To calculate light intensity of the direct sunlight entering the optical device, the included angle $\theta_s'$ and the solar altitude angle $\theta_s$ need to be calculated. Because an included angle between sunlight and a vehicle body cannot be directly obtained, in this embodiment, an included angle between the projection of the sunlight on the ground and a due north direction is first obtained, and then an included angle between the vehicle body and the due north direction is calculated, to obtain $\theta_s'$.

The solar altitude angle $\theta_s$ is calculated by using the following formula:

$$\sin \theta_s = \cos h \cos \delta \cos \varphi + \sin \delta \sin \varphi$$

Figure 36:
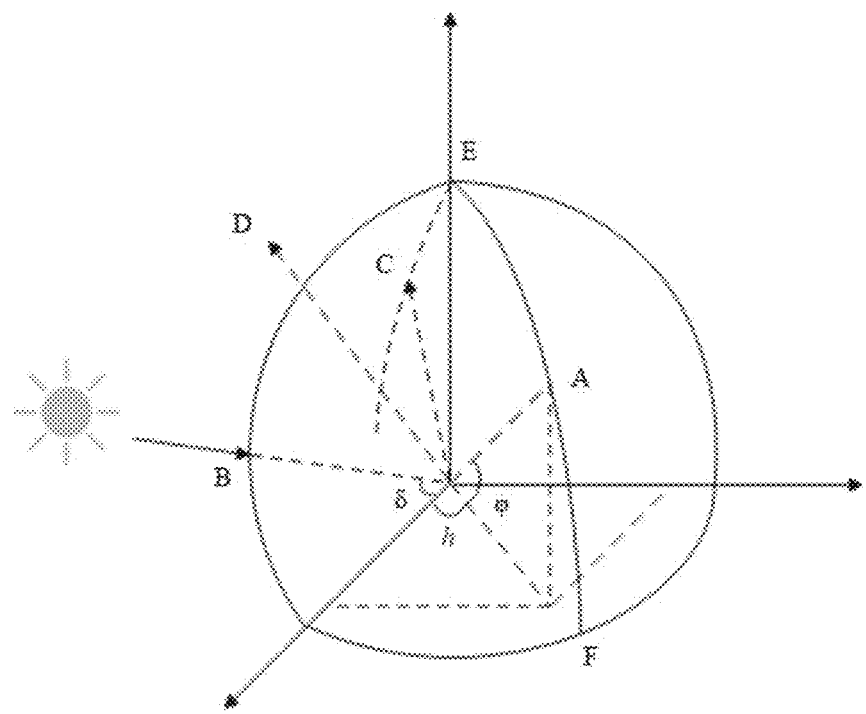
FIG. 36 is an abstract diagram of a relationship between sunlight and the earth.
Figure 37:
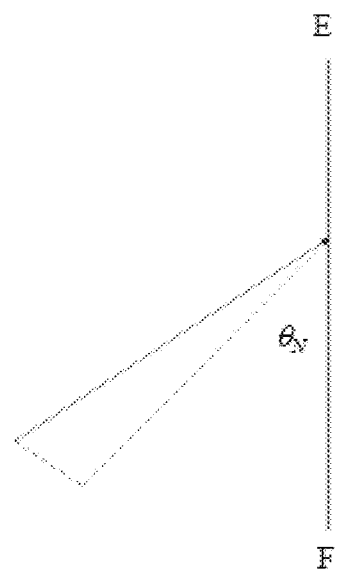
FIG. 37 is a schematic diagram of an included angle between a projection of sunlight and a meridian line.

FIG. 36 is an abstract diagram of a relationship between sunlight and the earth. It is assumed that a vehicle is traveling at a point A. h is an hour angle in an equatorial coordinate system, to be specific, an included angle between a right ascension and a meridian line at which the point A is located. $\delta$ is a declination of the sun at a current moment, to be specific, an opening angle between the equator and a point with direct sunlight. φ is an opening angle between the equator and a latitude of a location of the vehicle. FIG. 37 is a schematic diagram of an included angle between a projection of sunlight and a meridian line.

In FIG. 36, a center of the earth is O. Sunlight irradiated on the earth may be considered as parallel light, and a point B is an intersection point between the earth's surface and a connection line between the sun and the center of the earth. Therefore, sunlight passing through the point A is parallel to OB and intersects a plane OAB, that is, the sunlight passing through the point A is certainly on the plane OAB. Therefore, calculating an included angle between a longitude and a projection of sunlight on the ground, to be specific, an included angle between EF and a projection, on the ground, of the sunlight passing through the point A, is equivalent to calculating an included angle between the plane OAB and a plane OEF.

$\overrightarrow{OC}$ is drawn on the plane OEF and is perpendicular to $\overrightarrow{OA}$, and $\overrightarrow{OD}$ is perpendicular to the plane OAB. Therefore, the angle $\theta_s'$ is complementary to an angle $\angle COD$.

$$\overrightarrow{OA} = (\cos\varphi \cos h, \cos\varphi \sin h, \sin\varphi)$$

$$\overrightarrow{OB} = (\cos\delta, 0, \sin\delta)$$

$$\overrightarrow{OC} = (-\sin\varphi \cos h, -\sin\varphi \sin h, \cos\varphi)$$

Because $\overrightarrow{OD}$ is perpendicular to the plane OAB, $\overrightarrow{OD}$ may be obtained by multiplying $\overrightarrow{OB}$ by $\overrightarrow{OA}$:

$\overrightarrow{OD}$=(−sin φ cos φ sin h,−cos δ sin φ+sin δ cos φ cos h,cos δ cos φ sin h)

Therefore, a final formula for the angle $\theta_s'$ is as follows:

$$\theta_s' = \frac{\pi}{2} - \angle COD = \frac{\pi}{2} - \cos^{-1}\frac{\overrightarrow{OC}\cdot\overrightarrow{OD}}{|\overrightarrow{OC}|\times|\overrightarrow{OD}|}$$

$\theta_h$ indicates an included angle between emergent light of the HUD and a horizontal plane, $\theta_h'$ includes an included angle between a projection of the emergent light on the horizontal plane and the vehicle body, and light intensity obtained by a brightness sensor is $E_1$. In this case, the light intensity of the direct sunlight entering the optical device is as follows:

$$E_1' = \left(\cos\frac{|\theta_h - \theta_s|}{2}\right)^k \left(\cos\frac{|\theta_h' - \theta_s'|}{2}\right)^w E_1,$$

where k and w respectively indicate light shrinkage intensity in two dimensions, and in this embodiment, k=w, and both are 1.

Figure 38:
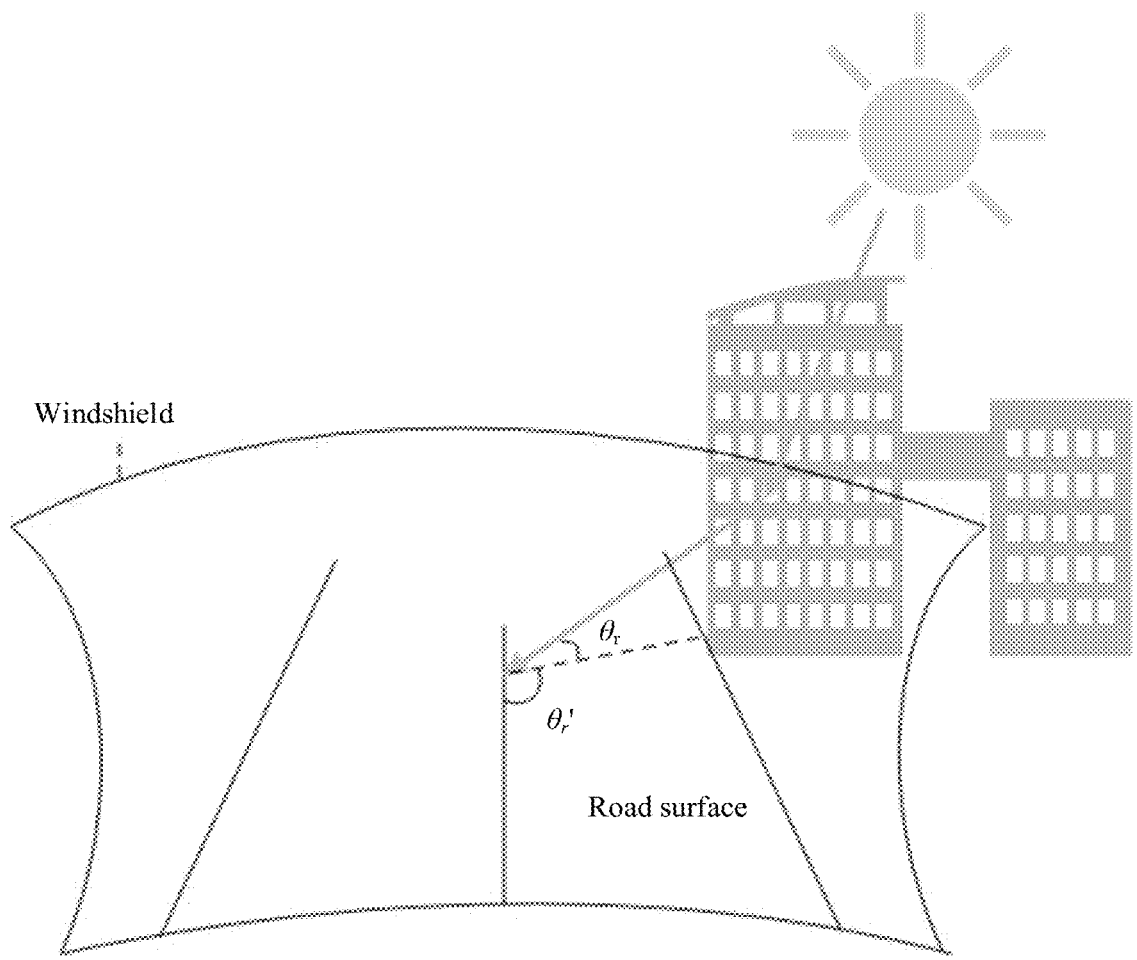
FIG. 38 is a schematic diagram of an included angle between reflected light and a vehicle.

Then an included angle between light reflected by a highly reflective building near the vehicle and a traveling direction of the vehicle is calculated. FIG. 38 is a schematic diagram of an included angle between reflected light and a vehicle. As shown in FIG. 38, $\theta_r$ is an included angle between the ground and sunlight reflected at a current moment, and $\theta_r'$ is an included angle between a projection of the reflected light on the ground and a forward direction of the vehicle.

At a specific moment, a system obtains, from a navigation signal, included angles $\Theta=\{\theta_i\}_{i=1:n}$ between a due north direction and walls of n highly reflective buildings near the vehicle. It is assumed that a positive direction of a meridian line is the due north direction, and a positive direction of a wall vector is a left direction facing the wall. In this case, θ is defined as an included angle between the wall vector and the meridian line in a right-handed coordinate system.

Because the building is perpendicular to the ground, the following can be readily figured out:

$$\theta_r = \theta_s$$

$$\theta_r' = (2\theta_i - \theta_s')\bmod 360$$

Therefore, intensity of light reflected by the highly reflective building to the optical device is as follows:

$$E_1'' = \frac{\sum_{i=1}^n \left(\cos\frac{|\theta_h - \theta_r|}{2}\right)^k \left(\cos\frac{|\theta_h' - (2\theta_i - \theta_s')\bmod 360|}{2}\right)^w E_1}{n}$$

Fusion light intensity $E_s$ of light entering the optical device may be obtained by combining the light intensity of the direct sunlight entering the optical device with the light intensity of the reflected light entering the optical device.

$$E_s = \frac{\sum_{i=1}^n \left(\cos\frac{|\theta_h - \theta_r|}{2}\right)^k \left(\cos\frac{|\theta_h' - (2\theta_i - \theta_s')\bmod 360|}{2}\right)^w E_1 + E_1'}{n+1}$$

Then the system obtains comprehensive fusion light intensity based on the light intensity $E_d$ near the virtual image plane that is obtained by the sensor:

$$E = E_d + E_s$$

Quick brightness adjustment for a special road section:

When a vehicle passes a special road section with a sudden brightness change, brightness adjustment needs to be completed before the vehicle reaches a sudden change point. However, because the vehicle is fast, a conventional adjustment technology cannot meet the requirement, and a bright virtual image plane blocks a field of view in a dark road section such as a tunnel, greatly increasing a danger of driving.

Figure 39:
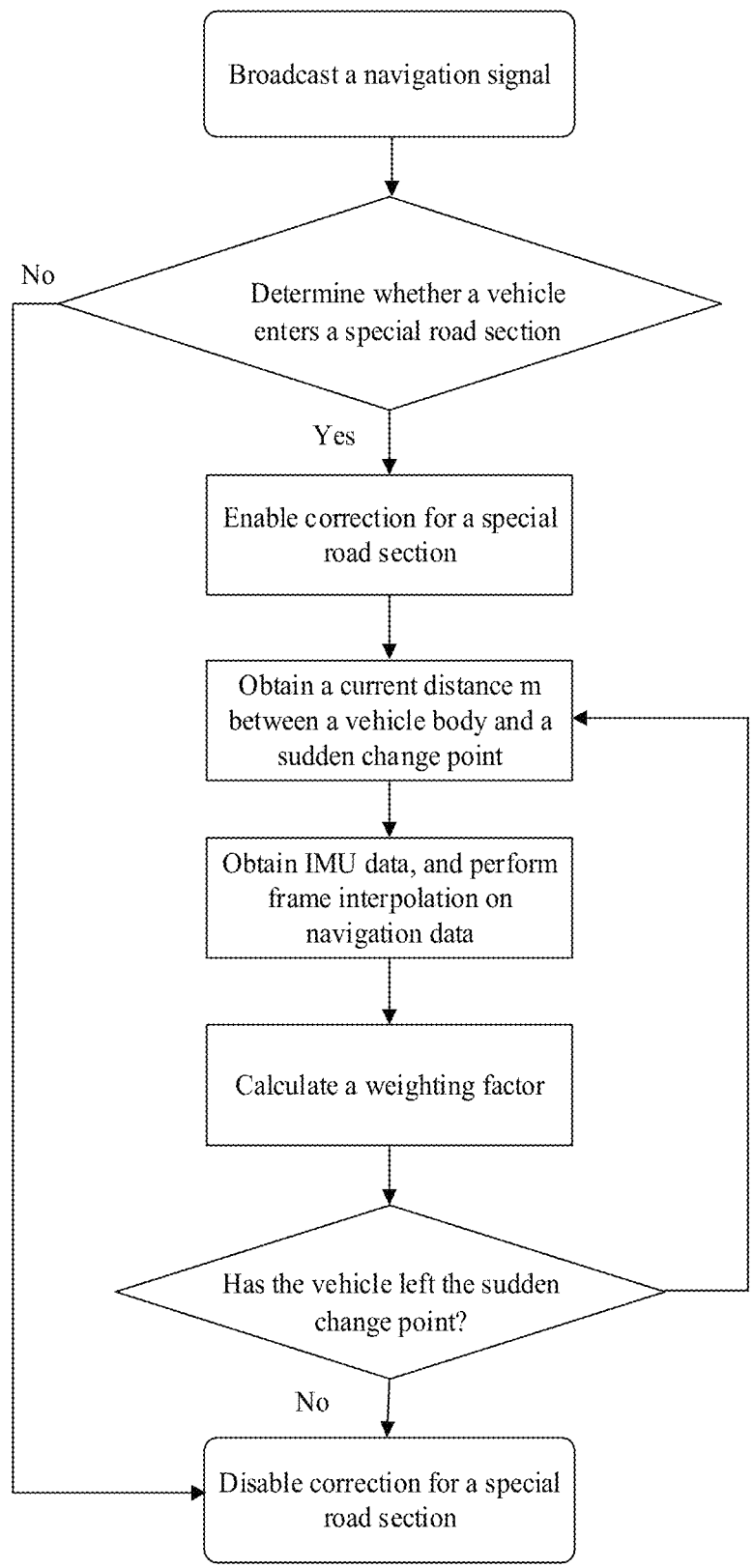
FIG. 39 is a flowchart of correction for a special road section.

FIG. 39 is a flowchart of correction for a special road section. As shown in FIG. 39, during driving, a navigation signal is obtained in real time. If there is a point with a sudden light change in front, for example, in a tunnel or under an overpass, correction for a special road section is enabled. When a vehicle is at a distance of m meters away from a point with sudden light intensity change, a distance between a vehicle body and the sudden change point is periodically obtained. Because a quantity of frames of navigation data is usually small, a requirement can hardly be met. Therefore, frame interpolation needs to be on a signal in an interval between two signals, to meet a requirement for obtaining a vehicle body location at 60 Hz or above. An IMU may obtain a linear acceleration and an angular acceleration of the vehicle in real time, and may perform frame interpolation on the vehicle body location based on the accelerations. Assuming that a distance, obtained from navigation data at a specific moment, between a vehicle location and the sudden change point is $S_t$, a distance obtained by the IMU through data compensation at a moment t+1 is as follows:

$$S_{t+1} = S_t - \int_{t}^{t+1} (v_t + at)dt,$$

where a is an acceleration of the vehicle that is obtained from an accelerometer.

$S_M$ and $L_M$ indicate a distance between a correction start point and the sudden change point and brightness of a HUD, and $S_N$ and $L_N$ indicate a distance between a correction end point and the sudden change point and brightness of the HUD. In this case, a weighting factor at a distance of S meters away from the sudden change point is as follows:

$$s = \cos\left(\left(\frac{S - S_N}{S_M - S_N}\right) \times \frac{\pi}{2}\right)$$

When the vehicle is at $S_M$, s is 1, indicating that original brightness is retained. When the vehicle is at $S_N$, s is 0, indicating that correction is completed, so that brightness has reached low brightness when the vehicle is at a distance of $S_N$ meters from the sudden change point. For a specific correction formula, refer to the following descriptions.

Brightness Adjustment for a HUD:

In this embodiment, an automatic brightness adjustment function is provided through calibration and correction, and a brightness adjustment curve for a non-special road section is as follows:

$$L = \text{clamp}(35 \times \sqrt{E}, \text{MIN\_VALUE}, \text{MAX\_VALUE}),$$

where MIN_VALUE and MAX_VALUE are respectively minimum brightness and maximum brightness that can be reached on a virtual image plane of the HUD.

In a special road section, a currently calculated weighting factor is s, and a brightness adjustment function is as follows:

$$L = L_N + (L_M - L_N) \times s$$

A brightness value is transmitted to hardware of an automobile head unit through a brightness adjustment module, and a brightness parameter of an optical device of the HUD is finally adjusted through underlying-layer software.

In embodiments of this application, brightness adjustment is performed based on geographical location information and fusion between intensity of ambient light on a virtual image plane and intensity of light entering an optical device, so that an adjustment result is more accurate and closer to a real visual experience of a driver.

In embodiments of this application, brightness of a virtual image plane of a HUD is pre-adjusted based on a distance between a vehicle body location and a region with a sudden light intensity change, to prevent a light window from blocking sight due to an adjustment lag. This greatly reduces a danger of driving and ensures safety of a person in a vehicle.

In embodiments of this application, a distance between a vehicle body and a sudden change point is calculated by a special road section management module in real time, and weighted correction is performed on brightness adjustment based on the distance. In this way, adjustment is completed beyond a specified distance from the sudden change point, to prevent a light window from blocking sight due to an adjustment lag.

In embodiments of this application, light intensity of light entering an optical device is calculated when light intensity near a virtual image plane is obtained, and the two parts of light are combined to provide reference for subsequent brightness adjustment. In this way, sources of light intensity are more comprehensively considered, brightness adjustment for a virtual image plane of a HUD is more consistent with real visual experience of eyes, and the adjustment is more accurate.

Some acronyms and abbreviations used in embodiments of this application are follows: AR, HUD, GPS, and inertial measurement unit (IMU).

An embodiment of this application further provides a computer-readable storage medium. The computer-readable storage medium stores a computer program. When the computer program is executed by a computer, the method process in any one of the foregoing method embodiments is implemented.

An embodiment of this application further provides a computer program or a computer program product including a computer program. When the computer program is executed on a computer, the computer is enabled to implement the method process in any one of the foregoing method embodiments.

An embodiment of this application further provides a chip, including a processing module and a communication interface. The processing module can perform the method process in any one of the foregoing method embodiments.

It should be understood that the processor mentioned in embodiments of this application may be a CPU, or may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include both a volatile memory and a non-volatile memory. The non-volatile memory may be a ROM, a programmable ROM (PROM), an EPROM, an EEPROM, or a flash memory. The volatile memory may be a RAM, and serves as an external cache. By way of example but not limitative description, RAMs in many forms may be used, for example, an SRAM, a dynamic RAM (DRAM), a synchronous DRAM (SDRAM), a double data rate (DDR) SDRAM, an enhanced SDRAM (ESDRAM), a synchronous-link (synchlink) DRAM (SLDRAM), and a direct rambus (DR) RAM.

It should be noted that the memory described in this specification is intended to include but is not limited to these memories and any memory of another appropriate type.

It should be further understood that "first", "second", and various numbers in this specification are merely used for differentiation for ease of description, and are not intended to limit the scope of this application.

It should be understood that the term "and/or" in this specification describes only an association relationship between associated objects and indicates that three relationships may exist. For example, A and/or B may indicate the following three cases: only A exists, both A and B exist, and only B exists. In addition, the character "/" in this specification usually indicates an "or" relationship between the associated objects.

It should be understood that sequence numbers of the foregoing processes do not mean execution sequences in embodiments of this application. Some or all of the steps may be performed in parallel or in sequence. The execution sequences of the processes should be determined based on functions and internal logic of the processes, and should not be construed as any limitation on implementation processes of embodiments of this application.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It can be clearly understood by a person skilled in the art that, for ease and brevity of description, for a detailed operating process of the foregoing system, apparatus, and unit, reference may be made to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to the conventional technology, or some of the technical solutions may be implemented in a form of a software product. The computer software product is stored in a storage medium, and includes several instructions for instructing a computer device (which may be a personal computer, a server, a network device, a terminal device, or the like) to perform all or some of the steps of the methods in embodiments of this application. The storage medium includes any medium that can store program code, for example, a Universal Serial Bus (USB) flash drive, a removable hard disk, a ROM, a RAM, a magnetic disk, or an optical disc.

Cross reference may be made between related parts in the method embodiments of this application, and apparatuses provided in the apparatus embodiments are configured to perform the methods provided in corresponding method embodiments. Therefore, the apparatus embodiments may be understood with reference to related parts in the related method embodiments.

The diagrams of structures of apparatuses provided in the apparatus embodiments of this application show only simplified designs of corresponding apparatuses. In actual application, the apparatuses may include any quantity of transmitters, receivers, processors, memories, and the like, to implement functions or operations performed by the apparatuses in the apparatus embodiments of this application.

Names of messages/frames/indication information, modules, units, or the like provided in embodiments of this application are merely examples, and other names may be used provided that the messages/frames/indication information, modules, units, or the like have same functions.

Terms used in embodiments of this application are merely intended to describe specific embodiments, but not to limit this application. The terms "a", "the", and "this" of singular forms used in embodiments of this application and the appended claims are also intended to include plural forms, unless otherwise specified in the context clearly. It should be further understood that the term "and/or" used in this specification indicates and includes any or all possible combinations of one or more items listed in association. The character "/" in this specification usually indicates an "or" relationship between the associated objects.

Depending on the context, for example, the term "if" used herein may be interpreted as "in the case of", "when", "in response to determining that", or "in response to detecting that". Similarly, depending on the context, the phrase "if it is determined that" or "if it is detected that (a stated condition or event)" may be interpreted as "when it is determined that" or "in response to determining that", or "when it is detected that (a stated condition or event)" or "in response to detecting that (a stated condition or event)".

A person of ordinary skill in the art can understand that all or some of the steps of the methods in the foregoing embodiments may be implemented by a program instructing related hardware. The program may be stored in a readable storage medium of a device. When the program is executed, all or some of the foregoing steps may be included. For example, the storage medium is a flash or an EEPROM.

What is claimed is:

1. A method comprising:
    obtaining environment information corresponding to a vehicle, wherein the environment information comprises light intensity information or location information, wherein the location information comprises a first location of the vehicle or a second location of a region in which ambient light is blocked in a traveling direction of the vehicle;

obtaining a target imaging region of a display device of the vehicle based on the light intensity information;

obtaining a first distance between the vehicle and the region based on the first location or the second location;

obtaining a second distance between a mark point corresponding to the region and the region, wherein the mark point is beyond the region; and adjusting a display mode of the display device based on the first distance being less than a preset distance, the target imaging region, and the second distance, wherein the display mode comprises at least one of a display brightness, a display location, a display content, a display color, a display style, or a display size.

2. The method of claim 1, wherein the location information comprises the first location or the second location, and wherein adjusting the display mode comprises further adjusting the display mode based on the first location or the second location.

3. The method of claim 1, wherein the display mode comprises the display brightness, wherein the light intensity information comprises a first intensity of a first ambient light received by a first optical element of the display device or a second intensity of a second ambient light corresponding to an imaging location of the display device, wherein adjusting the display mode comprises adjusting the display brightness based on the first intensity or the second intensity, and wherein the display brightness is positively correlated with the first intensity and is positively correlated with the second intensity.

4. The method of claim 1, wherein the light intensity information comprises an intensity of an ambient light corresponding to an imaging region of the display device, wherein the display mode comprises the display location, and wherein adjusting the display mode further comprises adjusting the display location based on the intensity of the target imaging region.

5. The method of claim 1, wherein the display mode comprises the display brightness, wherein adjusting the display mode further comprises adjusting the display brightness based on a negative correlation of the display brightness with the first distance.

6. The method of claim 3, wherein the light intensity information further comprises a third intensity of a third ambient light received by a second optical element of an optical device of a head-up display (HUD) of the display device, and wherein obtaining the environment information comprises:

obtaining an incidence angle corresponding to a fourth ambient light received at a light outlet of the optical device of the HUD, an emergence angle corresponding to emergent light of the HUD, and a fourth intensity of the fourth ambient light; and obtaining the third intensity based on the incidence angle, the emergence angle, and the fourth intensity, wherein the third intensity is positively correlated with the fourth intensity and is negatively correlated with a difference between the incidence angle and the emergence angle.

7. The method of claim 3, wherein the light intensity information further comprises a third intensity of a third ambient light received by a second optical element of an optical device of a head-up display (HUD), and wherein obtaining the environment information comprises:

obtaining a first included angle between the third ambient light and a horizontal plane and a second included angle between a first projection of the third ambient light on the horizontal plane and the traveling direction of the vehicle;

obtaining a third included angle between emergent light of the HUD and the horizontal plane and a fourth included angle between a second projection of the emergent light on the horizontal plane and the traveling direction;

obtaining a first difference between the first included angle and the third included angle and a second difference between the second included angle and the fourth included angle; and obtaining the third intensity based on the first difference, the second difference, and a fourth intensity of a fourth ambient light received at a light outlet of the optical device of the HUD, wherein the third intensity is positively correlated with the fourth intensity, is negatively correlated with the first difference, and is negatively correlated with the second difference.

8. The method of claim 4, further comprising:

obtaining image information in front of the vehicle and an eye location; and obtaining the intensity based on the image information and the eye location.

9. An apparatus comprising:

a memory configured to store instructions; and one or more processors coupled to the memory and configured to execute the instructions to cause the apparatus to:

obtain environment information corresponding to a vehicle, wherein the environment information comprises light intensity information or location information, wherein the location information comprises a first location of the vehicle or a second location of a region in which ambient light is blocked in a traveling direction of the vehicle;

obtain a target imaging region of a display device of the vehicle based on the light intensity information;

obtain a first distance between the vehicle and the region based on the first location or the second location;

obtain a second distance between a mark point corresponding to the region and the region, wherein the mark point is beyond the region; and adjust a display mode of the display device based on the first distance being less than a preset distance, the target imaging region, and the second distance, wherein the display mode comprises at least one of a display brightness, a display location, a display content, a display color, a display style, or a display size.

10. The apparatus of claim 9, wherein the display mode comprises the display brightness, wherein the light intensity information comprises a first intensity of a first ambient light received by a first optical element of the display device or a second intensity of a second ambient light corresponding to an imaging location of the display device, wherein the one or more processors are further configured to execute the instructions to cause the apparatus to adjust the display brightness based on the first intensity or the second intensity, and wherein the display brightness is positively correlated with the first intensity and is positively correlated with the second intensity.

11. The apparatus of claim 9, wherein the light intensity information comprises an intensity of an ambient light corresponding to at least one imaging region of the display device, wherein the display mode comprises the display location, and wherein the one or more processors are further configured to execute the instructions to cause the apparatus to adjust the display location based on the intensity of the target imaging region.

12. The apparatus of claim 9, wherein the display mode comprises the display brightness, wherein the one or more processors are further configured to execute the instructions to cause the apparatus to adjust the display brightness based on a negative correlation of the display brightness with the first distance.

13. The apparatus of claim 10, wherein the light intensity information further comprises a third intensity of a third ambient light received by a second optical element of an optical device of a head-up display (HUD) of the display device, and wherein the one or more processors are further configured to execute the instructions to cause the apparatus to:
  obtain an incidence angle corresponding to a fourth ambient light received at a light outlet of the optical device of the HUD, an emergence angle corresponding to emergent light of the HUD, and a fourth intensity of the fourth ambient light; and
  obtain the third intensity based on the incidence angle, the emergence angle, and the fourth intensity, wherein the third intensity is positively correlated with the fourth intensity and is negatively correlated with a difference between the incidence angle and the emergence angle.

14. A computer program product comprising computer-executable instructions that are stored on a computer-readable storage medium and that, when executed by one or more processors, cause an electronic apparatus to:
  obtain environment information corresponding to a vehicle, wherein the environment information comprises light intensity information or location information, wherein the location information comprises a first location of the vehicle or a second location of a region in which ambient light is blocked in a traveling direction of the vehicle;
  obtain a target imaging region of a display device of the vehicle based on the light intensity information;
  obtain a first distance between the vehicle and the region based on the first location or the second location;
  obtain a second distance between a mark point corresponding to the region and the region, wherein the mark point is beyond the region; and
  adjust a display mode of the display device based on the first distance being less than a preset distance, the target imaging region, and the second distance, wherein the display mode comprises at least one of a display brightness, a display location, a display content, a display color, a display style, or a display size.

15. The computer program product of claim 14, wherein the location information comprises the first location or the second location, and wherein the computer-executable instructions that when executed by the one or more processors further cause the electronic apparatus to further adjust the display mode based on the first location or the second location.

16. The computer program product of claim 14, wherein the display mode comprises the display brightness, wherein the light intensity information comprises a first intensity of a first ambient light received by a first optical element of the display device or a second intensity of a second ambient light corresponding to an imaging location of the display device, wherein the computer-executable instructions that when executed by the one or more processors further cause the electronic apparatus to adjust the display brightness based on the first intensity or the second intensity, and wherein the display brightness is positively correlated with the first intensity and is positively correlated with the second intensity.

17. The computer program product of claim 14, wherein the light intensity information comprises an intensity of an ambient light corresponding to an imaging region of the display device, wherein the display mode comprises the display location, and wherein the computer-executable instructions that when executed by the one or more processors further cause the electronic apparatus to adjust the display mode by:
  obtaining the target imaging region of the display device based on the intensity; and
  adjusting the display location based on the target imaging region.

18. The computer program product of claim 14, wherein the display mode comprises the display brightness, and wherein the computer-executable instructions that when executed by the one or more processors further cause the electronic apparatus to adjust the display mode by adjusting the display brightness based on a negative correlation of the display brightness with the first distance.

19. The computer program product of claim 16, wherein the light intensity information further comprises a third intensity of a third ambient light received by a second optical element of an optical device of a head-up display (HUD) of the display device, and wherein the computer-executable instructions that when executed by the one or more processors further cause the electronic apparatus to obtain the environment information by:
  obtaining an incidence angle corresponding to a fourth ambient light received at a light outlet of the optical device of the HUD, an emergence angle corresponding to emergent light of the HUD, and a fourth intensity of the fourth ambient light; and
  obtaining the third intensity based on the incidence angle, the emergence angle, and the fourth intensity, wherein the third intensity is positively correlated with the fourth intensity and is negatively correlated with a difference between the incidence angle and the emergence angle.

20. The computer program product of claim 16, wherein the light intensity information further comprises a third intensity of a third ambient light received by a second optical element of an optical device of a head-up display (HUD) of the display device, and wherein the computer-executable instructions that when executed by the one or more processors further cause the electronic apparatus to obtain the environment information by:
  obtaining an incidence angle corresponding to a fourth ambient light received at a light outlet of the optical device of the HUD, an emergence angle corresponding to emergent light of the HUD, and a fourth intensity of the fourth ambient light; and
  obtaining the third intensity based on the incidence angle, the emergence angle, and the fourth intensity, wherein the third intensity is positively correlated with the fourth intensity and is negatively correlated with a difference between the incidence angle and the emergence angle.

* * * * *